US010299261B2

(12) United States Patent
Chun et al.

(10) Patent No.: US 10,299,261 B2
(45) Date of Patent: May 21, 2019

(54) METHOD AND DEVICE FOR DOWNLINK MULTI-USER TRANSMISSION IN WIRELESS COMMUNICATION SYSTEM

(71) Applicant: LG ELECTRONICS INC., Seoul (KR)

(72) Inventors: Jinyoung Chun, Seoul (KR); Kiseon Ryu, Seoul (KR); Wookbong Lee, Seoul (KR); Jinsoo Choi, Seoul (KR); Dongguk Lim, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/502,973

(22) PCT Filed: Aug. 5, 2015

(86) PCT No.: PCT/KR2015/008182
§ 371 (c)(1),
(2) Date: Feb. 9, 2017

(87) PCT Pub. No.: WO2016/024750
PCT Pub. Date: Feb. 18, 2016

(65) Prior Publication Data
US 2017/0238286 A1 Aug. 17, 2017

Related U.S. Application Data

(60) Provisional application No. 62/036,605, filed on Aug. 12, 2014, provisional application No. 62/044,404, (Continued)

(51) Int. Cl.
*H04W 72/04* (2009.01)
*H04L 5/00* (2006.01)
(Continued)

(52) U.S. Cl.
CPC ............ *H04W 72/042* (2013.01); *H04L 1/00* (2013.01); *H04L 1/16* (2013.01); *H04L 5/0055* (2013.01);
(Continued)

(58) Field of Classification Search
None
See application file for complete search history.

(56) References Cited

U.S. PATENT DOCUMENTS

2003/0108117 A1* 6/2003 Ketchum ............. H04B 7/0417
375/295
2007/0153754 A1* 7/2007 Shapira ................. H04W 16/10
370/338
(Continued)

FOREIGN PATENT DOCUMENTS

KR 1020080050572 6/2008
KR 1020100135928 12/2010
(Continued)

OTHER PUBLICATIONS

PCT International Application No. PCT/KR2015/008182, International Search Report dated Dec. 7, 2015, 3 pages.

*Primary Examiner* — Ayaz R Sheikh
*Assistant Examiner* — Tarell A Hampton
(74) *Attorney, Agent, or Firm* — Lee, Hong, Degerman, Kang & Waimey

(57) ABSTRACT

The present invention discloses a method and device for downlink multi-user (DL MU) transmission in a wireless communication system. In particular, the method for downlink multi-user data transmission in the wireless communication system includes the steps of receiving, by a station (STA), a DL MU data frame from an access point (AP) and transmitting, by the STA, an acknowledgement (ACK) frame in response to the DL MU data frame, wherein a plurality of ACK frames transmitted by a plurality of STAs in response to the DL MU data frame is multiplexed to configure an uplink multi-user (UP MU) ACK frame, and the time and/or size of a frequency resource at which the ACK frame is transmitted may be determined according to the level of a modulation and coding scheme (MCS) that is applied to the ACK frame.

13 Claims, 39 Drawing Sheets

Related U.S. Application Data filed on Sep. 1, 2014, provisional application No. 62/093,354, filed on Dec. 17, 2014.

(51) Int. Cl.
*H04L 1/00* (2006.01)
*H04L 1/16* (2006.01)
*H04L 27/08* (2006.01)
*H04L 27/00* (2006.01)

(52) U.S. Cl.
CPC .......... *H04L 5/0064* (2013.01); *H04L 5/0091* (2013.01); *H04L 27/0008* (2013.01); *H04W 72/0413* (2013.01); *H04L 5/0023* (2013.01); *H04W 72/0446* (2013.01)

(56) References Cited

U.S. PATENT DOCUMENTS

| | | | | |
|---|---|---|---|---|
| 2008/0117998 A1* | 5/2008 | Kato | ................... | H04L 1/0028 375/267 |
| 2008/0170634 A1* | 7/2008 | Kwak | ................... | H04L 1/1607 375/260 |
| 2010/0195575 A1 | 8/2010 | Papasakellariou et al. | | |
| 2011/0063991 A1* | 3/2011 | Sampath | ............. | H04L 27/2613 370/252 |
| 2011/0317653 A1* | 12/2011 | Kwon | ................... | H04L 1/1861 370/329 |
| 2013/0229996 A1* | 9/2013 | Wang | ................ | H04W 72/0413 370/329 |
| 2013/0286959 A1* | 10/2013 | Lou | ........................ | H04W 72/04 370/329 |
| 2014/0092785 A1* | 4/2014 | Song | ........................ | H04L 1/00 370/280 |
| 2015/0016349 A1* | 1/2015 | Lai | ........................ | H04B 7/2643 370/329 |
| 2015/0063258 A1* | 3/2015 | Merlin | ................... | H04L 47/12 370/329 |
| 2015/0288501 A1* | 10/2015 | Kwon | ................... | H04L 5/0007 370/329 |

FOREIGN PATENT DOCUMENTS

| | | |
|---|---|---|
| KR | 1020130042592 | 4/2013 |
| KR | 1020130045396 | 5/2013 |

* cited by examiner

【Fig. 1】
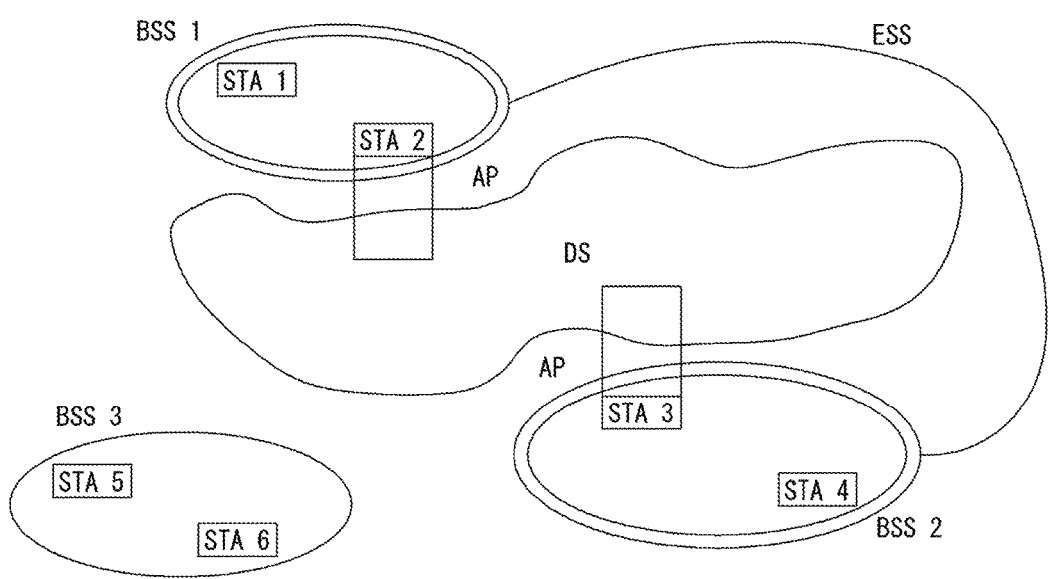

[Fig. 2]
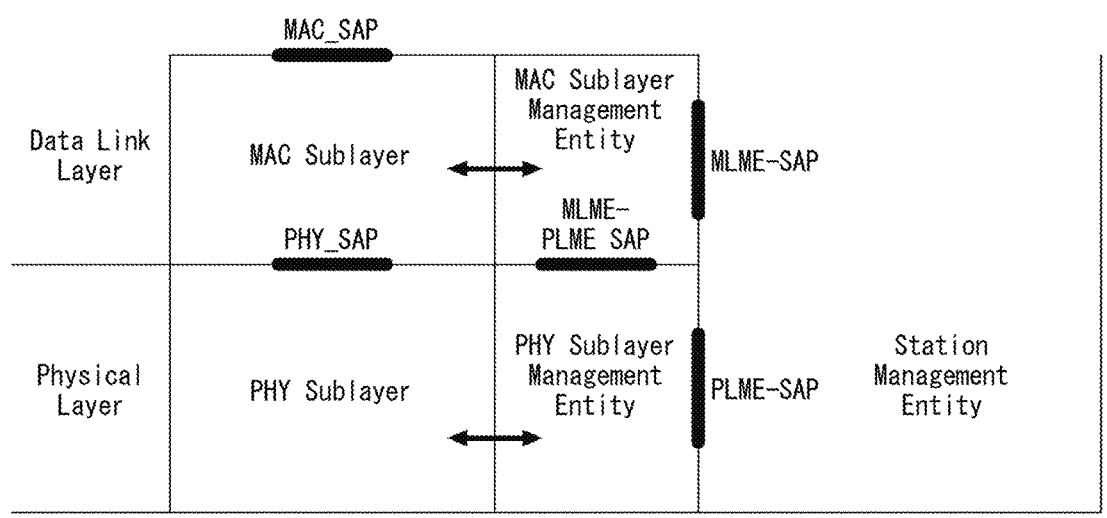

[Fig. 3]
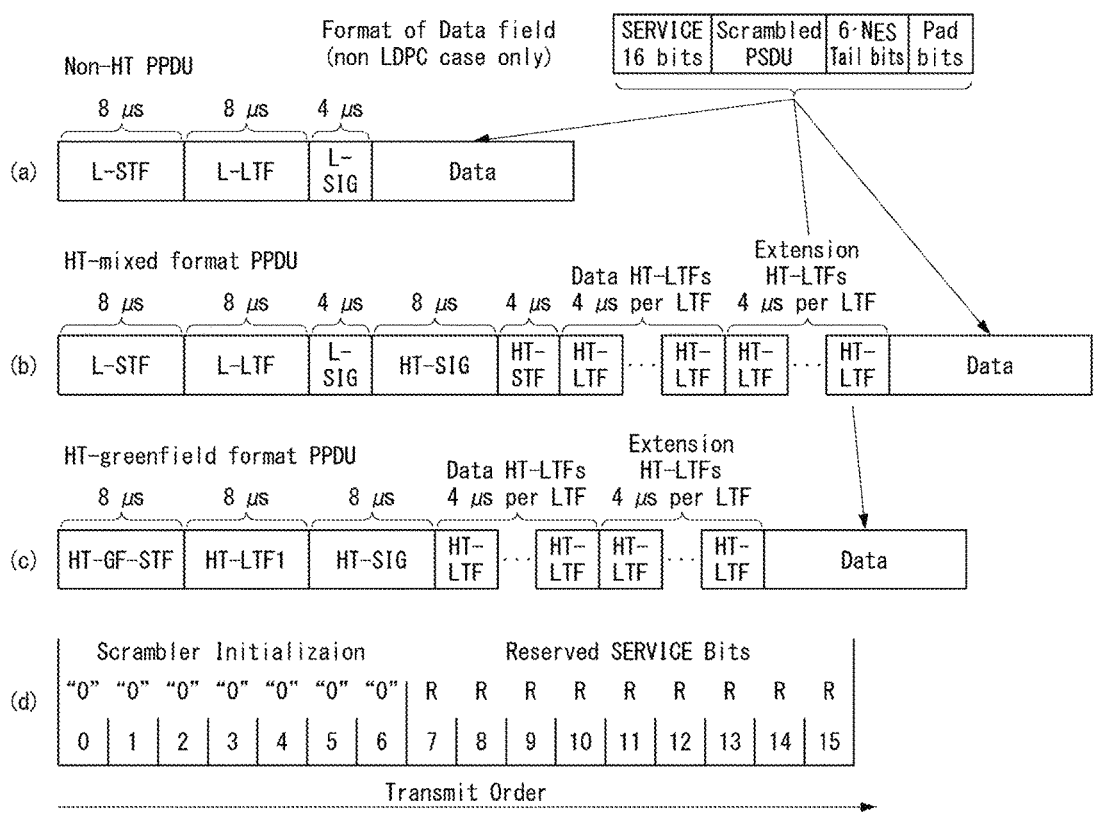

[Fig. 4]
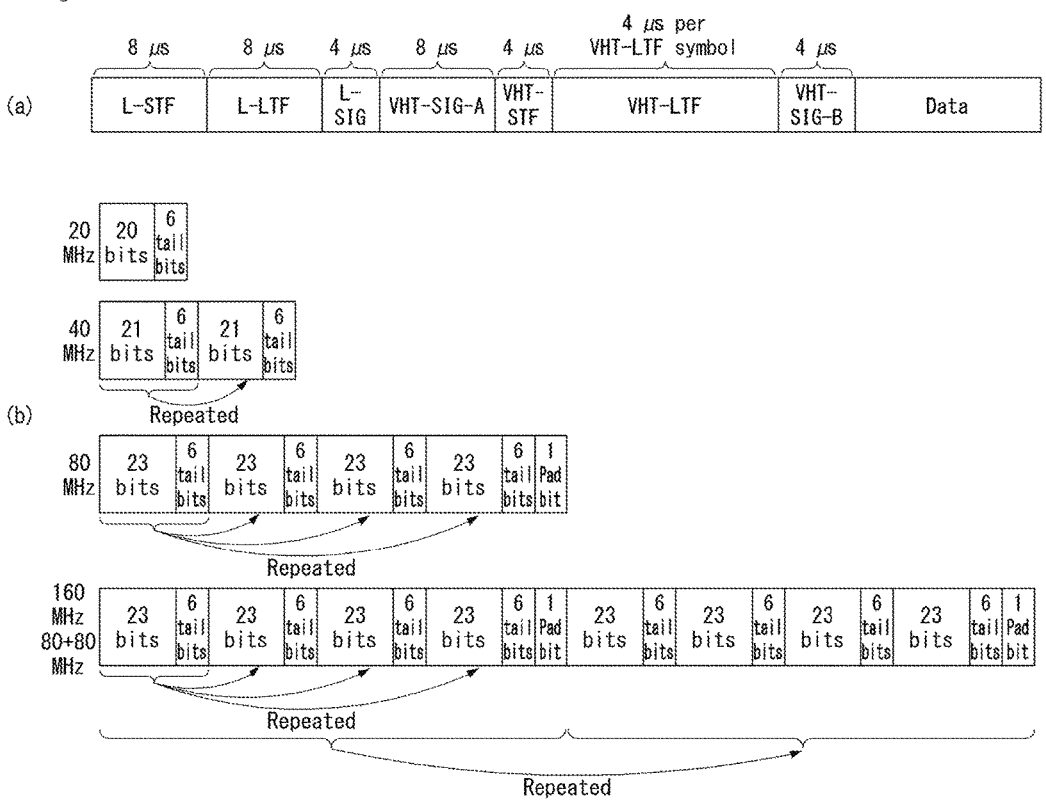

[Fig. 5]
(a) non-HT PPDU
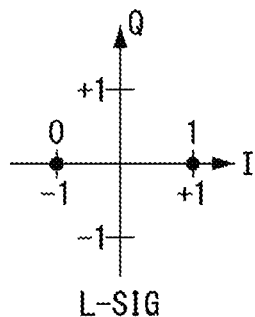
L-SIG
(b) HT-mixed PPDU
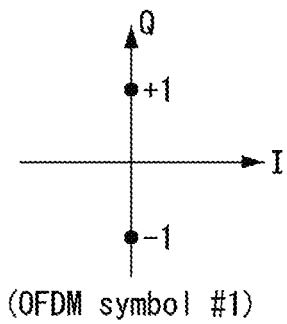 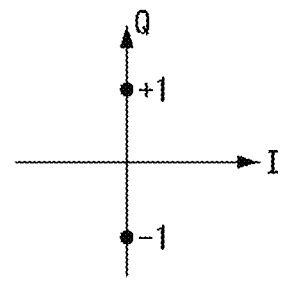
(OFDM symbol #1)   (OFDM symbol #2)
(c) VHT PPDU
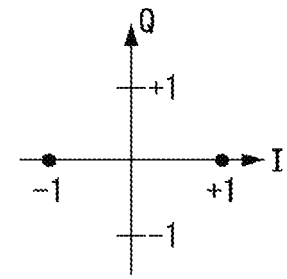 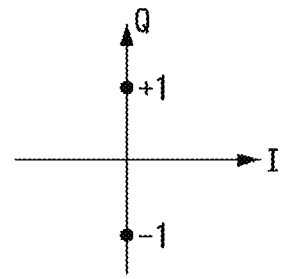
(OFDM symbol #1)   (OFDM symbol #2)

[Fig. 6]
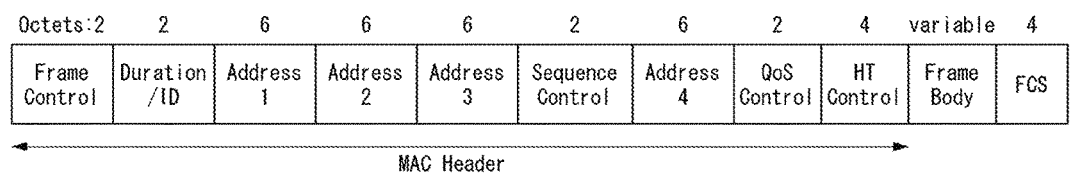
[Fig. 7]
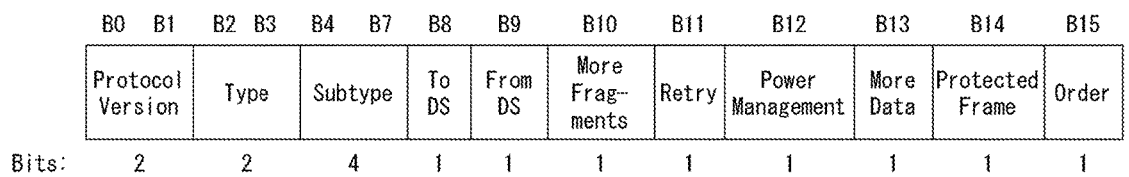

[Fig. 8]
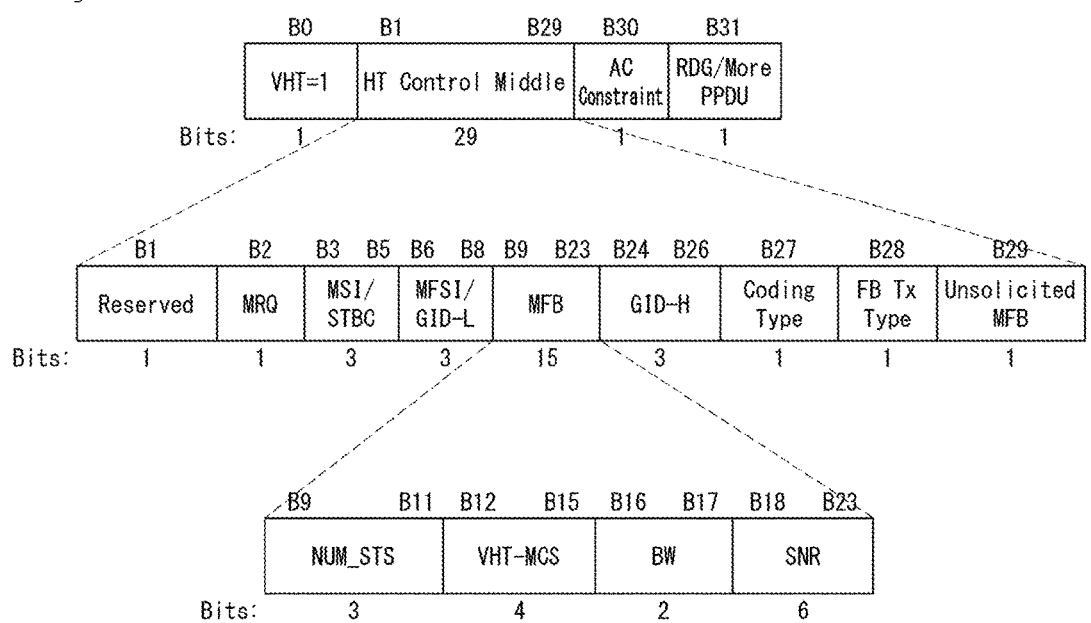

[Fig. 9]
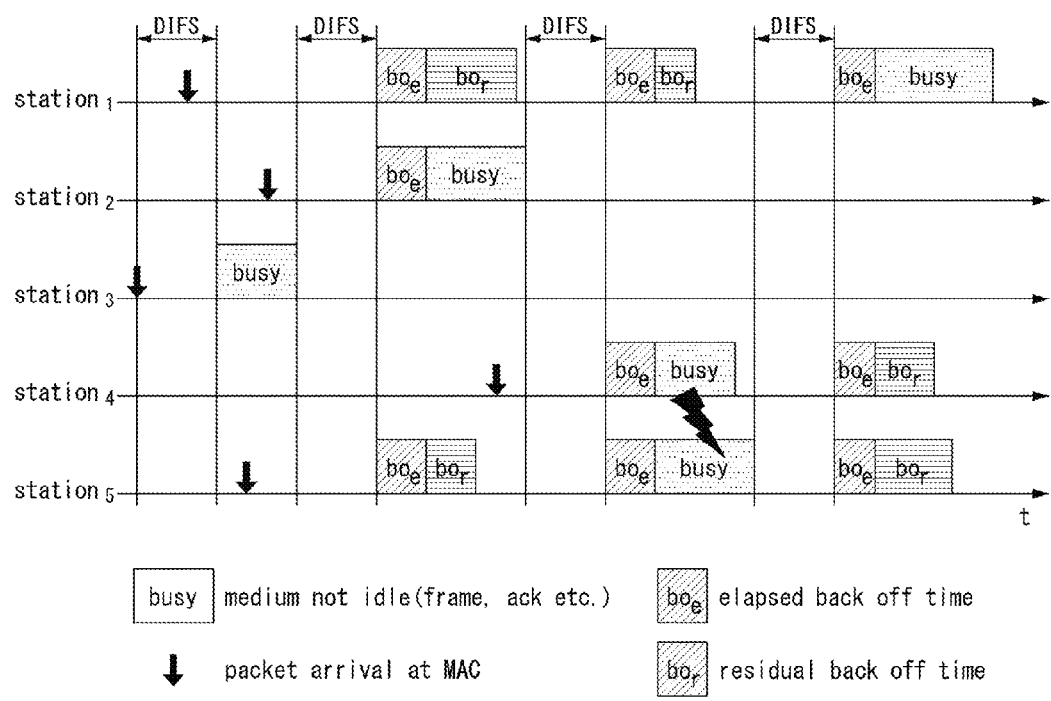

[Fig. 10]
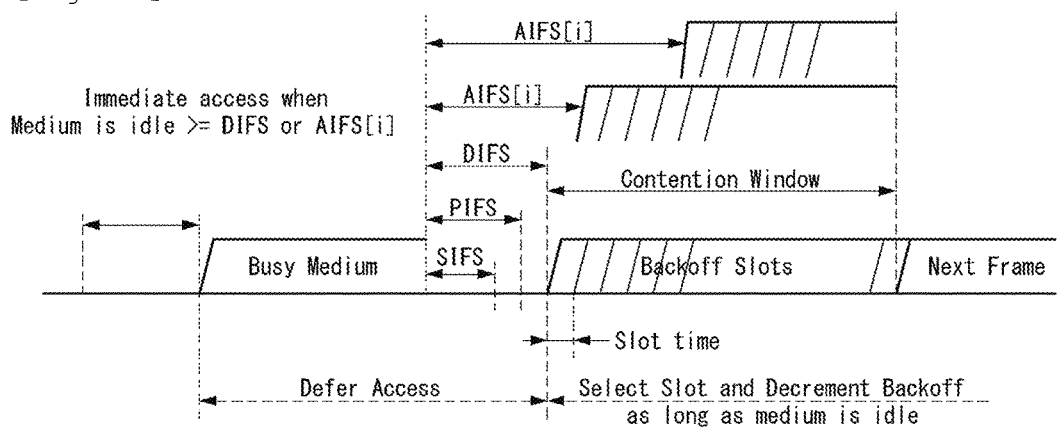

[Fig. 11]
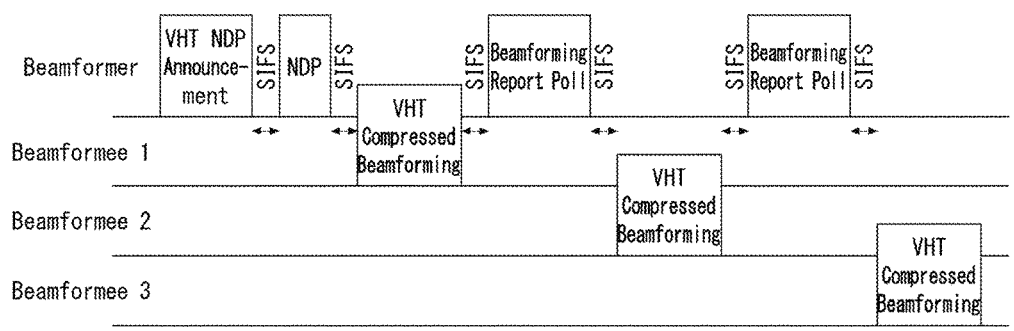
[Fig. 12]
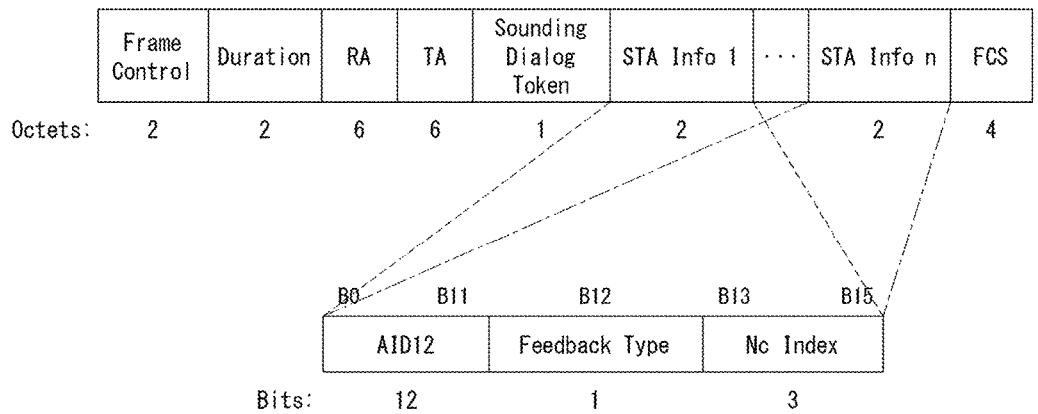

[Fig. 13]
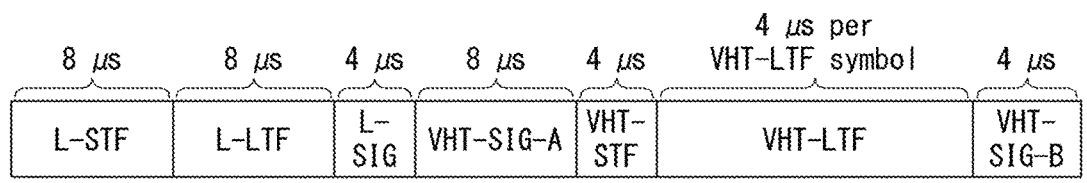

[Fig. 14]
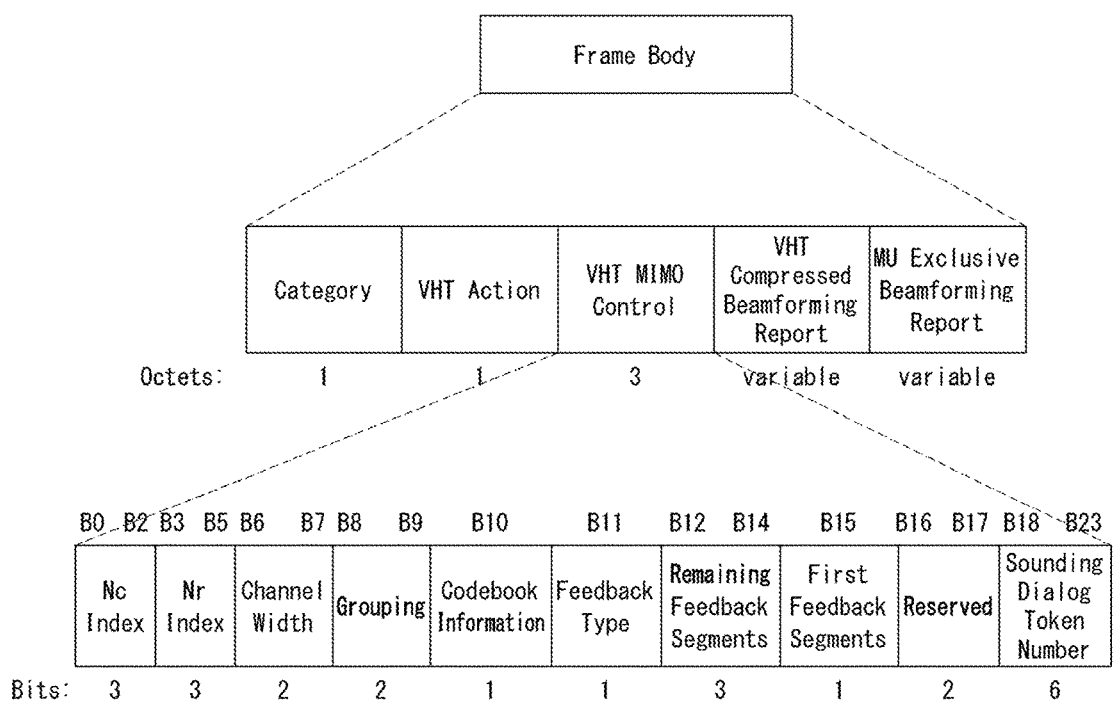

[Fig. 15]
| Frame Control | Duration | RA | TA | Feedback Segment Retransmission Bitmap | FCS |
|---|---|---|---|---|---|
| 2 | 2 | 6 | 6 | 1 | 4 |
Octets:
[Fig. 16]
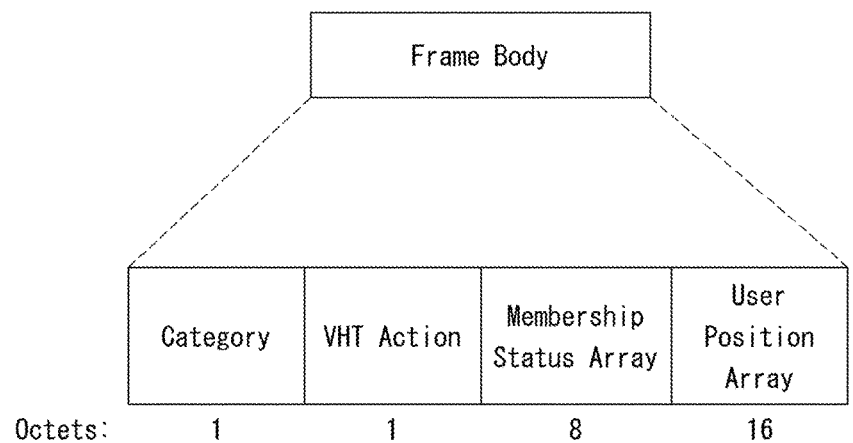

[Fig. 17]
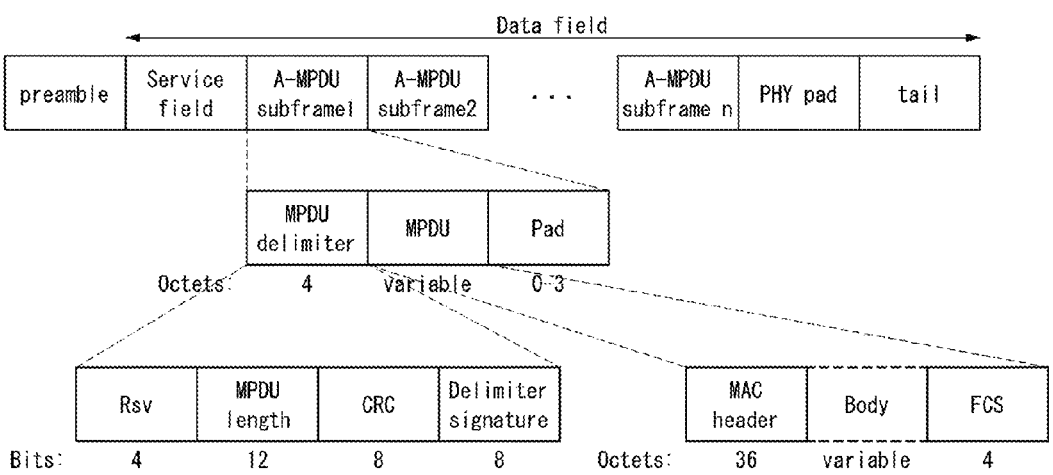

[Fig. 18]
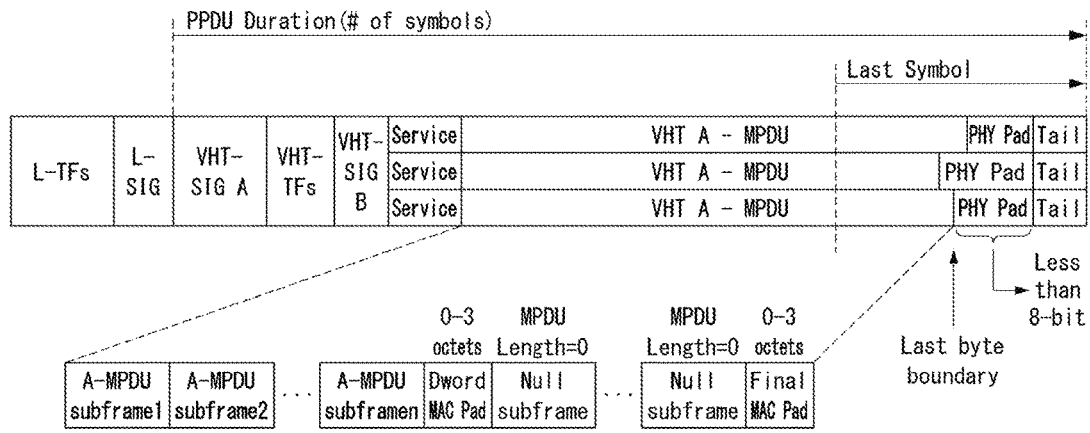

[Fig. 19]
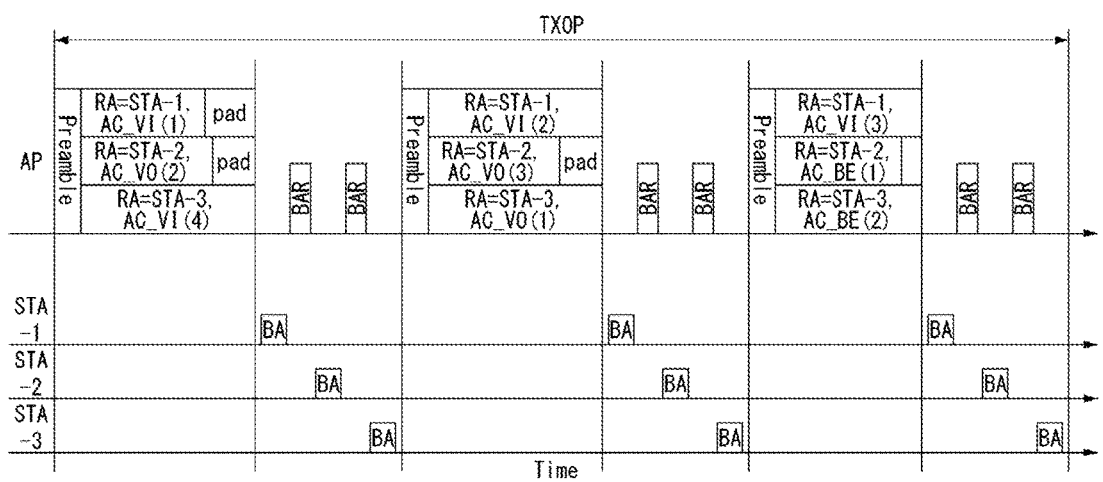

[Fig. 21]
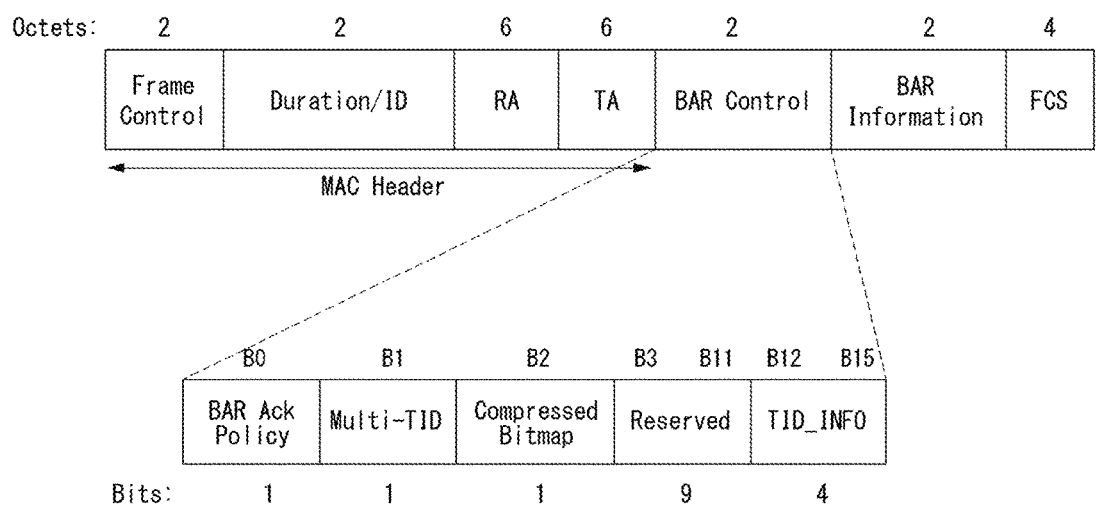

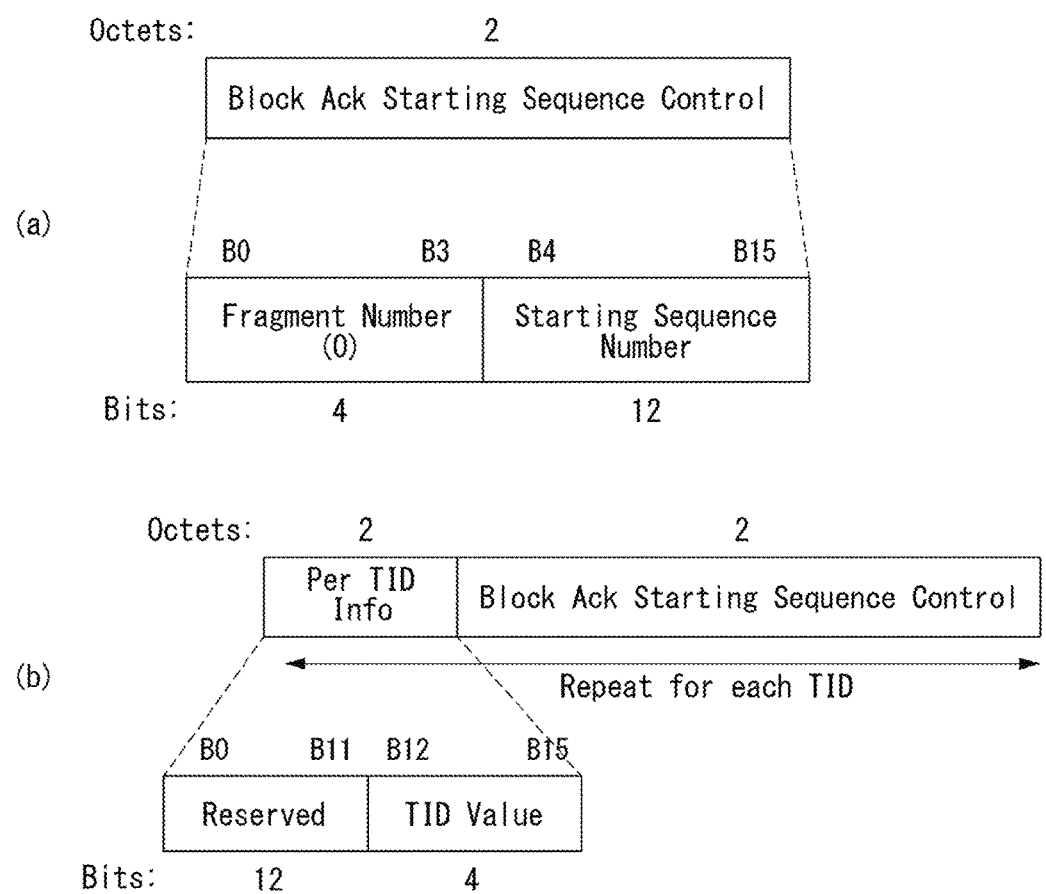
[Fig. 22]

[Fig. 23]
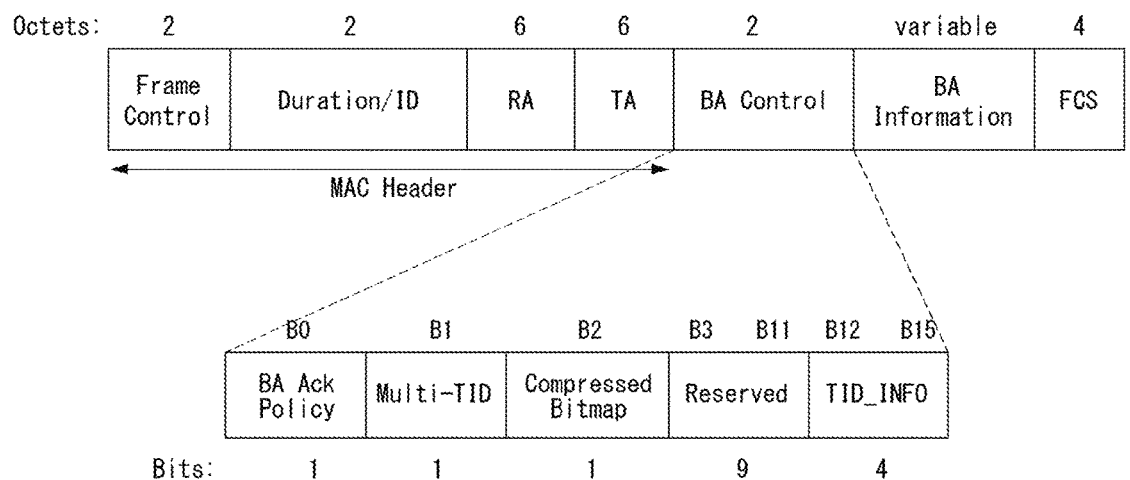

【Fig. 24】
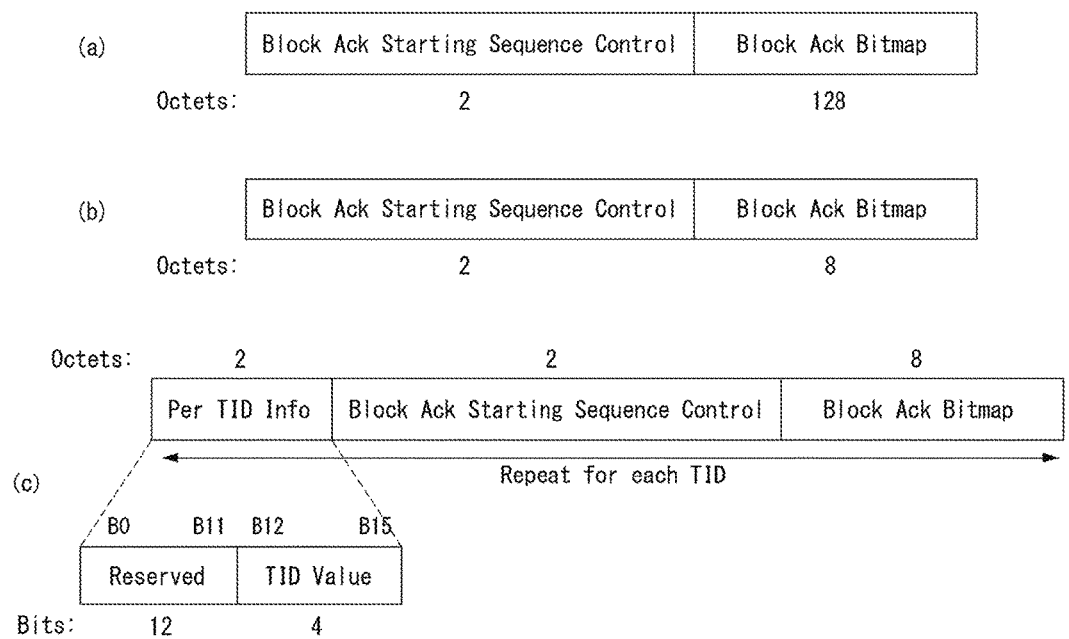

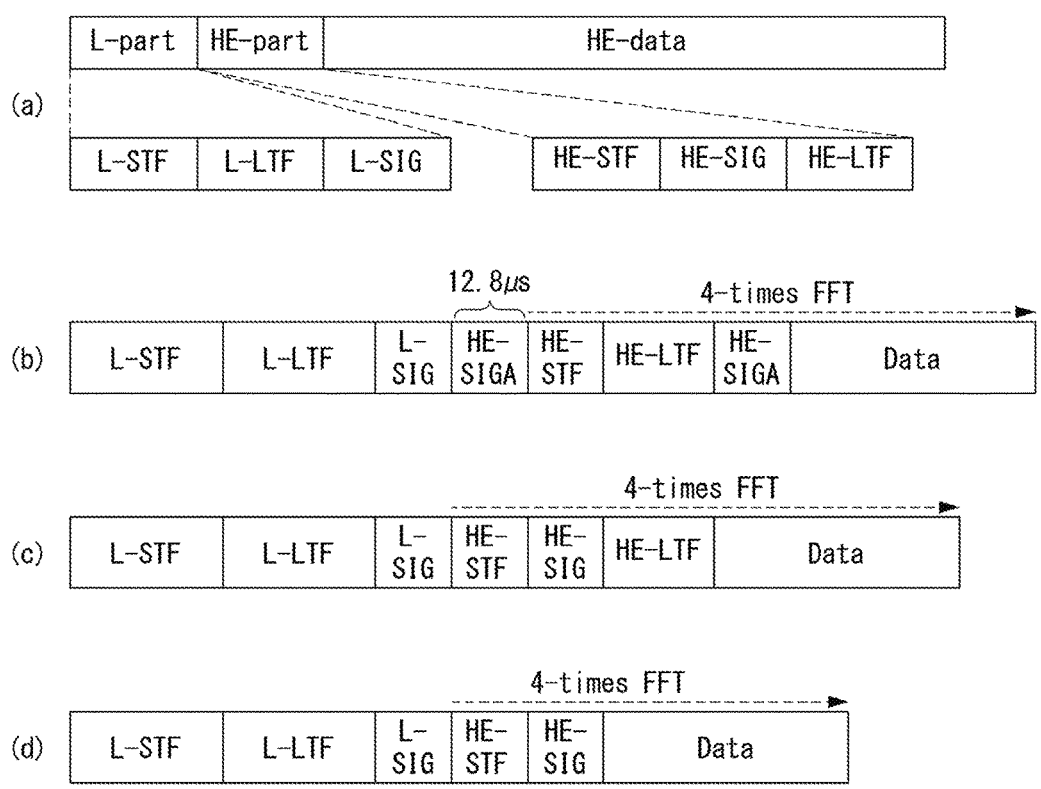
[Fig. 25]

[Fig. 26]

| L-STF | L-LTF | L-SIG | HE-SIG A | | | | |
|-------|-------|-------|----------|--------|--------|---------|------|
| L-STF | L-LTF | L-SIG | HE-SIG A | HE-STF | HE-LTF | HE-SIG B | Data |
| L-STF | L-LTF | L-SIG | HE-SIG A | | | | |
| L-STF | L-LTF | L-SIG | HE-SIG A | | | | |

[Fig. 27]

| L-STF | L-LTF | L-SIG | HE-SIG A | | | | |
|-------|-------|-------|----------|----------|--------|--------|------|
| L-STF | L-LTF | L-SIG | HE-SIG A | HE-SIG B | HE-STF | HE-LTF | Data |
| L-STF | L-LTF | L-SIG | HE-SIG A | | | | |
| L-STF | L-LTF | L-SIG | HE-SIG A | | | | |

【Fig. 28】

| L-STF | L-LTF | L-SIG | HE-SIG A |          | HE-STF | HE-LTF | Data for STA1 |
|-------|-------|-------|----------|----------|--------|--------|---------------|
| L-STF | L-LTF | L-SIG | HE-SIG A |          | HE-STF | HE-LTF | Data for STA2 |
| L-STF | L-LTF | L-SIG | HE-SIG A | HE-SIG B | HE-STF | HE-LTF | Data for STA3 |
| L-STF | L-LTF | L-SIG | HE-SIG A |          | HE-STF | HE-LTF | Data for STA4 |

【Fig. 29】

| L-STF | L-LTF | L-SIG | HE-SIG A | HE-SIG B | HE-STF | HE-LTF | Data for STA1 |
|-------|-------|-------|----------|----------|--------|--------|---------------|
| L-STF | L-LTF | L-SIG | HE-SIG A | HE-SIG B | HE-STF | HE-LTF | Data for STA2 |
| L-STF | L-LTF | L-SIG | HE-SIG A | HE-SIG B | HE-STF | HE-LTF | Data for STA3 |
| L-STF | L-LTF | L-SIG | HE-SIG A | HE-SIG B | HE-STF | HE-LTF | Data for STA4 |

[Fig. 30]
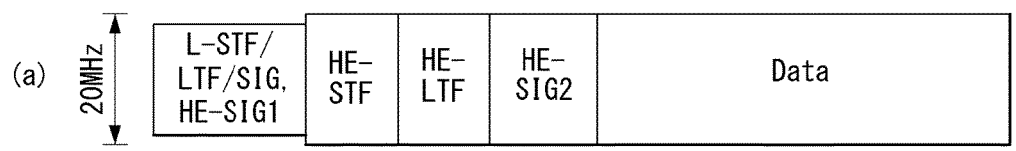
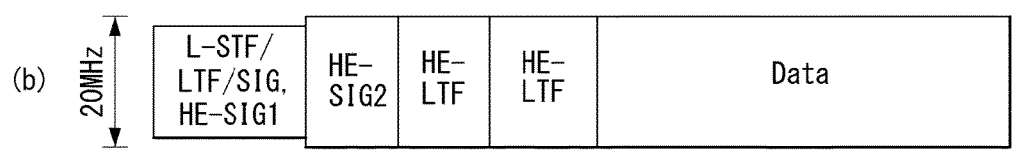
[Fig. 31]
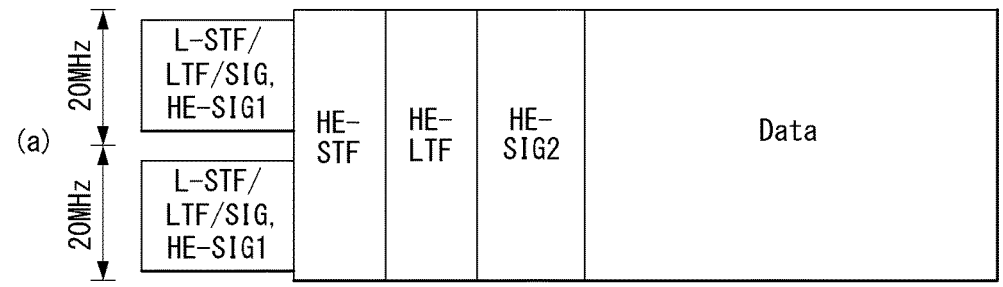
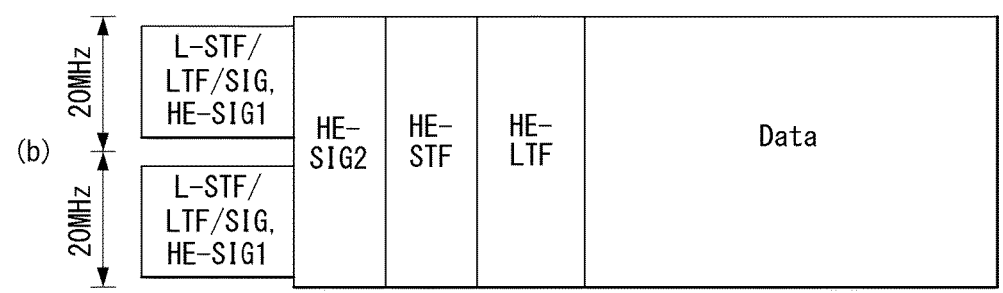

【Fig. 32】
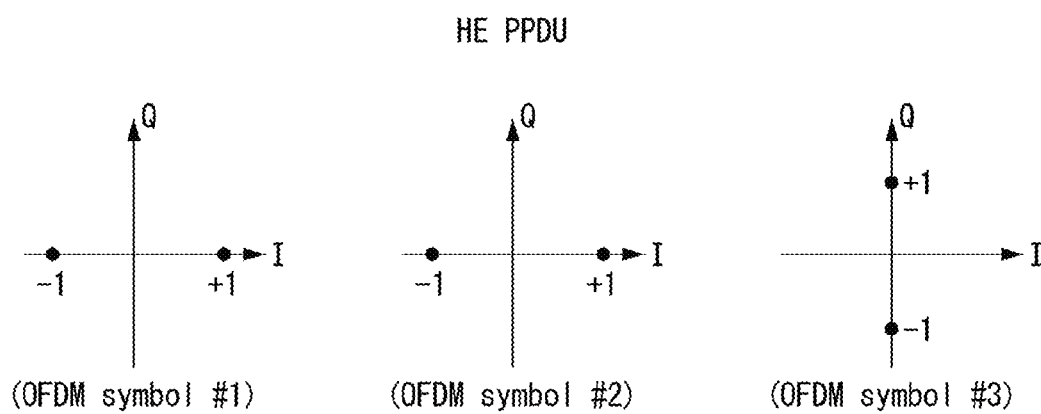

[Fig. 33]
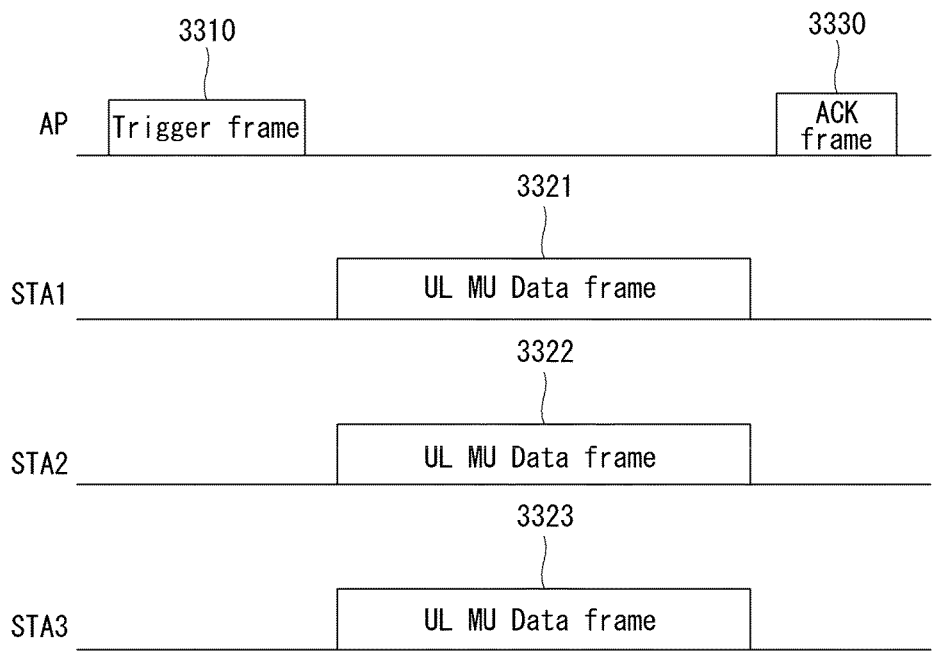
[Fig. 34]
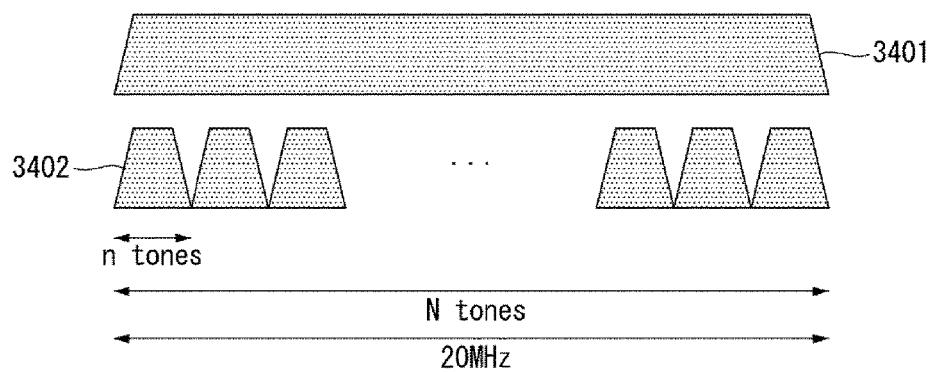

[Fig. 35]
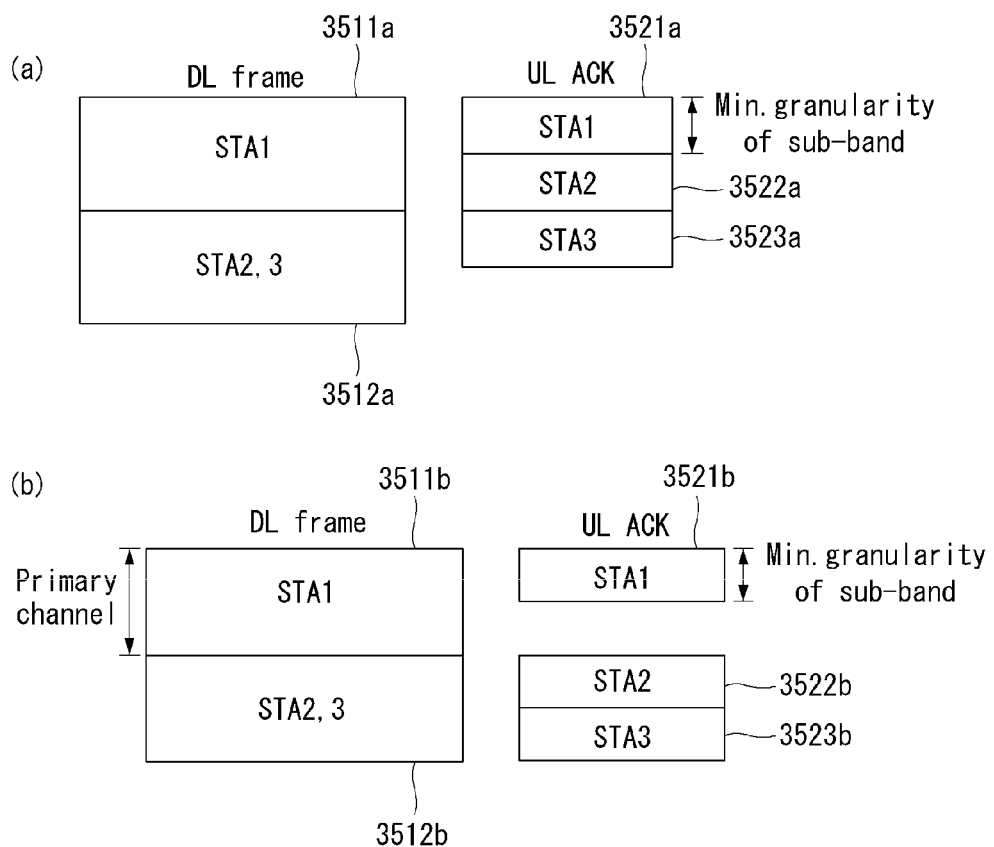

【Fig. 36】
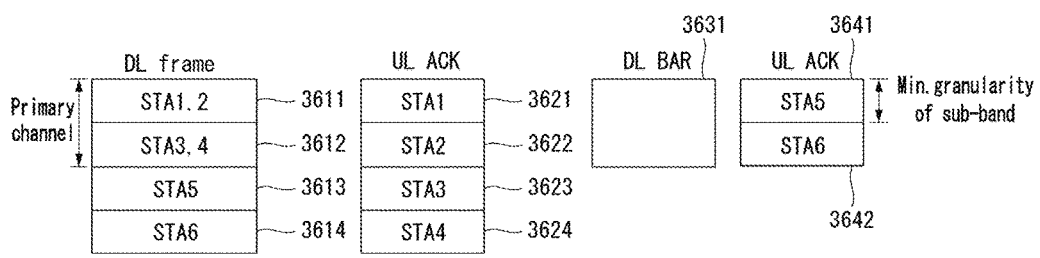
【Fig. 37】
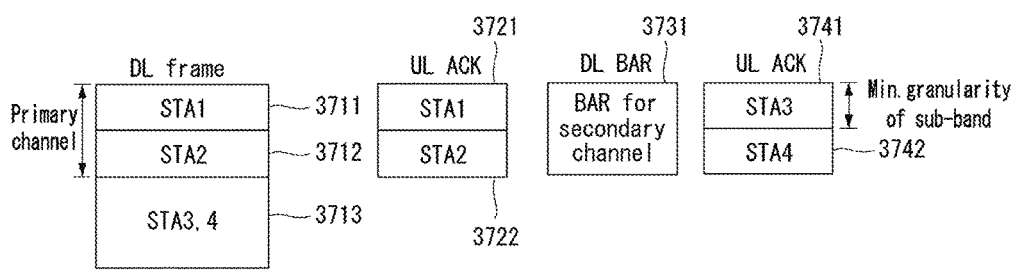

【Fig. 38】
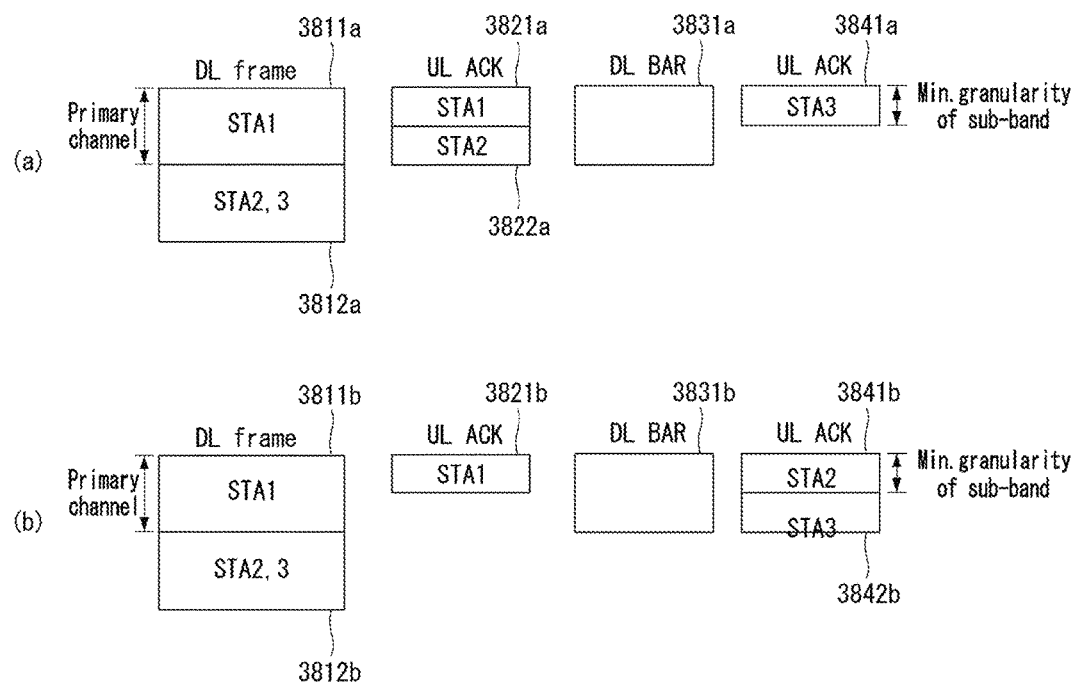

[Fig. 39]
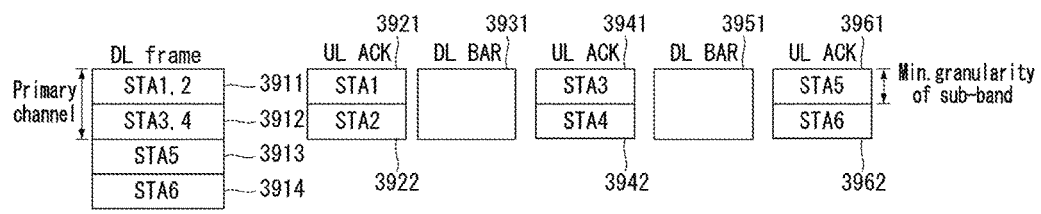
[Fig. 40]
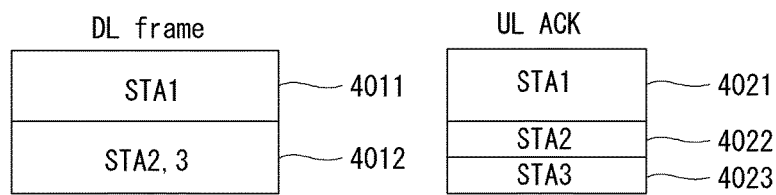

【Fig. 41】
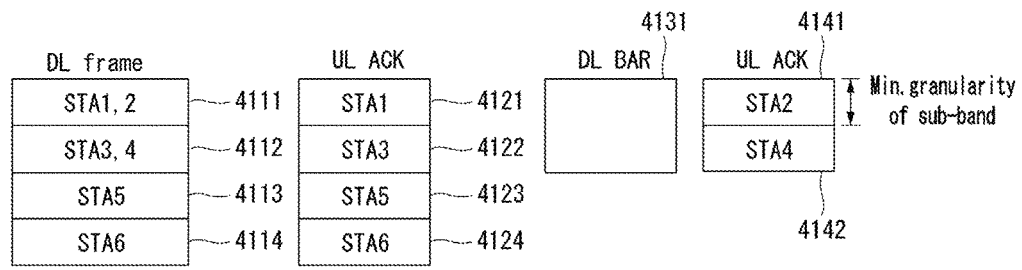
【Fig. 42】
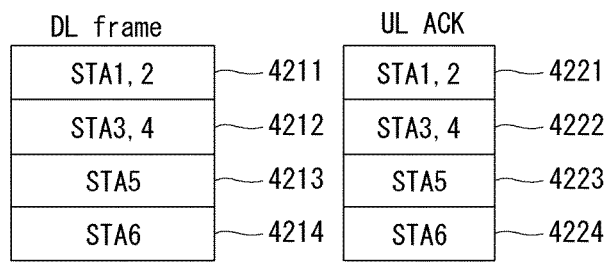
【Fig. 43】
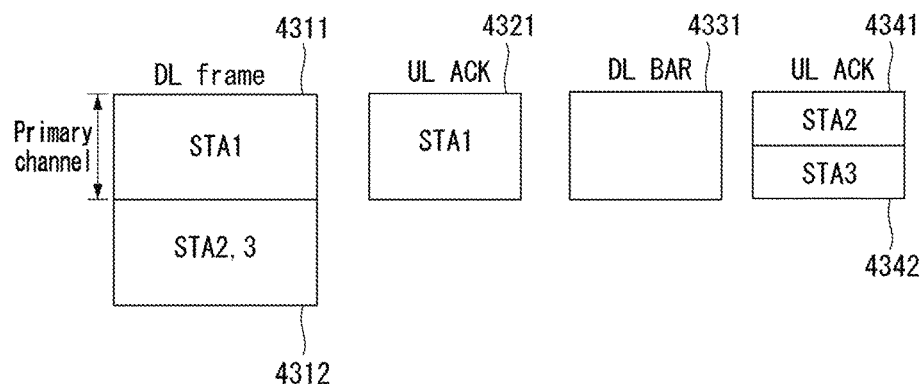

[Fig. 44]
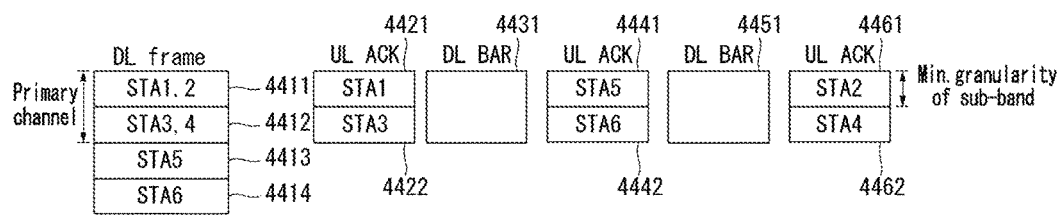
[Fig. 45]
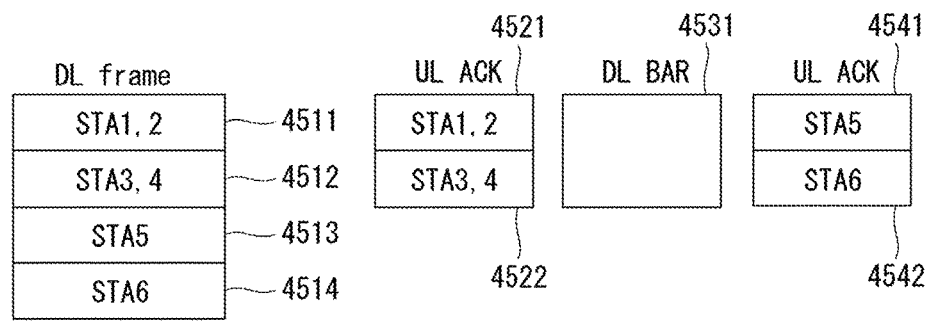

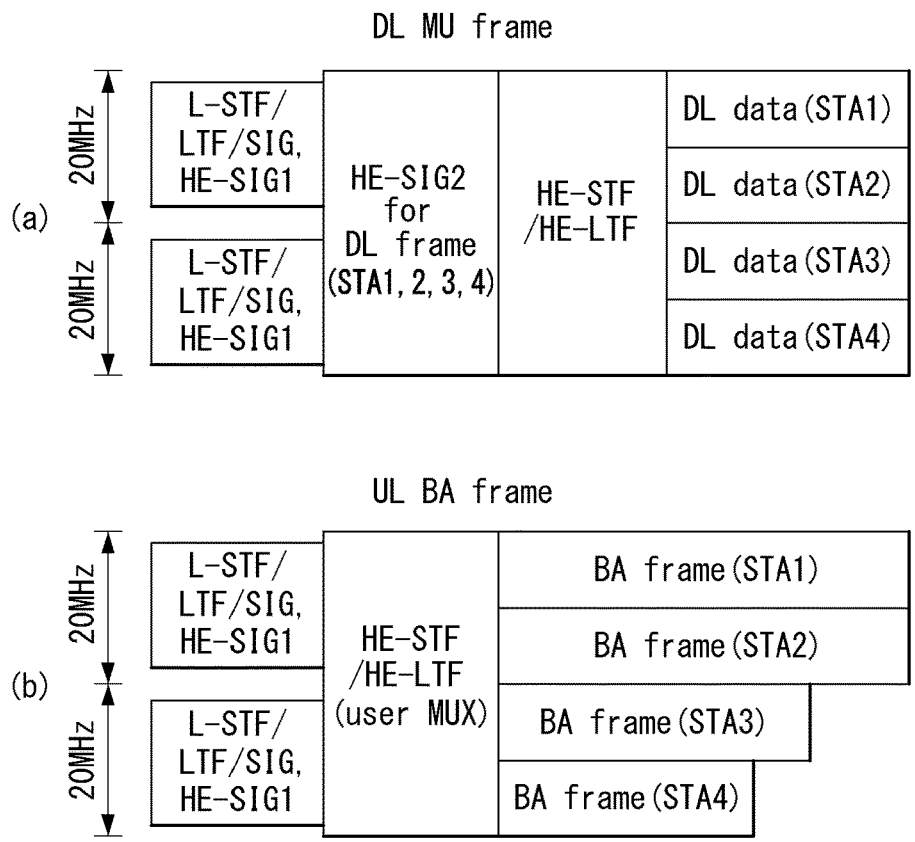
[Fig. 46]

[Fig. 47]
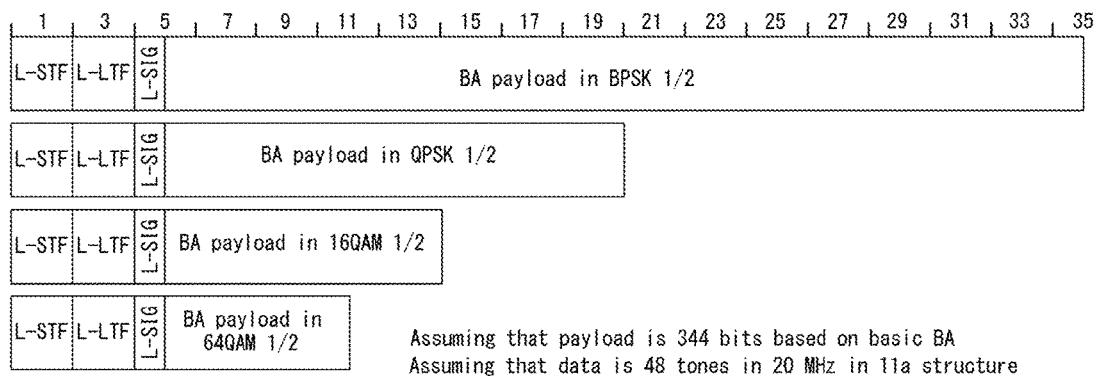
[Fig. 48]
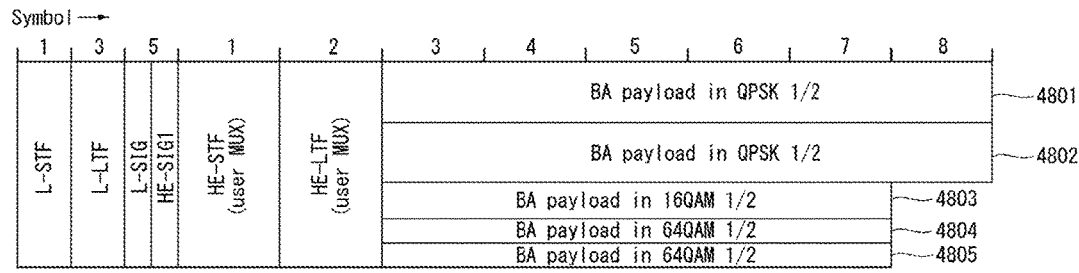

[Fig. 49]
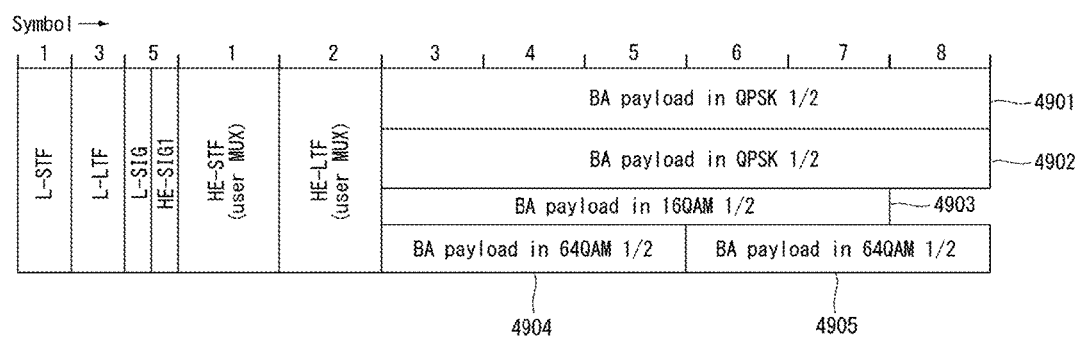

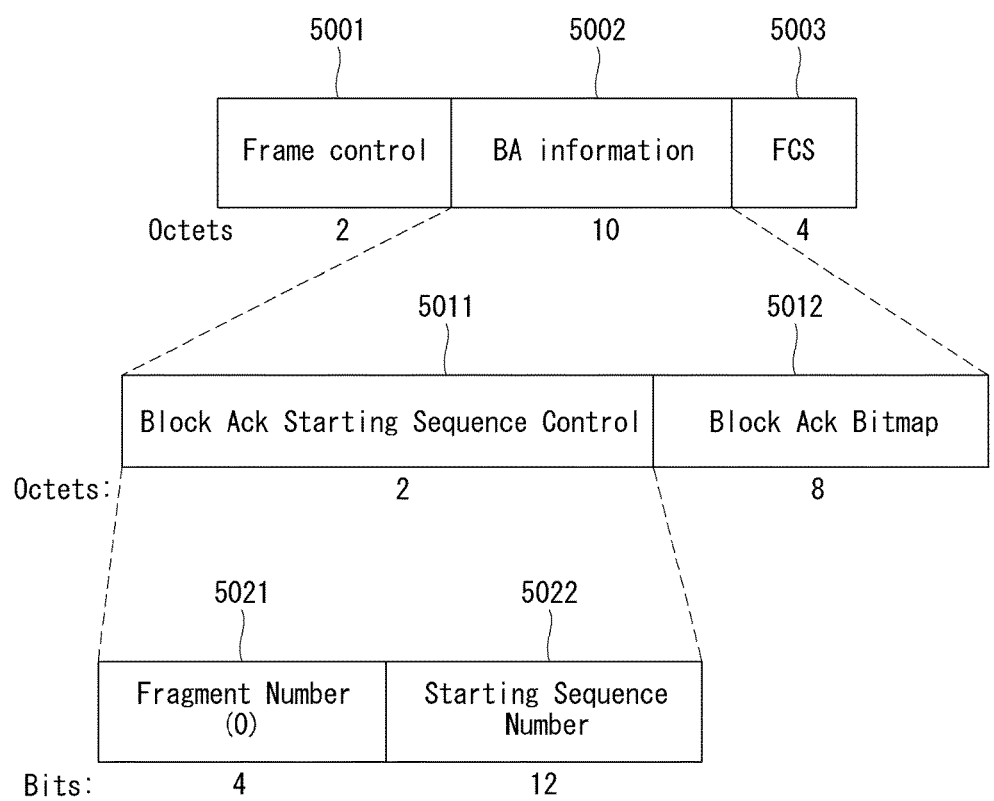
[Fig. 50]

[Fig. 51]
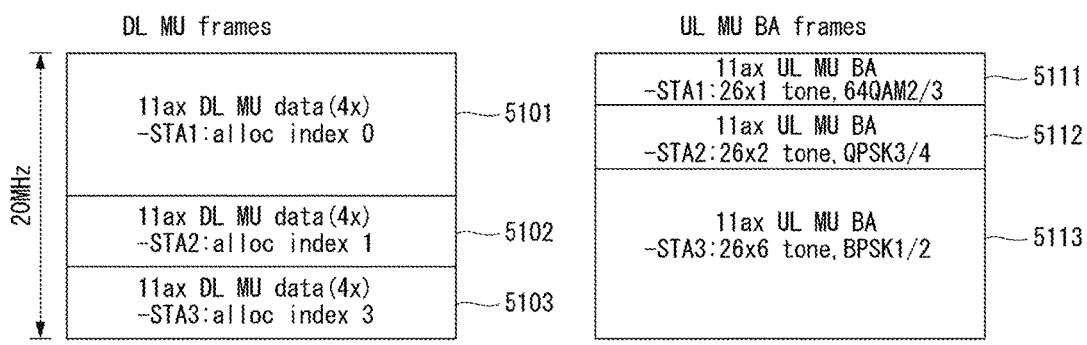

[Fig. 52]
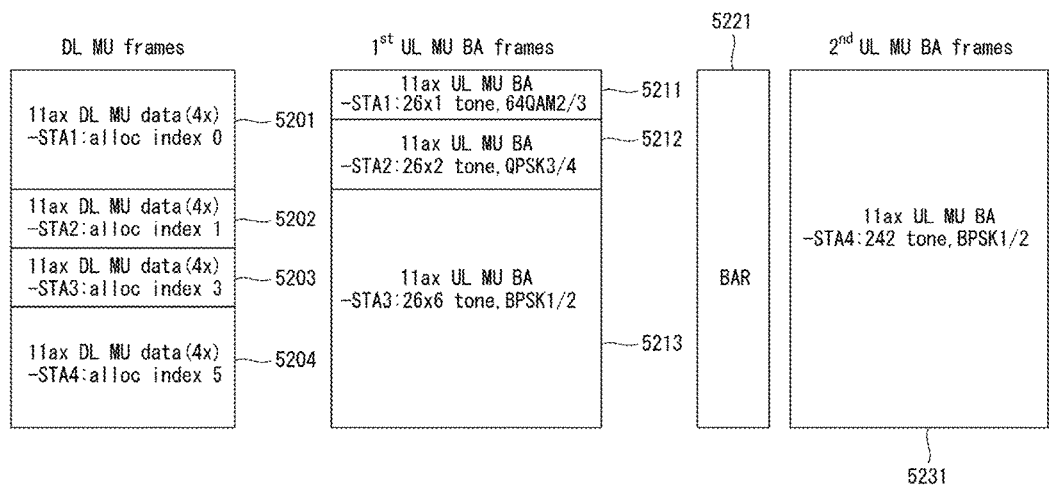
[Fig. 53]
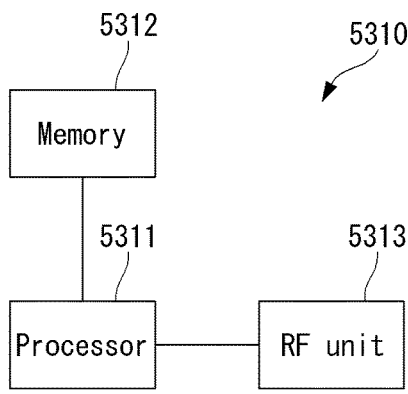

METHOD AND DEVICE FOR DOWNLINK MULTI-USER TRANSMISSION IN WIRELESS COMMUNICATION SYSTEM

CROSS-REFERENCE TO RELATED APPLICATIONS

This application is the National Stage filing under 35 U.S.C. 371 of International Application No. PCT/KR2015/008182, filed on Aug. 5, 2015, which claims the benefit of U.S. Provisional Application Nos. 62/036,605, filed on Aug. 12, 2014, 62/044,404, filed on Sep. 1, 2014 and 62/093,354, filed on Dec. 17, 2014, the contents of which are all hereby incorporated by reference herein in their entirety.

TECHNICAL FIELD

The present invention relates to a wireless communication system and, more particularly, to a method for supporting downlink multi-user transmission and an apparatus supporting the same.

BACKGROUND ART

Wi-Fi is a wireless local area network (WLAN) technology which enables a device to access the Internet in a frequency band of 2.4 GHz, 5 GHz or 60 GHz.

A WLAN is based on the institute of electrical and electronic engineers (IEEE) 802.11 standard. The wireless next generation standing committee (WNG SC) of IEEE 802.11 is an ad-hoc committee which is worried about the next-generation wireless local area network (WLAN) in the medium to longer term.

IEEE 802.11n has an object of increasing the speed and reliability of a network and extending the coverage of a wireless network. More specifically, IEEE 802.11n supports a high throughput (HT) providing a maximum data rate of 600 Mbps. Furthermore, in order to minimize a transfer error and to optimize a data rate, IEEE 802.11n is based on a multiple inputs and multiple outputs (MIMO) technology in which multiple antennas are used at both ends of a transmission unit and a reception unit.

As the spread of a WLAN is activated and applications using the WLAN are diversified, in the next-generation WLAN system supporting a very high throughput (VHT), IEEE 802.11ac has been newly enacted as the next version of an IEEE 802.11n WLAN system. IEEE 802.11ac supports a data rate of 1 Gbps or more through 80 MHz bandwidth transmission and/or higher bandwidth transmission (e.g., 160 MHz), and chiefly operates in a 5 GHz band.

Recently, a need for a new WLAN system for supporting a higher throughput than a data rate supported by IEEE 802.11ac comes to the fore.

The scope of IEEE 802.11ax chiefly discussed in the next-generation WLAN task group called a so-called IEEE 802.11ax or high efficiency (HEW) WLAN includes 1) the improvement of an 802.11 physical (PHY) layer and medium access control (MAC) layer in bands of 2.4 GHz, 5 GHz, etc., 2) the improvement of spectrum efficiency and area throughput, 3) the improvement of performance in actual indoor and outdoor environments, such as an environment in which an interference source is present, a dense heterogeneous network environment, and an environment in which a high user load is present and so on.

A scenario chiefly taken into consideration in IEEE 802.11ax is a dense environment in which many access points (APs) and many stations (STAs) are present. In IEEE 802.11ax, the improvement of spectrum efficiency and area throughput is discussed in such a situation. More specifically, there is an interest in the improvement of substantial performance in outdoor environments not greatly taken into consideration in existing WLANs in addition to indoor environments.

In IEEE 802.11ax, there is a great interest in scenarios, such as wireless offices, smart homes, stadiums, hotspots, and buildings/apartments. The improvement of system performance in a dense environment in which many APs and many STAs are present is discussed based on the corresponding scenarios.

In the future, it is expected in IEEE 802.11ax that the improvement of system performance in an overlapping basic service set (OBSS) environment, the improvement of an outdoor environment, cellular offloading, and so on rather than single link performance improvement in a single basic service set (BSS) will be actively discussed. The directivity of such IEEE 802.11ax means that the next-generation WLAN will have a technical scope gradually similar to that of mobile communication. Recently, when considering a situation in which mobile communication and a WLAN technology are discussed together in small cells and direct-to-direct (D2D) communication coverage, it is expected that the technological and business convergence of the next-generation WLAN based on IEEE 802.11ax and mobile communication will be further activated.

DISCLOSURE

Technical Problem

An embodiment of the present invention proposes a downlink (DL) multi-user (MU) transmission procedure in a wireless communication system.

Furthermore, an embodiment of the present invention proposes an uplink (UL) acknowledgement (ACK) frame structure for supporting DL MU transmission in a wireless communication system.

Technical objects to be achieved by the present invention are not limited to the aforementioned object, and those skilled in the art to which the present invention pertains may evidently understand other technological objects from the following description.

Technical Solution

In an aspect of the present invention, a method for downlink multi-user (DL MU) data transmission in a wireless communication system includes receiving, by a station (STA), a DL MU data frame from an access point (AP) and transmitting, by the STA, an acknowledgement (ACK) frame as a response to the DL MU data frame. A plurality of ACK frames transmitted by a plurality of the STAs as a response to the DL MU data frame may be multiplexed to form an uplink multi-user (UL MU) ACK frame. The size of time and/or frequency resources in which the ACK frame is transmitted may be determined depending on a modulation and coding scheme (MCS) level applied to the ACK frame.

In another aspect of the present invention, a station (STA) apparatus supporting downlink multi-user (DL MU) data transmission in a wireless communication system includes a radio frequency (RF) unit configured to send and receive a radio signal and a processor. The processor is configured to receive a DL MU data frame from an access point (AP) and to transmit an acknowledgement (ACK) frame as a response to the DL MU data frame. A plurality of ACK frames transmitted by a plurality of STAs as a response to the DL MU data frame may be multiplexed to form an uplink multi-user (UL MU) ACK frame. The size of time and/or frequency resources in which the ACK frame is transmitted may be determined depending on a modulation and coding scheme (MCS) level applied to the ACK frame.

The MCS level may be indicated in the DL MU data frame.

The MCS level may be indicated as a difference value with an MCS level applied to the DL MU data frame.

The method of claim 2, The MCS level may be included in the signal (SIG) field of the DL MU data frame or the media access control (MAC) header of the DL MU data frame.

The same MCS level and/or the same size of a resource region may be used in all of the ACK frames forming the UL MU ACK frame.

An MCS level and/or the size of a resource region used in the ACK frames forming the UL MU ACK frame are identically set in a channel bandwidth unit.

The MCS level may be determined to be identical with an MCS level applied to the DL MU data frame or determined to be the lowest coding rate in the same modulation scheme.

If the UL MU ACK frame is multiplexed with an UL data frame and transmitted, a region in which the ACK frame is transmitted may be indicated by the DL MU data frame.

The position of a frequency resource in which the ACK frame is transmitted may be determined in the sequence of STAs indicated in the DL MU data frame or determined to be identical with a frequency resource in which the DL MU data frame has been transmitted.

The ACK frame may be transmitted in a channel to which a frequency resource allocated to the STA belongs in the DL MU data frame.

If the number of STAs to which the DL MU data frame has been transmitted is greater than the number of minimum resource allocation units forming a channel bandwidth, an UL MU ACK frame including ACK frames corresponding to the number of minimum resource allocation units may be transmitted, and an UL MU ACK frame including the remaining ACK frames after a block acknowledgement (ACK) request frame transmitted by the AP may be transmitted.

The UL MU ACK frame may be transmitted only in a primary channel.

If the ACK frame is a block acknowledgement (BA) frame, the BA frame may include a frame control field, a BA information field, and a frame check sequence only.

Advantageous Effects

In accordance with an embodiment of the present invention, DL MU transmission can be smoothly performed using different and independent resources in a wireless communication system.

Furthermore, in accordance with an embodiment of the present invention, multiple users can smoothly transmit ACK information as a response to DL MU transmission in a wireless communication system.

Advantages which may be obtained in the present invention are not limited to the aforementioned advantages, and various other advantages may be evidently understood by those skilled in the art to which the present invention pertains from the following description.

DESCRIPTION OF DRAWINGS

The accompany drawings, which are included to provide a further understanding of the present invention and are incorporated on and constitute a part of this specification illustrate embodiments of the present invention and together with the description serve to explain the principles of the present invention.

FIG. 1 is a diagram showing an example of an IEEE 802.11 system to which an embodiment of the present invention may be applied.

FIG. 2 is a diagram illustrating the structure of layer architecture in an IEEE 802.11 system to which an embodiment of the present invention may be applied.

FIG. 3 illustrates a non-HT format PPDU and HT format PPDU in a wireless communication system to which an embodiment of the present invention may be applied.

FIG. 4 illustrates a VHT format PPDU format in a wireless communication system to which an embodiment of the present invention may be applied.

FIG. 5 is a diagram illustrating a constellation for classifying the formats of PPDUs in a wireless communication system to which an embodiment of the present invention may be applied.

FIG. 6 illustrates the format of an MAC frame of an IEEE 802.11 system to which an embodiment of the present invention may be applied.

FIG. 7 is a diagram illustrating a frame control field within a MAC frame in a wireless communication system to which an embodiment of the present invention may be applied.

FIG. 8 illustrates a VHT format of an HT control field in a wireless communication system to which an embodiment of the present invention may be applied.

FIG. 9 is a diagram for illustrating a random backoff period and a frame transmission procedure in a wireless communication system to which an embodiment of the present invention may be applied.

FIG. 10 is a diagram illustrating an IFS relation in a wireless communication system to which an embodiment of the present invention may be applied.

FIG. 11 is a diagram conceptually showing a channel sounding method in a wireless communication system to which an embodiment of the present invention may be applied.

FIG. 12 is a diagram illustrating a VHT NDPA frame in a wireless communication system to which an embodiment of the present invention may be applied.

FIG. 13 is a diagram illustrating an NDP PPDU in a wireless communication system to which an embodiment of the present invention may be applied.

FIG. 14 is a diagram illustrating the format of a VHT compressed beamforming frame in a wireless communication system to which an embodiment of the present invention may be applied.

FIG. 15 is a diagram illustrating the format of a beamforming report poll frame in a wireless communication system to which an embodiment of the present invention may be applied.

FIG. 16 is a diagram illustrating a group ID management frame in a wireless communication system to which an embodiment of the present invention may be applied.

FIG. 17 is a diagram illustrating a DL MU PPDU format in a wireless communication system to which an embodiment of the present invention may be applied.

FIG. 18 is a diagram illustrating a DL MU PPDU format in a wireless communication system to which an embodiment of the present invention may be applied.

FIG. 19 is a diagram illustrating a DL MU-MIMO transmission process in a wireless communication system to which an embodiment of the present invention may be applied.

FIG. 21 is a diagram illustrating a block ACK request frame in a wireless communication system to which an embodiment of the present invention may be applied.

FIG. 22 is a diagram illustrating the BAR information field of a block ACK request frame in a wireless communication system to which an embodiment of the present invention may be applied.

FIG. 23 is a diagram illustrating a block ACK frame in a wireless communication system to which an embodiment of the present invention may be applied.

FIG. 24 is a diagram illustrating the BA Information field of a block ACK frame in a wireless communication system to which an embodiment of the present invention may be applied.

FIG. 25 is a diagram illustrating a high efficiency (HE) format PPDU according to an embodiment of the present invention.

FIGS. 26 to 29 are diagrams illustrating HE format PPDUs according to embodiments of the present invention.

FIG. 30 is a diagram illustrating an HE format PPDU of a 20 MHz band according to an embodiment of the present invention.

FIG. 31 is a diagram illustrating an HE format PPDU of a 40 MHz band according to an embodiment of the present invention.

FIG. 32 illustrates a phase rotation for detecting an HE format PPDU according to an embodiment of the present invention.

FIG. 33 is a diagram illustrating an UL MU transmission procedure according to an embodiment of the present invention.

FIG. 34 is a diagram illustrating a resource allocation unit an OFDMA MU transmission method according to an embodiment of the present invention.

FIGS. 35 to 45 are diagrams illustrating DL MU transmission methods according to embodiments of the present invention.

FIG. 46 is a diagram illustrating an UL block ACK frame in DL MU transmission.

FIG. 47 is a diagram illustrating a frame length according to the MCS of a block ACK frame.

FIGS. 48 and 49 are diagrams illustrating UL MU ACK frames according to embodiments of the present invention.

FIG. 50 is a diagram illustrating a BA frame for DL MU transmission according to an embodiment of the present invention.

FIGS. 51 and 52 are diagrams illustrating a DL MU transmission method according to an embodiment of the present invention.

FIG. 53 is a block diagram illustrating a wireless apparatus according to an embodiment of the present invention.

MODE FOR INVENTION

Figure 20:
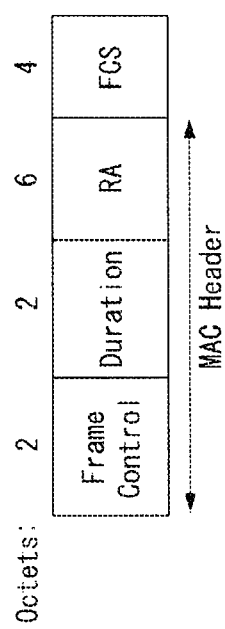
FIG. 20 is a diagram illustrating an ACK frame in a wireless communication system to which an embodiment of the present invention may be applied.

Hereinafter, some embodiments of the present invention are described in detail with reference to the accompanying drawings. The detailed description to be disclosed herein along with the accompanying drawings is provided to describe exemplary embodiments of the present invention and is not intended to describe a sole embodiment in which the present invention may be implemented. The following detailed description includes detailed contents in order to provide complete understanding of the present invention. However, those skilled in the art will appreciate that the present invention may be implemented even without such detailed contents.

In some cases, in order to avoid making the concept of the present invention vague, the known structure and/or device may be omitted or may be illustrated in the form of a block diagram based on the core function of each structure and/or device.

Furthermore, specific terms used in the following description are provided to help understanding of the present invention, and such specific terms may be changed into other forms without departing from the technological spirit of the present invention.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for Mobile communications (GSM)/general packet radio service (GPRS)/enhanced data rates for GSM evolution (EDGE). OFDMA may be implemented using a radio technology, such as institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). $3^{rd}$ generation partnership project (3GPP) long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System

FIG. 1 is a diagram showing an example of an IEEE 802.11 system to which an embodiment of the present invention may be applied.

The IEEE 802.11 configuration may include a plurality of elements. There may be provided a wireless communication system supporting transparent station (STA) mobility for a higher layer through an interaction between the elements. A basic service set (BSS) may correspond to a basic configuration block in an IEEE 802.11 system.

FIG. 1 illustrates that three BSSs BSS 1 to BSS 3 are present and two STAs (e.g., an STA 1 and an STA 2 are included in the BSS 1, an STA 3 and an STA 4 are included in the BSS 2, and an STA 5 and an STA 6 are included in the BSS 3) are included as the members of each BSS.

In FIG. 1, an ellipse indicative of a BSS may be interpreted as being indicative of a coverage area in which STAs included in the corresponding BSS maintain communication. Such an area may be called a basic service area (BSA). When an STA moves outside the BSA, it is unable to directly communicate with other STAs within the corresponding BSA.

In the IEEE 802.11 system, the most basic type of a BSS is an independent a BSS (IBSS). For example, an IBSS may have a minimum form including only two STAs. Furthermore, the BSS 3 of FIG. 1 which is the simplest form and from which other elements have been omitted may correspond to a representative example of the IBSS. Such a configuration may be possible if STAs can directly communicate with each other. Furthermore, a LAN of such a form is not previously planned and configured, but may be configured when it is necessary. This may also be called an ad-hoc network.

When an STA is powered off or on or an STA enters into or exits from a BSS area, the membership of the STA in the BSS may be dynamically changed. In order to become a member of a BSS, an STA may join the BSS using a synchronization process. In order to access all of services in a BSS-based configuration, an STA needs to be associated with the BSS. Such association may be dynamically configured, and may include the use of a distribution system service (DSS).

In an 802.11 system, the distance of a direct STA-to-STA may be constrained by physical layer (PHY) performance. In any case, the limit of such a distance may be sufficient, but communication between STAs in a longer distance may be required, if necessary. In order to support extended coverage, a distribution system (DS) may be configured.

The DS means a configuration in which BSSs are interconnected. More specifically, a BSS may be present as an element of an extended form of a network including a plurality of BSSs instead of an independent BSS as in FIG. 1.

The DS is a logical concept and may be specified by the characteristics of a distribution system medium (DSM). In the IEEE 802.11 standard, a wireless medium (WM) and a distribution system medium (DSM) are logically divided. Each logical medium is used for a different purpose and used by a different element. In the definition of the IEEE 802.11 standard, such media are not limited to the same one and are also not limited to different ones. The flexibility of the configuration (i.e., a DS configuration or another network configuration) of an IEEE 802.11 system may be described in that a plurality of media is logically different as described above. That is, an IEEE 802.11 system configuration may be implemented in various ways, and a corresponding system configuration may be independently specified by the physical characteristics of each implementation example.

The DS can support a mobile device by providing the seamless integration of a plurality of BSSs and providing logical services required to handle an address to a destination.

An AP means an entity which enables access to a DS through a WM with respect to associated STAs and has the STA functionality. The movement of data between a BSS and the DS can be performed through an AP. For example, each of the STA 2 and the STA 3 of FIG. 1 has the functionality of an STA and provides a function which enables associated STAs (e.g., the STA 1 and the STA 4) to access the DS. Furthermore, all of APs basically correspond to an STA, and thus all of the APs are entities capable of being addressed. An address used by an AP for communication on a WM and an address used by an AP for communication on a DSM may not need to be necessarily the same.

Data transmitted from one of STAs, associated with an AP, to the STA address of the AP may be always received by an uncontrolled port and processed by an IEEE 802.1X port access entity. Furthermore, when a controlled port is authenticated, transmission data (or frame) may be delivered to a DS.

A wireless network having an arbitrary size and complexity may include a DS and BSSs. In an IEEE 802.11 system, a network of such a method is called an extended service set (ESS) network. The ESS may correspond to a set of BSSs connected to a single DS. However, the ESS does not include a DS. The ESS network is characterized in that it looks like an IBSS network in a logical link control (LLC) layer. STAs included in the ESS may communicate with each other. Mobile STAs may move from one BSS to the other BSS (within the same ESS) in a manner transparent to the LLC layer.

In an IEEE 802.11 system, the relative physical positions of BSSs in FIG. 1 are not assumed, and the following forms are all possible.

More specifically, BSSs may partially overlap, which is a form commonly used to provide consecutive coverage. Furthermore, BSSs may not be physically connected, and logically there is no limit to the distance between BSSs. Furthermore, BSSs may be placed in the same position physically and may be used to provide redundancy. Furthermore, one (or one or more) IBSS or ESS networks may be physically present in the same space as one or more ESS networks. This may correspond to an ESS network form if an ad-hoc network operates at the position in which an ESS network is present, if IEEE 802.11 networks that physically overlap are configured by different organizations, or if two or more different access and security policies are required at the same position.

In a WLAN system, an STA is an apparatus operating in accordance with the medium access control (MAC)/PHY regulations of IEEE 802.11. An STA may include an AP STA and a non-AP STA unless the functionality of the STA is not individually different from that of an AP. In this case, assuming that communication is performed between an STA and an AP, the STA may be interpreted as being a non-AP STA. In the example of FIG. 1, the STA 1, the STA 4, the STA 5, and the STA 6 correspond to non-AP STAs, and the STA 2 and the STA 3 correspond to AP STAs.

A non-AP STA corresponds to an apparatus directly handled by a user, such as a laptop computer or a mobile phone. In the following description, a non-AP STA may also be called a wireless device, a terminal, user equipment (UE), a mobile station (MS), a mobile terminal, a wireless terminal, a wireless transmit/receive unit (WTRU), a network interface device, a machine-type communication (MTC) device, a machine-to-machine (M2M) device or the like.

Furthermore, an AP is a concept corresponding to a base station (BS), a node-B, an evolved Node-B (eNB), a base transceiver system (BTS), a femto BS or the like in other wireless communication fields.

Hereinafter, in this specification, downlink (DL) means communication from an AP to a non-AP STA. Uplink (UL) means communication from a non-AP STA to an AP. In DL, a transmitter may be part of an AP, and a receiver may be part of a non-AP STA. In UL, a transmitter may be part of a non-AP STA, and a receiver may be part of an AP.

FIG. 2 is a diagram illustrating the configuration of layer architecture of an IEEE 802.11 system to which an embodiment of the present invention may be applied.

Referring to FIG. 2, the layer architecture of the IEEE 802.11 system may include an MAC sublayer and a PHY sublayer.

The PHY sublayer may be divided into a physical layer convergence procedure (PLCP) entity and a physical medium dependent (PMD) entity. In this case, the PLCP entity functions to connect the MAC sublayer and a data frame, and the PMD entity functions to wirelessly transmit and receive data to and from two or more STAs.

The MAC sublayer and the PHY sublayer may include respective management entities, which may be referred to as an MAC sublayer management entity (MLME) and a PHY sublayer management entity (PLME), respectively. The management entities provide a layer management service interface through the operation of a layer management function. The MLME is connected to the PLME and may perform the management operation of the MAC sublayer. Likewise, the PLME is also connected to the MLME and may perform the management operation of the PHY sublayer.

In order to provide a precise MAC operation, a station management entity (SME) may be present in each STA. The SME is a management entity independent of each layer, and collects layer-based state information from the MLME and the PLME or sets the values of layer-specific parameters. The SME may perform such a function instead of common system management entities and may implement a standard management protocol.

The MLME, the PLME, and the SME may interact with each other using various methods based on primitives. More specifically, an XX-GET.request primitive is used to request the value of a management information base (MIB) attribute. An XX-GET.confirm primitive returns the value of a corresponding MIB attribute if the state is "SUCCESS", and indicates an error in the state field and returns the value in other cases. An XX-SET.request primitive is used to make a request so that a designated MIB attribute is set as a given value. If an MIB attribute means a specific operation, such a request requests the execution of the specific operation. Furthermore, an XX-SET.confirm primitive means that a designated MIB attribute has been set as a requested value if the state is "SUCCESS." In other cases, the XX-SET.confirm primitive indicates that the state field is an error situation. If an MIB attribute means a specific operation, the primitive may confirm that a corresponding operation has been performed.

An operation in each sublayer is described in brief as follows.

The MAC sublayer generates one or more MAC protocol data units (MPDUs) by attaching an MAC header and a frame check sequence (FCS) to a MAC service data unit (MSDU) received from a higher layer (e.g., an LLC layer) or the fragment of the MSDU. The generated MPDU is delivered to the PHY sublayer.

If an aggregated MSDU (A-MSDU) scheme is used, a plurality of MSDUs may be aggregated into a single aggregated MSDU (A-MSDU). The MSDU aggregation operation may be performed in an MAC higher layer. The A-MSDU is delivered to the PHY sublayer as a single MPDU (if it is not fragmented).

The PHY sublayer generates a physical protocol data unit (PPDU) by attaching an additional field, including information for a PHY transceiver, to a physical service data unit (PSDU) received from the MAC sublayer. The PPDU is transmitted through a wireless medium.

The PSDU has been received by the PHY sublayer from the MAC sublayer, and the MPDU has been transmitted from the MAC sublayer to the PHY sublayer. Accordingly, the PSDU is substantially the same as the MPDU.

If an aggregated MPDU (A-MPDU) scheme is used, a plurality of MPDUs (in this case, each MPDU may carry an A-MSDU) may be aggregated in a single A-MPDU. The MPDU aggregation operation may be performed in an MAC lower layer. The A-MPDU may include an aggregation of various types of MPDUs (e.g., QoS data, acknowledge (ACK), and a block ACK (BlockAck)). The PHY sublayer receives an A-MPDU, that is, a single PSDU, from the MAC sublayer. That is, the PSDU includes a plurality of MPDUs. Accordingly, the A-MPDU is transmitted through a wireless medium within a single PPDU.

Physical Protocol Data Unit (PPDU) Format

A PPDU means a data block generated in the physical layer. A PPDU format is described below based on an IEEE 802.11a WLAN system to which an embodiment of the present invention may be applied.

FIG. 3 illustrating a non-HT format PPDU and an HT format PPDU in a wireless communication system to which an embodiment of the present invention may be applied.

FIG. 3(a) illustrates a non-HT format PPDU for supporting IEEE 802.11a/g systems. The non-HT PPDU may also be called a legacy PPDU.

Referring to FIG. 3(a), the non-HT format PPDU includes a legacy format preamble, including a legacy (or non-HT) short training field (L-STF), a legacy (or non-HT) long training field (L-LTF), and a legacy (or non-HT) signal (L-SIG) field, and a data field.

The L-STF may include a short training orthogonal frequency division multiplexing symbol (OFDM). The L-STF may be used for frame timing acquisition, automatic gain control (AGC), diversity detection, and coarse frequency/time synchronization.

The L-LTF may include a long training OFDM symbol. The L-LTF may be used for fine frequency/time synchronization and channel estimation.

The L-SIG field may be used to send control information for the demodulation and decoding of the data field.

The L-SIG field may include a rate field of four bits, a reserved field of 1 bit, a length field of 12 bits, a parity bit of 1 bit, and a signal tail field of 6 bits.

The rate field includes transfer rate information, and the length field indicates the number of octets of a PSDU.

FIG. 3(b) illustrates an HT mixed format PPDU for supporting both an IEEE 802.11n system and IEEE 802.11a/g system.

Referring to FIG. 3(b), the HT mixed format PPDU includes a legacy format preamble including an L-STF, an L-LTF, and an L-SIG field, an HT format preamble including an HT-signal (HT-SIG) field, a HT short training field (HT-STF), and a HT long training field (HT-LTF), and a data field.

The L-STF, the L-LTF, and the L-SIG field mean legacy fields for backward compatibility and are the same as those of the non-HT format from the L-STF to the L-SIG field. An L-STA may interpret a data field through an L-LTF, an L-LTF, and an L-SIG field although it receives an HT mixed PPDU. In this case, the L-LTF may further include information for channel estimation to be performed by an HT-STA in order to receive the HT mixed PPDU and to demodulate the L-SIG field and the HT-SIG field.

An HT-STA may be aware of an HT mixed format PPDU using the HT-SIG field subsequent to the legacy fields, and may decode the data field based on the HT mixed format PPDU.

The HT-LTF may be used for channel estimation for the demodulation of the data field. IEEE 802.11n supports single user multi-input and multi-output (SU-MIMO) and thus may include a plurality of HT-LTFs for channel estimation with respect to each of data fields transmitted in a plurality of spatial streams.

The HT-LTF may include a data HT-LTF used for channel estimation for a spatial stream and an extension HT-LTF additionally used for full channel sounding. Accordingly, a plurality of HT-LTFs may be the same as or greater than number of transmitted spatial streams.

In the HT mixed format PPDU, the L-STF, the L-LTF, and the L-SIG fields are first transmitted so that an L-STA can receive the L-STF, the L-LTF, and the L-SIG fields and obtain data. Thereafter, the HT-SIG field is transmitted for the demodulation and decoding of data transmitted for an HT-STA.

An L-STF, an L-LTF, L-SIG, and HT-SIG fields are transmitted without performing beamforming up to an HT-SIG field so that an L-STA and an HT-STA can receive a corresponding PPDU and obtain data. In an HT-STF, an HT-LTF, and a data field that are subsequently transmitted, radio signals are transmitted through precoding. In this case, an HT-STF is transmitted so that an STA receiving a corresponding PPDU by performing precoding may take into considerate a portion whose power is varied by precoding, and a plurality of HT-LTFs and a data field are subsequently transmitted.

Table 1 below illustrates the HT-SIG field.

TABLE 1

| FIELD | BIT | DESCRIPTION |
|---|---|---|
| MCS | 7 | Indicate a modulation and coding scheme |
| CBW 20/40 | 1 | Set to "0" if a CBW is 20 MHz or 40 MHz or upper/lower<br>Set to "1" if a CBW is 40 MHz |
| HT length | 16 | Indicate the number of data octets within a PSDU |
| Smoothing | 1 | Set to "1" if channel smoothing is recommended<br>Set to "0" if channel estimation is recommended unsmoothingly for each carrier |
| Not-sounding | 1 | Set to "0" if a PPDU is a sounding PPDU<br>Set to "1" if a PPDU is not a sounding PPDU |
| Reserved | 1 | Set to "1" |
| Aggre-gation | 1 | Set to "1" if a PPDU includes an A-MPDU<br>Set to "0" if not |
| Space-time block coding (STBC) | 2 | Indicate a difference between the number of space-time streams (NSTS) and the number of spatial streams (NSS) indicated by an MCS<br>Set to "00" if an STBC is not used |
| FEC coding | 1 | Set to "1" if low-density parity check (LDPC) is used<br>Set to "0" if binary convolutional code (BCC) is used |
| Short GI | 1 | Set to "1" if a short guard interval (GI) is used after HT training<br>Set to "0" if not |
| Number of extension spatial streams | 2 | Indicate the number of extension spatial streams (NESSs)<br>Set to "0" if there is no NESS<br>Set to "1" if the number of NESSs is 1<br>Set to "2" if the number of NESSs is 2<br>Set to "3" if the number of NESSs is 3 |
| CRC | 8 | Include CRS for detecting an error of a PPDU on the receiver side |
| Tail bits | 6 | Used to terminate the trellis of a convolutional decoder<br>Set to "0" |

FIG. 3(c) illustrates an HT-green field format PPDU (HT-GF format PPDU) for supporting only an IEEE 802.11n system.

Referring to FIG. 3(c), the HT-GF format PPDU includes an HT-GF-STF, an HT-LTF1, an HT-SIG field, a plurality of HT-LTF2s, and a data field.

The HT-GF-STF is used for frame timing acquisition and AGC.

The HT-LTF1 is used for channel estimation.

The HT-SIG field is used for the demodulation and decoding of the data field.

The HT-LTF2 is used for channel estimation for the demodulation of the data field. Likewise, an HT-STA uses SU-MIMO. Accordingly, a plurality of the HT-LTF2s may be configured because channel estimation is necessary for each of data fields transmitted in a plurality of spatial streams.

The plurality of HT-LTF2s may include a plurality of data HT-LTFs and a plurality of extension HT-LTFs like the HT-LTF of the HT mixed PPDU.

In FIGS. 3(a) to 3(c), the data field is a payload and may include a service field, a scrambled PSDU (PSDU) field, tail bits, and padding bits. All of the bits of the data field are scrambled.

FIG. 3(d) illustrates a service field included in the data field. The service field has 16 bits. The 16 bits are assigned No. 0 to No. 15 and are sequentially transmitted from the No. 0 bit. The No. 0 bit to the No. 6 bit are set to 0 and are used to synchronize a descrambler within a reception stage.

An IEEE 802.11ac WLAN system supports the transmission of a DL multi-user multiple input multiple output (MU-MIMO) method in which a plurality of STAs accesses a channel at the same time in order to efficiently use a radio channel. In accordance with the MU-MIMO transmission method, an AP may simultaneously transmit a packet to one or more STAs that have been subjected to MIMO pairing.

Downlink multi-user transmission (DL MU transmission) means a technology in which an AP transmits a PPDU to a plurality of non-AP STAs through the same time resources using one or more antennas.

Hereinafter, an MU PPDU means a PPDU which delivers one or more PSDUs for one or more STAs using the MU-MIMO technology or the OFDMA technology. Furthermore, an SU PPDU means a PPDU having a format in which only one PSDU can be delivered or which does not have a PSDU.

For MU-MIMO transmission, the size of control information transmitted to an STA may be relatively larger than size of 802.11n control information. Control information additionally required to support MU-MIMO may include information indicating the number of spatial streams received by each STA and information related to the modulation and coding of data transmitted to each STA may correspond to the control information, for example.

Accordingly, when MU-MIMO transmission is performed to provide a plurality of STAs with a data service at the same time, the size of transmitted control information may be increased according to the number of STAs which receive the control information.

In order to efficiently transmit the control information whose size is increased as described above, a plurality of pieces of control information required for MU-MIMO transmission may be divided into two types of control information: common control information that is required for all of STAs in common and dedicated control information individually required for a specific STA, and may be transmitted.

FIG. 4 illustrates a VHT format PPDU in a wireless communication system to which an embodiment of the present invention may be applied.

FIG. 4(a) illustrates a VHT format PPDU for supporting an IEEE 802.11ac system.

Referring to FIG. 4(a), the VHT format PPDU includes a legacy format preamble including an L-STF, an L-LTF, and an L-SIG field, a VHT format preamble including a VHT-signal-A (VHT-SIG-A) field, a VHT short training field (VHT-STF), a VHT long training field (VHT-LTF), and a VHT-signal-B (VHT-SIG-B) field, and a data field.

The L-STF, the L-LTF, and the L-SIG field mean legacy fields for backward compatibility and have the same formats as those of the non-HT format. In this case, the L-LTF may further include information for channel estimation which will be performed in order to demodulate the L-SIG field and the VHT-SIG-A field.

The L-STF, the L-LTF, the L-SIG field, and the VHT-SIG-A field may be repeated in a 20 MHz channel unit and transmitted. For example, when a PPDU is transmitted through four 20 MHz channels (i.e., an 80 MHz bandwidth), the L-STF, the L-LTF, the L-SIG field, and the VHT-SIG-A field may be repeated every 20 MHz channel and transmitted.

A VHT-STA may be aware of the VHT format PPDU using the VHT-SIG-A field subsequent to the legacy fields, and may decode the data field based on the VHT-SIG-A field.

In the VHT format PPDU, the L-STF, the L-LTF, and the L-SIG field are first transmitted so that even an L-STA can receive the VHT format PPDU and obtain data. Thereafter, the VHT-SIG-A field is transmitted for the demodulation and decoding of data transmitted for a VHT-STA.

The VHT-SIG-A field is a field for the transmission of control information that is common to a VHT STAs that are MIMO-paired with an AP, and includes control information for interpreting the received VHT format PPDU.

The VHT-SIG-A field may include a VHT-SIG-A1 field and a VHT-SIG-A2 field.

The VHT-SIG-A1 field may include information about a channel bandwidth (BW) used, information about whether space time block coding (STBC) is applied or not, a group identifier (ID) for indicating a group of grouped STAs in MU-MIMO, information about the number of streams used (the number of space-time streams (NSTS)/part association identifier (AID), and transmit power save forbidden information. In this case, the group ID means an identifier assigned to a target transmitting STA group in order to support MU-MIMO transmission, and may indicate whether the present MIMO transmission method is MU-MIMO or SU-MIMO.

Table 2 illustrates the VHT-SIG-A1 field.

TABLE 2

| FIELD | BIT | DESCRIPTION |
|---|---|---|
| BW | 2 | Set to "0" if a BW is 20 MHz<br>Set to "1" if a BW is 40 MHz<br>Set to "2" if a BW is 80 MHz<br>Set to "3" if a BW is 160 MHz or 80 + 80 MHz |
| Reserved | 1 | |
| STBC | 1 | In the case of a VHT SU PPDU:<br>Set to "1" if STBC is used<br>Set to "0" if not<br>In the case of a VHT MU PPDU:<br>Set to "0" |
| group ID | 6 | Indicate a group ID<br>"0" or "63" indicates a VHT SU PPDU, but indicates a VHT MU PPDU if not |
| NSTS/Partial AID | 12 | In the case of a VHT MU PPDU, divide into 4 user positions "p" each having three bits<br>"0" if a space-time stream is 0<br>"1" if a space-time stream is 1<br>"2" if a space-time stream is 2<br>"3" if a space-time stream is 3<br>"4" if a space-time stream is 4<br>In the case of a VHT SU PPDU,<br>Upper 3 bits are set as follows:<br>"0" if a space-time stream is 1<br>"1" if a space-time stream is 2<br>"2" if a space-time stream is 3<br>"3" if a space-time stream is 4<br>"4" if a space-time stream is 5<br>"5" if a space-time stream is 6<br>"6" if a space-time stream is 7<br>"7" if a space-time stream is 8<br>Lower 9 bits indicate a partial AID. |
| TXOP_PS_NOT_ALLOWED | 1 | Set to "0" if a VHT AP permits a non-AP VHT STA to switch to power save mode during transmission opportunity (TXOP)<br>Set to "1" if not<br>In the case of a VHT PPDU transmitted by a non-AP VHT STA<br>Set to "1" |
| Reserved | 1 | |

The VHT-SIG-A2 field may include information about whether a short guard interval (GI) is used or not, forward error correction (FEC) information, information about a modulation and coding scheme (MCS) for a single user, information about the type of channel coding for multiple users, beamforming-related information, redundancy bits for cyclic redundancy checking (CRC), the tail bits of a convolutional decoder and so on.

Table 3 illustrates the VHT-SIG-A2 field.

TABLE 3

| FIELD | BIT | DESCRIPTION |
|---|---|---|
| Short GI | 1 | Set to "0" if a short GI is not used in a data field<br>Set to "1" if a short GI is used in a data field |
| Short GI disambiguation | 1 | Set to "1" if a short GI is used and an extra symbol is required for the payload of a PPDU<br>Set to "0" if an extra symbol is not required |
| SU/MU coding | 1 | In the case of a VHT SU PPDU:<br>Set to "0" in the case of binary convolutional code (BCC)<br>Set to "1" in the case of low-density parity check (LDPC)<br>In the case of a VHT MU PPDU:<br>Indicate coding used if the NSTS field of a user whose user position is "0" is not "0"<br>Set to "0" in the case of BCC<br>Set to "1" in the case of PDPC<br>Set to "1" as a reserved field if the NSTS field of a user whose user position is "0" is "0" |

TABLE 3-continued

| FIELD | BIT | DESCRIPTION |
|---|---|---|
| LDPC Extra OFDM symbol | 1 | Set to "1" if an extra OFDM symbol is required due to an PDPC PPDU encoding procedure (in the case of a SU PPDU) or the PPDU encoding procedure of at least one PDPC user (in the case of a VHT MU PPDU)<br>Set to "0" if not |
| SU VHT MCS/MU coding | 4 | In the case of a VHT SU PPDU:<br>Indicate a VHT-MCS index<br>In the case of a VHT MU PPDU:<br>Indicate coding for user positions "1" to "3" sequentially from upper bits<br>Indicate coding used if the NSTS field of each user is not "1"<br>Set to "0" in the case of BCC<br>Set to "1" in the case of LDPC<br>Set to "1" as a reserved field if the NSTS field of each user is "0" |
| Beamformed | 1 | In the case of a VHT SU PPDU:<br>Set to "1" if a beamforming steering matrix is applied to SU transmission<br>Set to "0" if not<br>In the case of a VHT MU PPDU:<br>Set to "1" as a reserved field |
| Reserved | 1 | |
| CRC | 8 | Include CRS for detecting an error of a PPDU on the receiver side |
| Tail | 6 | Used to terminate the trellis of a convolutional decoder<br>Set to "0" |

The VHT-STF is used to improve AGC estimation performance in MIMO transmission.

The VHT-LTF is used for a VHT-STA to estimate an MIMO channel. Since a VHT WLAN system supports MU-MIMO, the VHT-LTF may be configured by the number of spatial streams through which a PPDU is transmitted. Additionally, if full channel sounding is supported, the number of VHT-LTFs may be increased.

The VHT-SIG-B field includes dedicated control information which is necessary for a plurality of MU-MIMO-paired VHT-STAs to receive a PPDU and to obtain data. Accordingly, only when common control information included in the VHT-SIG-A field indicates that a received PPDU is for MU-MIMO transmission, a VHT-STA may be designed to decode the VHT-SIG-B field. In contrast, if common control information indicates that a received PPDU is for a single VHT-STA (including SU-MIMO), an STA may be designed to not decode the VHT-SIG-B field.

The VHT-SIG-B field includes a VHT-SIG-B length field, a VHT-MCS field, a reserved field, and a tail field.

The VHT-SIG-B length field indicates the length of an A-MPDU (prior to end-of-frame (EOF) padding). The VHT-MCS field includes information about the modulation, encoding, and rate-matching of each VHT-STA.

The size of the VHT-SIG-B field may be different depending on the type (MU-MIMO or SU-MIMO) of MIMO transmission and a channel bandwidth used for PPDU transmission.

FIG. 4(b) illustrates a VHT-SIG-B field according to a PPDU transmission bandwidth.

Referring to FIG. 4(b), in 40 MHz transmission, VHT-SIG-B bits are repeated twice. In 80 MHz transmission, VHT-SIG-B bits are repeated four times, and padding bits set to 0 are attached.

In 160 MHz transmission and 80+80 MHz transmission, first, VHT-SIG-B bits are repeated four times as in the 80 MHz transmission, and padding bits set to 0 are attached. Furthermore, a total of the 117 bits is repeated again.

In a system supporting MU-MIMO, in order to transmit PPDUs having the same size to STAs paired with an AP, information indicating the size of the bits of a data field forming the PPDU and/or information indicating the size of bit streams forming a specific field may be included in the VHT-SIG-A field.

In this case, an L-SIG field may be used to effectively use a PPDU format. A length field and a rate field which are included in the L-SIG field and transmitted so that PPDUs having the same size are transmitted to all of STAs may be used to provide required information. In this case, additional padding may be required in the physical layer because an MAC protocol data unit (MPDU) and/or an aggregate MAC PDU (A-MPDU) are set based on the bytes (or octets) of the MAC layer.

In FIG. 4, the data field is a payload and may include a service field, a scrambled PSDU, tail bits, and padding bits.

An STA needs to determine the format of a received PPDU because several formats of PPDUs are mixed and used as described above.

In this case, the meaning that a PPDU (or a PPDU format) is determined may be various. For example, the meaning that a PPDU is determined may include determining whether a received PPDU is a PPDU capable of being decoded (or interpreted) by an STA. Furthermore, the meaning that a PPDU is determined may include determining whether a received PPDU is a PPDU capable of being supported by an STA. Furthermore, the meaning that a PPDU is determined may include determining that information transmitted through a received PPDU is which information.

This is described in more detail below with reference to the following drawings.

FIG. 5 is a diagram illustrating constellations for classifying the formats of PPDUs in a wireless communication system to which an embodiment of the present invention may be applied.

FIG. 5(a) illustrates the constellation of an L-SIG field included in a non-HT format PPDU, FIG. 5(b) illustrates a phase rotation for HT mixed format PPDU detection, and FIG. 5(c) illustrates a phase rotation for VHT format PPDU detection.

In order to classify a non-HT format PPDU, an HT-GF format PPDU, an HT mixed format PPDU, and a VHT format PPDU, an STA uses an L-SIG field and the phase of the constellation of OFDM symbols transmitted after the L-SIG field. That is, the STA may determine a PPDU format based on the L-SIG field of the received PPDU and/or the phase of the constellation of OFDM symbols transmitted after the L-SIG field.

Referring to FIG. 5(a), binary phase shift keying (BPSK) is used as OFDM symbols forming an L-SIG field.

First, in order to determine an HT-GF format PPDU, an STA determines whether a detected SIG field is an L-SIG field when the first SIG field is detected in a received PPDU. That is, the STA attempts decoding based on a constellation, such as the example of FIG. 5(a). When the decoding fails, the STA may determine a corresponding PPDU to be not an HT-GF format PPDU.

Next, in order to determine a non-HT format PPDU, an HT mixed format PPDU, and a VHT format PPDU, the phase of the constellation of OFDM symbols transmitted after the L-SIG field may be used. That is, a method for modulating the OFDM symbols transmitted after the L-SIG field may be different. An STA may determine a PPDU format based on a modulation method for a field after the L-SIG field of the received PPDU.

Referring to FIG. 5(b), in order to determine an HT mixed format PPDU, the phases of two OFDM symbols transmitted after the L-SIG field in the HT mixed format PPDU may be used.

More specifically, the phases of an OFDM symbol #1 and OFDM symbol #2 corresponding to an HT-SIG field transmitted after the L-SIG field in the HT mixed format PPDU are counterclockwise rotated 90 degrees. That is, quadrature binary phase shift keying (QBPSK) is used as a method for modulating the OFDM symbol #1 and the OFDM symbol #2. A QBPSK constellation may be a constellation whose phase has been counterclockwise rotated 90 degrees based on a BPSK constellation.

An STA attempts decoding for a first OFDM symbol and second OFDM symbol corresponding to an HT-SIG-A field transmitted after the L-SIG field of the received PPDU based on a constellation, such as the example of FIG. 5(b). If the decoding is successful, the STA determines that the corresponding PPDU is an HT format PPDU.

Next, in order to determine a non-HT format PPDU and a VHT format PPDU, the phase of the constellation of OFDM symbols transmitted after the L-SIG field may be used.

Referring to FIG. 5(c), in order to determine a VHT format PPDU, the phases of two OFDM symbols transmitted after the L-SIG field in the VHT format PPDU may be used.

More specifically, the phase of an OFDM symbol #1 corresponding to a VHT-SIG-A field after the L-SIG field in the VHT format PPDU is not rotated, but the phase of an OFDM symbol #2 is counterclockwise rotated 90 degrees. That is, BPSK is used as a modulation method for the OFDM symbol #1, and QBPSK is used as a modulation method for the OFDM symbol #2.

An STA attempts decoding for the first OFDM symbol and second OFDM symbol corresponding to the VHT-SIG field transmitted after the L-SIG field of the received PPDU based on a constellation, such as the example of FIG. 5(c). If the decoding is successful, the STA may determine that the corresponding PPDU is a VHT format PPDU.

In contrast, if the decoding fails, the STA may determine the corresponding PPDU is a non-HT format PPDU.

MAC Frame Format

FIG. 6 illustrates the format of an MAC frame for an IEEE 802.11 system to which an embodiment of the present invention may be applied.

Referring to FIG. 6, the MAC frame (i.e., an MPDU) includes an MAC header, a frame body, and a frame check sequence (FCS).

The MAC Header is defined as an area, including a Frame Control field, a Duration/ID field, an Address 1 field, an Address 2 field, an Address 3 field, a Sequence Control field, an Address 4 field, a QoS Control field, and an HT Control field.

The Frame Control field includes information about the characteristics of a corresponding MAC frame. The Frame Control field is described in detail later.

The Duration/ID field may be implemented to have a different value depending on the type and subtype of a corresponding MAC frame.

If the type and subtype of a corresponding MAC frame is a PS-poll frame for a power save (PS) operation, the Duration/ID field may be configured to include the association identifier (AID) of an STA that has transmitted the frame. In the remaining cases, the Duration/ID field may be configured to have a specific duration value depending on the type and subtype of a corresponding MAC frame. Furthermore, if a frame is an MPDU included in an aggregate-MPDU (A-MPDU) format, the Duration/ID field included in an MAC header may be configured to have the same value.

The Address 1 field to the Address 4 field are used to indicate a BSSID, a source address (SA), a destination address (DA), a transmitting address (TA) indicating the address of a transmitting STA, and a receiving address (RA) indicating the address of a receiving STA.

An Address field implemented as a TA field may be set as a bandwidth signaling TA value. In this case, the TA field may indicate that a corresponding MAC frame includes additional information in a scrambling sequence. The bandwidth signaling TA may be represented as the MAC address of an STA that sends a corresponding MAC frame, but individual/group bits included in the MAC address may be set as a specific value (e.g., "1").

The Sequence Control field includes a sequence number and a fragment number. The sequence number may indicate a sequence number assigned to a corresponding MAC frame. The fragment number may indicate the number of each fragment of a corresponding MAC frame.

The QoS Control field includes information related to QoS. The QoS Control field may be included if it indicates a QoS Data frame in a subtype subfield.

The HT Control field includes control information related to an HT and/or VHT transmission/reception scheme. The HT Control field is included in a control wrapper frame. Furthermore, the HT Control field is present in a QoS Data frame having an order subfield value of 1 and a management frame.

The frame body is defined as an MAC payload. Data to be transmitted in a higher layer is placed in the frame body. The frame body has a varying size. For example, a maximum size of an MPDU may be 11454 octets, and a maximum size of a PPDU may be 5.484 ms.

The FCS is defined as an MAC footer and used for the error search of an MAC frame.

The first three fields (i.e., the Frame Control field, the Duration/ID field, and Address 1 field) and the Last field (i.e., the FCS field) form a minimum frame format and are present in all of frames. The remaining fields may be present only in a specific frame type.

FIG. 7 is a diagram illustrating a Frame Control field within the MAC frame in a wireless communication system to which an embodiment of the present invention may be applied.

Referring to FIG. 7, the Frame Control field includes a Protocol Version subfield, a Type subfield, a Subtype subfield, a To DS subfield, a From DS subfield, a More Fragments subfield, a Retry subfield, a Power Management subfield, a More Data subfield, a Protected Frame subfield, and an Order subfield.

The Protocol Version subfield may indicate the version of a WLAN protocol applied to a corresponding MAC frame.

The Type subfield and the Subtype subfield may be set to indicate information that identifies the function of a corresponding MAC frame.

The type of MAC frame may include the three types of management frames, control frames, and data frames.

Furthermore, each of the frame types may be divided into subtypes.

For example, the control frames may include request to send (RTS) frame, a clear-to-send (CTS) frame, an acknowledgment (ACK) frame, a PS-poll frame, a contention free (CF)-end frame, a CF-End+CF-ACK frame, a block ACK request (BAR) frame, a block ACK (BA) frame, a control wrapper (Control+HTcontrol)) frame, a VHT null data packet announcement (NDPA), and a beamforming report poll frame.

The management frames may include a beacon frame, an announcement traffic indication message (ATIM) frame, a disassociation frame, an association request/response frame, a reassociation request/response frame, a probe request/response frame, an authentication frame, a deauthentication frame, an action frame, an action no ACK frame, and a timing advertisement frame.

The To DS subfield and the From DS subfield may include information that is necessary to analyze an Address 1 field to an Address 4 field included in a corresponding MAC frame header. In the case of the control frame, both the To DS subfield and the From DS subfield are set to "0." In the case of the management frame, the To DS subfield and the From DS subfield may be sequentially set to "1" and "0" if a corresponding frame is a QoS management frame (QMF) and may be sequentially set to "0" and "0" if a corresponding frame is not a QMF.

The More Fragments subfield may indicate whether a fragment to be transmitted after a corresponding MAC frame is present or not. The More Fragments subfield may be set to "1" if another fragment of a current MSDU or MMPDU is present and may be set to "0" if another fragment of a current MSDU or MMPDU is not present.

The Retry subfield may indicate whether the transmission of a corresponding MAC frame is based on the retransmission of a previous MAC frame. The Retry subfield may be set to "1" if the transmission of a corresponding MAC frame is based on the retransmission of a previous MAC frame and may be set to "0" if the transmission of a corresponding MAC frame is not based on the retransmission of a previous MAC frame.

The Power Management subfield may indicate power management mode of an STA. The Power Management subfield may indicate that an STA switches to power saving mode if the Power Management subfield value is "1."

The More Data subfield may indicate whether an MAC frame to be additionally transmitted is present or not. The More Data subfield may be set to "1" if an MAC frame to be additionally transmitted is present and may be set to "0" if an MAC frame to be additionally transmitted is not present.

The Protected Frame subfield may indicate whether a Frame Body field has been encrypted. The Protected Frame subfield may be set to "1" if the Frame Body field includes information processed by a cryptographic encapsulation algorithm and may be set to "0" if the Frame Body field does not include information processed by a cryptographic encapsulation algorithm.

The pieces of information included in each of the aforementioned fields may comply with the definition of the IEEE 802.11 system. Furthermore, the aforementioned fields correspond to an example of fields which may be included in an MAC frame, but the present invention is not limited thereto. That is, each of the aforementioned fields may be replaced with another field or an additional field may be further included and all of the fields may not be essentially included.

FIG. 8 illustrates a VHT format of an HT Control field in a wireless communication system to which an embodiment of the present invention may be applied.

Referring to FIG. 8, the HT Control field may include a VHT subfield, an HT control middle subfield, an AC constraint subfield, and a reverse direction grant (RDG)/more PPDU subfield.

The VHT subfield indicates whether the HT Control field has the format of an HT Control field for VHT (VHT=1) or has the format of an HT Control field for HT (VHT=0). In FIG. 8, it is assumed that the HT Control field is an HT Control field for VHT (i.e., VHT=1). The HT Control field for VHT may be called a VHT Control field.

The HT control middle subfield may be implemented to a different format depending on the indication of a VHT subfield. The HT control middle subfield is described in detail later.

The AC constraint subfield indicates whether the mapped access category (AC) of a reverse direction (RD) data frame is constrained to a single AC.

The RDG/more PPDU subfield may be differently interpreted depending on whether a corresponding field is transmitted by an RD initiator or an RD responder.

Assuming that a corresponding field is transmitted by an RD initiator, the RDG/more PPDU subfield is set as "1" if an RDG is present, and the RDG/more PPDU subfield is set as "0" if an RDG is not present. Assuming that a corresponding field is transmitted by an RD responder, the RDG/more PPDU subfield is set as "1" if a PPDU including the corresponding subfield is the last frame transmitted by the RD responder, and the RDG/more PPDU subfield is set as "0" if another PPDU is transmitted.

As described above, the HT control middle subfield may be implemented to a different format depending on the indication of a VHT subfield.

The HT control middle subfield of an HT Control field for VHT may include a reserved bit subfield, a modulation and coding scheme (MCS) feedback request (MRQ) subfield, an MRQ sequence identifier (MSI)/space-time block coding (STBC) subfield, an MCS feedback sequence identifier (MFSI)/least significant bit (LSB) of group ID (GID-L) subfield, an MCS feedback (MFB) subfield, a most significant Bit (MSB) of group ID (GID-H) subfield, a coding type subfield, a feedback transmission type (FB Tx type) subfield, and an unsolicited MFB subfield.

Table 4 illustrates a description of each subfield included in the HT control middle subfield of the VHT format.

TABLE 4

| SUBFIELD | MEANING | DEFINITION |
| --- | --- | --- |
| MRQ | MCS request | Set to "1" if MCS feedback (solicited MFB) is not requested<br>Set to "0" if not |
| MSI | MRQ sequence identifier | An MSI subfield includes a sequence number within a range of 0 to 6 to identify a specific request if an unsolicited MFB subfield is set to "0" and an MRQ subfield is set to "1."<br>Include a compressed MSI subfield (2 bits) and an STBC indication subfield (1 bit) if an unsolicited MFB subfield is "1." |
| MFSI/GID-L | MFB sequence identifier/LSB of group ID | An MFSI/GID-L subfield includes the received value of an MSI included within a frame related to MFB information if an unsolicited MFB subfield is set to "0."<br>An MFSI/GID-L subfield includes the lowest three bits of a group ID of a PPDU estimated by an MFB if an MFB is estimated from an MU PPDU. |
| MFB | VHT N_STS, MCS, BW, SNR feedback | An MFB subfield includes recommended MFB.<br>VHT-MCS = 15, NUM_STS = 7 indicates that feedback is not present. |
| GID-H | MSB of group ID | A GID-H subfield includes the most significant bit 3 bits of a group ID of a PPDU whose solicited MFB has been estimated if an unsolicited MFB field is set to "1" and MFB has been estimated from a VHT MU PPDU.<br>All of GID-H subfields are set to "1" if MFB is estimated from an SU PPDU. |
| Coding Type | Coding type or MFB response | If an unsolicited MFB subfield is set to "1", a coding type subfield includes the coding type (binary convolutional code (BCC) includes 0 and low-density parity check (LDPC) includes 1) of a frame whose solicited MFB has been estimated |
| FB Tx Type | Transmission type of MFB response | An FB Tx Type subfield is set to "0" if an unsolicited MFB subfield is set to "1" and MFB has been estimated from an unbeamformed VHT PPDU.<br>An FB Tx Type subfield is set to "1" if an unsolicited MFB subfield is set to "1" and MFB has been estimated from a beamformed VHT PPDU. |
| Unsolicited MFB | Unsolicited MCS feedback indicator | Set to "1" if MFB is a response to MRQ<br>Set to "0" if MFB is not a response to MRQ |

Furthermore, the MFB subfield may include the number of VHT space time streams (NUM_STS) subfield, a VHT-MCS subfield, a bandwidth (BW) subfield, and a signal to noise ratio (SNR) subfield.

The NUM_STS subfield indicates the number of recommended spatial streams. The VHT-MCS subfield indicates a recommended MCS. The BW subfield indicates bandwidth information related to a recommended MCS. The SNR subfield indicates an average SNR value of data subcarriers and spatial streams.

The information included in each of the aforementioned fields may comply with the definition of an IEEE 802.11 system. Furthermore, each of the aforementioned fields corresponds to an example of fields which may be included in an MAC frame and is not limited thereto. That is, each of the aforementioned fields may be substituted with another field, additional fields may be further included, and all of the fields may not be essentially included.

Medium Access Mechanism

In IEEE 802.11, communication is basically different from that of a wired channel environment because it is performed in a shared wireless medium.

In a wired channel environment, communication is possible based on carrier sense multiple access/collision detection (CSMA/CD). For example, when a signal is once transmitted by a transmission stage, it is transmitted up to a reception stage without experiencing great signal attenuation because there is no great change in a channel environment. In this case, when a collision between two or more signals is detected, detection is possible. The reason for this is that power detected by the reception stage becomes instantly higher than power transmitted by the transmission stage. In a radio channel environment, however, since various factors (e.g., signal attenuation is great depending on the distance or instant deep fading may be generated) affect a channel, a transmission stage is unable to accurately perform carrier sensing regarding whether a signal has been correctly transmitted by a reception stage or a collision has been generated.

Accordingly, in a WLAN system according to IEEE 802.11, a carrier sense multiple access with collision avoidance (CSMA/CA) mechanism has been introduced as the basic access mechanism of MAC. The CAMA/CA mechanism is also called a distributed coordination function (DCF) of IEEE 802.11 MAC, and basically adopts a "listen before talk" access mechanism. In accordance with such a type of access mechanism, an AP and/or an STA perform clear channel assessment (CCA) for sensing a radio channel or a medium for a specific time interval (e.g., a DCF inter-frame space (DIFS)) prior to transmission. If, as a result of the sensing, the medium is determined to be an idle state, the AP and/or the STA starts to transmit a frame through the corresponding medium. In contrast, if, as a result of the sensing, the medium is determined to be a busy state (or an occupied status), the AP and/or the STA do not start their transmission, may wait for a delay time (e.g., a random backoff period) for medium access in addition to the DIFS assuming that several STAs already wait for in order to use the corresponding medium, and may then attempt frame transmission.

Assuming that several STAs trying to transmit frames are present, they will wait for different times because the STAs stochastically have different backoff period values and will attempt frame transmission. In this case, a collision can be minimized by applying the random backoff period.

Furthermore, the IEEE 802.11 MAC protocol provides a hybrid coordination function (HCF). The HCF is based on a DCF and a point coordination function (PCF). The PCF is a polling-based synchronous access method, and refers to a method for periodically performing polling so that all of receiving APs and/or STAs can receive a data frame. Furthermore, the HCF has enhanced distributed channel access (EDCA) and HCF controlled channel access (HCCA). In EDCA, a provider performs an access method for providing a data frame to multiple users on a contention basis. In HCCA, a non-contention-based channel access method using a polling mechanism is used. Furthermore, the HCF includes a medium access mechanism for improving the quality of service (QoS) of a WLAN, and may transmit QoS data in both a contention period (CP) and a contention-free period (CFP).

FIG. 9 is a diagram illustrating a random backoff period and a frame transmission procedure in a wireless communication system to which an embodiment of the present invention may be applied.

When a specific medium switches from an occupied (or busy) state to an idle state, several STAs may attempt to transmit data (or frames). In this case, as a scheme for minimizing a collision, each of the STAs may select a random backoff count, may wait for a slot time corresponding to the selected random backoff count, and may attempt transmission. The random backoff count has a pseudo-random integer value and may be determined as one of uniformly distributed values in 0 to a contention window (CW) range. In this case, the CW is a CW parameter value. In the CW parameter, CW_min is given as an initial value. If transmission fails (e.g., if ACK for a transmitted frame is not received), the CW_min may have a twice value. If the CW parameter becomes CW_max, it may maintain the CW_max value until data transmission is successful, and the data transmission may be attempted. If the data transmission is successful, the CW parameter is reset to a CW_min value. The CW, CW_min, and CW_max values may be set to $2^n-1$ (n=0, 1, 2, . . . ,).

When a random backoff process starts, an STA counts down a backoff slot based on a determined backoff count value and continues to monitor a medium during the countdown. When the medium is monitored as a busy state, the STA stops the countdown and waits. When the medium becomes an idle state, the STA resumes the countdown.

In the example of FIG. 9, when a packet to be transmitted in the MAC of an STA 3 is reached, the STA 3 may check that a medium is an idle state by a DIFS and may immediately transmit a frame.

The remaining STAs monitor that the medium is the busy state and wait. In the meantime, data to be transmitted by each of an STA 1, an STA 2, and an STA 5 may be generated. When the medium is monitored as an idle state, each of the STAs waits for a DIFS and counts down a backoff slot based on each selected random backoff count value.

The example of FIG. 9 shows that the STA 2 has selected the smallest backoff count value and the STA 1 has selected the greatest backoff count value. That is, FIG. 7 illustrates that the remaining backoff time of the STA 5 is shorter than the remaining backoff time of the STA 1 at a point of time at which the STA 2 finishes a backoff count and starts frame transmission.

The STA 1 and the STA 5 stop countdown and wait while the STA 2 occupies the medium. When the occupation of the medium by the STA is finished and the medium becomes an idle state again, each of the STA 1 and the STA 5 waits for a DIFS and resumes the stopped backoff count. That is, each of the STA 1 and the STA 5 may start frame transmission after counting down the remaining backoff slot corresponding to the remaining backoff time. The STA 5 starts frame transmission because the STA 5 has a shorter remaining backoff time than the STA 1.

While the STA 2 occupies the medium, data to be transmitted by an STA 4 may be generated. In this case, from a standpoint of the STA 4, when the medium becomes an idle state, the STA 4 waits for a DIFS and counts down a backoff slot corresponding to its selected random backoff count value.

FIG. 9 shows an example in which the remaining backoff time of the STA 5 coincides with the random backoff count value of the STA 4. In this case, a collision may be generated between the STA 4 and the STA 5. When a collision is generated, both the STA 4 and the STA 5 do not receive ACK, so data transmission fails. In this case, each of the STA 4 and the STA 5 doubles its CW value, select a random backoff count value, and counts down a backoff slot.

The STA 1 waits while the medium is the busy state due to the transmission of the STA 4 and the STA 5. When the medium becomes an idle state, the STA 1 may wait for a DIFS and start frame transmission after the remaining backoff time elapses.

The CSMA/CA mechanism includes virtual carrier sensing in addition to physical carrier sensing in which an AP and/or an STA directly sense a medium.

Virtual carrier sensing is for supplementing a problem which may be generated in terms of medium access, such as a hidden node problem. For the virtual carrier sensing, the MAC of a WLAN system uses a network allocation vector (NAV). The NAV is a value indicated by an AP and/or an STA which now uses a medium or has the right to use the medium in order to notify another AP and/or STA of the remaining time until the medium becomes an available state. Accordingly, a value set as the NAV corresponds to the period in which a medium is reserved to be used by an AP and/or an STA that transmit corresponding frames. An STA that receives an NAV value is prohibited from accessing the medium during the corresponding period. The NAV may be set based on the value of the Duration field of the MAC header of a frame, for example.

An AP and/or an STA may perform a procedure for exchanging a request to send (RTS) frame and a clear to send (CTS) frame in order to provide notification that they will access a medium. The RTS frame and the CTS frame include information indicating a temporal section in which a wireless medium required to transmit/receive an ACK frame has been reserved to be accessed if substantial data frame transmission and an acknowledgement response (ACK) are supported. Another STA which has received an RTS frame from an AP and/or an STA attempting to send a frame or which has received a CTS frame transmitted by an STA to which a frame will be transmitted may be configured to not access a medium during a temporal section indicated by information included in the RTS/CTS frame. This may be implemented by setting the NAV during a time interval.

Interframe Space (IFS)

A time interval between frames is defined as an interframe space (IFS). An STA may determine whether a channel is used during an IFS time interval through carrier sensing. In an 802.11 WLAN system, a plurality of IFSs is defined in order to provide a priority level by which a wireless medium is occupied.

FIG. 10 is a diagram illustrating an IFS relation in a wireless communication system to which an embodiment of the present invention may be applied.

All of pieces of timing may be determined with reference to physical layer interface primitives, that is, a PHY-TX-END.confirm primitive, a PHYTXSTART.confirm primitive, a PHY-RXSTART.indication primitive, and a PHY-RXEND.indication primitive.

An interframe space (IFS) depending on an IFS type is as follows.
  a) A reduced interframe space (IFS) (RIFS)
  b) A short interframe space (IFS) (SIFS)
  c) A PCF interframe space (IFS) (PIFS)
  d) A DCF interframe space (IFS) (DIFS)
  e) An arbitration interframe space (IFS) (AIFS)
  f) An extended interframe space (IFS) (EIFS)

Different IFSs are determined based on attributes specified by a physical layer regardless of the bit rate of an STA. IFS timing is defined as a time gap on a medium. IFS timing other than an AIFS is fixed for each physical layer.

The SIFS is used to transmits a PPDU including an ACK frame, a CTS frame, a Block ACK Request (BlockAckReq) frame, or a block ACK (BlockAck) frame, that is, an instant response to an A-MPDU, the second or consecutive MPDU of a fragment burst, and a response from an STA with respect to polling according to a PCF. The SIFS has the highest priority. Furthermore, the SIFS may be used for the point coordinator of frames regardless of the type of frame during a non-contention period (CFP) time. The SIFS indicates the time prior to the start of the first symbol of the preamble of a next frame which is subsequent to the end of the last symbol of a previous frame or from signal extension (if present).

SIFS timing is achieved when the transmission of consecutive frames is started in a Tx SIFS slot boundary.

The SIFS is the shortest in IFS between transmissions from different STAs. The SIFS may be used if an STA occupying a medium needs to maintain the occupation of the medium during the period in which the frame exchange sequence is performed.

Other STAs required to wait so that a medium becomes an idle state for a longer gap can be prevented from attempting to use the medium because the smallest gap between transmissions within a frame exchange sequence is used. Accordingly, priority may be assigned in completing a frame exchange sequence that is in progress.

The PIFS is used to obtain priority in accessing a medium.
The PIFS may be used in the following cases.
An STA operating under a PCF
An STA sending a channel switch announcement frame
An STA sending a traffic indication map (TIM) frame
A hybrid coordinator (HC) starting a CFP or transmission opportunity (TXOP)
An HC or non-AP QoS STA, that is, a TXOP holder polled for recovering from the absence of expected reception within a controlled access phase (CAP)
An HT STA using dual CTS protection before sending CTS2
A TXOP holder for continuous transmission after a transmission failure
A reverse direction (RD) initiator for continuous transmission using error recovery
An HT AP during a PSMP sequence in which a power save multi-poll (PSMP) recovery frame is transmitted
An HT AT performing CCA within a secondary channel before sending a 40 MHz mask PPDU using EDCA channel access In the illustrated examples, an STA using the PIFS starts transmission after a carrier sense (CS) mechanism for determining that a medium is an idle state in a Tx PIFS slot boundary other than the case where CCA is performed in a secondary channel.

The DIFS may be used by an STA which operates to send a data frame (MPDU) and a MAC management protocol data unit management (MMPDU) frame under the DCF. An STA using the DCF may transmit data in a TxDIFS slot boundary if a medium is determined to be an idle state through a carrier sense (CS) mechanism after an accurately received frame and a backoff time expire. In this case, the accurately received frame means a frame indicating that the PHY-RXEND.indication primitive does not indicate an error and an FCS indicates that the frame is not an error (i.e., error free).

An SIFS time ("aSIFSTime") and a slot time ("aSlotTime") may be determined for each physical layer. The SIFS time has a fixed value, but the slot time may be dynamically changed depending on a change in the wireless delay time "aAirPropagationTime."

The "aSIFSTime" is defined as in Equations 1 and 2 below.

$$aSIFSTime(16\ \mu s)=aRxRFDelay(0.5)+aRxPLCPDelay(12.5)+aMACProcessingDelay(1\ or\ <2)+aRxTxTurnaroundTime(<2) \quad \text{[Equation 1]}$$

$$aRxTxTurnaroundTime=aTxPLCPDelay(1)+aRxTxSwitchTime(0.25)+aTxRampOnTime(0.25)+aTxRFDelay(0.5) \quad \text{[Equation 2]}$$

The "aSlotTime" is defined as in Equation 3 below.

$$aSlotTime=aCCATime(<4)+aRxTxTurnaroundTime(<2)+aAirPropagationTime(<1)+aMACProcessingDelay(<2) \quad \text{[Equation 3]}$$

In Equation 3, a default physical layer parameter is based on "aMACProcessingDelay" having a value which is equal to or smaller than 1 μs. A radio wave is spread 300 m/μs in the free space. For example, 3 μs may be the upper limit of a BSS maximum one-way distance ~450 m (a round trip is ~900 m).

The PIFS and the SIFS are defined as in Equations 4 and 5, respectively.

$$DIFS(16\ \mu s)=aSIFSTime+aSlotTime \quad \text{[Equation 4]}$$

$$DIFS(34\ \mu s)=aSIFSTime+2*aSlotTime \quad \text{[Equation 5]}$$

In Equations 1 to 5, the numerical value within the parenthesis illustrates a common value, but the value may be different for each STA or for the position of each STA.

The aforementioned SIFS, PIFS, and DIFS are measured based on an MAC slot boundary (e.g., a Tx SIFS, a Tx PIFS, and a TxDIFS) different from a medium.

The MAC slot boundaries of the SIFS, the PIFS, and the DIFS are defined as in Equations 6 to 8, respectively.

$$TxSIFS=SIFS-aRxTxTurnaroundTime \quad \text{[Equation 6]}$$

$$TxPIFS=TxSIFS+aSlotTime \quad \text{[Equation 7]}$$

$$TxDIFS=TxSIFS+2*aSlotTIme \quad \text{[Equation 8]}$$

Channel State Information Feedback Method

An SU-MIMO technology in which a beamformer allocates all of antennas to a single beamformee and performs communication increases a channel capacity through a diversity gain and stream multi-transmission using the space-time. The SU-MIMO technology can contribute to the improvement of performance of the physical layer by extending the degree of space freedom in such a way as to increase the number of antennas compared to a case where an MIMO technology is not applied.

Furthermore, the MU-MIMO technology in which a beamformer allocates an antenna to a plurality of beamformees can improve performance of an MIMO antenna by increasing the transfer rate per beamformee or the reliability of a channel through a link layer protocol for the multi-access of a plurality of beamformees which have accessed a beamformer.

In an MIMO environment, there is a need for a feedback procedure for obtaining channel information because performance may be greatly influenced depending on how accurately is a beamformer aware of channel information.

Two methods may be basically supported for the feedback procedure for obtaining channel information. One method is a method using a control frame, and the other method is a method using a channel sounding procedure not including a data field. Sounding means that a corresponding field is used in order to measure a channel for purposes other than the data demodulation of a PPDU including a preamble training field.

Hereinafter, a channel information feedback method using a control frame and a channel information feedback method using a null data packet (NDP) are described in more detail.

1) A Feedback Method Using a Control Frame

In an MIMO environment, a beamformer may indicate the feedback of channel state information through an HT control field included in an MAC header, or a beamformee may report channel state information through an HT control field included in an MAC frame header (see FIG. 8). The HT Control field may be included in a QoS Data frame in which the Order subfield of a Control Wrapper frame or MAC header has been set to 1 and management frames.

2) Feedback Method Using Channel Sounding

FIG. 11 is a diagram conceptually showing a channel sounding method in a wireless communication system to which an embodiment of the present invention may be applied.

FIG. 11 illustrates a method for feeding back channel state information between a beamformer (e.g., an AP) and a beamformee (e.g., a non-AP STA) based on a sounding protocol. The sounding protocol may mean a procedure for receiving information about channel state information through feedback.

A channel state information sounding method between a beamformer and a beamformee based on the sounding protocol may be performed according to the following steps.

(1) A beamformer sends a VHT null data packet announcement (VHT NDPA) frame for providing notification of sounding transmission for the feedback of a beamformee.

The VHT NDPA frame refers to a control frame which is used to provide notification that channel sounding is initiated and a null data packet (NDP) will be transmitted. In other words, by sending the VHT NDPA frame prior to the transmission of the NDP frame, a beamformee may be prepared for the feedback of channel state information before receiving the NDP frame.

The VHT NDPA frame may include association identifier (AID) information, feedback type information, etc. about a beamformee which will send an NDP. The VHT NDPA frame will be described in more detail later.

The VHT NDPA frame may be transmitted using different methods if data is transmitted using MU-MIMO and if data is transmitted using SU-MIMO. For example, if channel sounding for MU-MIMO is performed, the VHT NDPA frame may be transmitted using a broadcast method. In contrast, if channel sounding for SU-MIMO is performed, the VHT NDPA frame may be transmitted to a single target STA using a unicast method.

(2) A beamformer sends an NDP after an SIFS time after sending a VHT NDPA frame. The NDP has a VHT PPDU structure other than a data field.

Beamformees which have received the VHT NDPA frame may check the value of an AID12 subfield included in an STA information field and check whether each of the beamformees is a sounding target STA.

Furthermore, the beamformees may be aware of a feedback sequence through the sequence of an STA Info field included in NDPA. FIG. 11 illustrates a case where a feedback sequence is performed in order of a beamformee 1, a beamformee 2, and a beamformee 3.

(3) The beamformee 1 obtains DL channel state information based on a training field included in an NDP and generates feedback information to be transmitted to a beamformer.

After receiving the NDP frame, the beamformee 1 sends a VHT Compressed Beamforming frame, including feedback information, to the beamformer after an SIFS.

The VHT Compressed Beamforming frame may include the SNR value of a space-time stream, information about the compressed beamforming feedback matrix of a subcarrier, etc. The VHT Compressed Beamforming frame is described in more detail later.

(4) After receiving the VHT Compressed Beamforming frame from the beamformee 1, the beamformer sends a beamforming report poll frame to the beamformee 2 after an SIFS in order to obtain channel information from the beamformee 2.

The beamforming report poll frame plays the same role as the NDP frame. The beamformee 2 may measure a channel state based on the transmitted beamforming report poll frame.

The beamforming report poll frame is described in more detail later.

(5) The beamformee 2 that has received the beamforming report poll frame sends a VHT Compressed Beamforming frame, including feedback information, to the beamformer after an SIFS.

(6) After receiving the VHT Compressed Beamforming frame from the beamformee 2, the beamformer sends a beamforming report poll frame to the beamformee 3 in order to obtain channel information from the beamformee 3 after an SIFS.

(7) The beamformee 3 that has received the beamforming report poll frame sends a VHT Compressed Beamforming frame, including feedback information, to the beamformer after an SIFS.

A frame used in the above-described channel sounding procedure is described below.

FIG. 12 is a diagram illustrating a VHT NDPA frame in a wireless communication system to which an embodiment of the present invention may be applied.

Referring to FIG. 12, the VHT NDPA frame may include a Frame Control field, a Duration field, a receiving address (RA) field, a Transmitting Address (TA) field, a sounding dialog token field, an STA information 1 (STA Info 1) field to an STA information n (STA Info n) field, and FCS.

The value of the RA field indicates the address of a recipient or STA which receives a VHT NDPA frame.

If the VHT NDPA frame includes a single STA Info field, the value of the RA field has the address of an STA identified by an AID within the STA Info field. For example, if the VHT NDPA frame is transmitted to a single target STA for SU-MIMO channel sounding, an AP sends the VHT NDPA frame to a target STA in a unicast manner.

In contrast, if the VHT NDPA frame includes one or more STA Info fields, the value of the RA field has a broadcast address. For example, if the VHT NDPA frame is transmitted to one or more target STAs for MU-MIMO channel sounding, an AP broadcasts the VHT NDPA frame.

The value of the TA field indicates the address of a transmitter which sends the VHT NDPA frame, the address of an STA which sends the VHT NDPA frame, or a bandwidth which signalizes TA.

The sounding dialog token field may also be called a sounding sequence field. A Sounding Dialog Token Number subfield within the sounding dialog token field includes a value selected by a beamformer in order to identify the VHT NDPA frame.

The VHT NDPA frame includes at least one STA Info field. That is, the VHT NDPA frame includes an STA Info field including information about a sounding target STA. One STA Info field may be included in each sounding target STA.

Each STA Info field may include an AID12 subfield, a Feedback Type subfield, and an Nc index subfield.

Table 5 shows the subfields of the STA Info field included in the VHT NDPA frame.

TABLE 5

| SUBFIELD | DESCRIPTION |
|---|---|
| AID12 | Include the AID of an STA, that is, the subject of sounding feedback.<br>If a target STA is an AP, a mesh STA or an STA, that is, a member of an IBSS, the value of the AID12 subfield is set to "0". |
| Feedback Type | Indicate a feedback request type for a sounding target STA.<br>"0" in the case of SU-MIMO<br>"1" in the case of MU-MIMO |
| Nc Index | If a Feedback Type subfield indicates MU-MIMO, indicates a value obtained by subtracting 1 from the column number Nc of a compressed beamforming feedback matrix.<br>"0" if Nc = 1,<br>"1" if Nc = 2,<br>. . .<br>"7" if Nc = 8,<br>Set as a Reserved subfield in the case of SU-MIMO. |

The pieces of information included in each of the above-described fields may comply with the definition of an IEEE 802.11 system. Furthermore, the above-described fields may correspond to an example of fields which may be included in an MAC frame, may be replaced with other fields, or may further include an additional field FIG. 13 is a diagram illustrating a NDP PPDU in a wireless communication system to which an embodiment of the present invention may be applied.

Referring to FIG. 13, an NDP may have a format from which a data field has been omitted in the same VHT PPDU format as that of FIG. 4. The NDP may be precoded based on a specific precoding matrix and transmitted to a sounding target STA.

In the L-SIG field of the NDP, a length field indicating the length of a PSDU included in a data field is set to "0."

In the VHT-SIG-A field of the NDP, a group ID field indicating whether a transmission scheme used for NDP transmission is MU-MIMO or SU-MIMO is set as a value indicating SU-MIMO transmission.

The data bit of the VHT-SIG-B field of the NDP is set in a bit pattern fixed for each bandwidth.

When a sounding target STA receives an NDP, it estimates a channel and obtains channel state information based on the VHT-LTF field of the NDP.

FIG. 14 is a diagram illustrating the format of a VHT Compressed Beamforming frame in a wireless communication system to which an embodiment of the present invention may be applied.

Referring to FIG. 14, the VHT Compressed Beamforming frame is a VHT action frame for supporting a VHT function and includes an action field in a frame body. The action field is included in the frame body of an MAC frame, and provides a mechanism for specifying extended management actions.

The action field includes a Category field, a VHT Action field, a VHT MIMO Control field, a VHT Compressed Beamforming Report field, and an MU Exclusive Beamforming Report field.

The Category field is set as a value indicating a VHT category (i.e., a VHT Action frame). The VHT Action field is set as a value indicating a VHT Compressed Beamforming frame.

The VHT MIMO Control field is used to feed back control information related to beamforming feedback. The VHT MIMO Control field may be always present in the VHT Compressed Beamforming frame.

The VHT Compressed Beamforming Report field is used to feed back information about beamforming metric including SNR information about a space-time stream which is used to send data.

The MU Exclusive Beamforming Report field is used to feed back SNR information about a spatial stream if MU-MIMO transmission is performed.

Whether the VHT Compressed Beamforming Report field and the MU Exclusive Beamforming Report field are present or not and the contents thereof may be determined based on the values of the Feedback Type subfield, remaining feedback segments subfield, and First Feedback Segment subfield of the VHT MIMO Control field.

The VHT MIMO Control field, the VHT Compressed Beamforming Report field, and the MU Exclusive Beamforming Report field are described in more detail below.

1) The VHT MIMO Control field includes an Nc index subfield, an Nr index subfield, a Channel Width subfield, a Grouping subfield, a Codebook Information subfield, a Feedback Type subfield, a remaining feedback segments subfield, a First Feedback Segment subfield, a Reserved subfield, and a Sounding Dialog Token Number subfield.

Table 6 shows the subfields of the VHT MIMO Control field

TABLE 6

| SUBFIELD | NUMBER OF BITS | DESCRIPTION |
|---|---|---|
| Nc Index | 3 | Indicate a value obtained by subtracting 1 from the column number Nc of a compressed beamforming feedback matrix. "0" if Nc = 1, "1" if Nc = 2, . . . "7" if Nc = 8 |

TABLE 6-continued

| SUBFIELD | NUMBER OF BITS | DESCRIPTION |
|---|---|---|
| Nr Index | 3 | Indicate a value obtained by subtracting 1 from the row number Nr of a compressed beamforming feedback matrix. "0" if Nr = 1, "1" if Nr = 2, . . . "7" if Nr = 8 |
| Channel Width | 2 | Indicate the bandwidth of a channel measured in order to generate a compressed beamforming feedback matrix. "0" in the case of 20 MHz, "1" in the case of 40 MHz, "2" in the case of 80 MHz, and "3" in the case of 160 MHz or 80 + 80 MHz |
| Grouping | 2 | Indicate subcarrier grouping Ng used in a compressed beamforming feedback matrix. "0" if Ng = 1 (no grouping), "1" if Ng = 2, "2" if Ng = 4, and a value "3" is set as a reserved value |
| Codebook Information | 1 | Indicate the size of codebook entries. If a feedback type is SU-MIMO, "0" if bψ = 2, bΦ = 4, "1" if bψ = 4, bΦ = 6, If a feedback type is MU-MIMO, "0" if bψ = 5, bΦ = 7, "1" if bψ = 7, bΦ = 9, In this case, bψ and bΦ refer to the number of quantized bits. |
| Feedback Type | 1 | Indicate a feedback type. "0" in the case of SU-MIMO, "1" in the case of MU-MIMO |
| Remaining Feedback Segments | 3 | Indicate the number of remaining feedback segments of a related VHT Compressed Beamforming frame. Set to "0" in the case of the last feedback segment of a segmented report or a segment of an unsegmented report. Set as a value from "1" to "6" not in the case of the first or last feedback segment of a segmented report. Set as a value from "1" to "6" in the case of a feedback segment other than the last segment of a segmented report. In the case of a retransmission feedback segment, a field is set as the same value as a related segment of the original transmission. |
| First Feedback Segments | 1 | Set to "1" in the case of the first feedback segment of a segmented report or the feedback segment of an unsegmented report. Set to "0" not in the case of the first feedback segment or if a VHT Compressed Beamforming Report field or an MU Exclusive Beamforming Report field is not present in a frame. The field is set as the same value as a related segment of the original transmission |
| Sounding Dialog Token Number | 6 | Set as the value of the sounding dialog token of an NDPA frame |

If the VHT Compressed Beamforming frame does not transfer some or all of the VHT Compressed Beamforming Report field, the Nc Index subfield, the Channel Width subfield, the Grouping subfield, the Codebook Information subfield, the Feedback Type subfield, and the Sounding Dialog Token Number subfield are set as reserved fields, the First Feedback Segment subfield is set to "0", and the remaining feedback segments subfield is set to "7."

The Sounding Dialog Token Number subfield may also be called a sounding sequence number subfield.

2) The VHT Compressed Beamforming Report field is used to transfer explicit feedback information that expresses a compressed beamforming feedback matrix "V", used by a transmitting beamformer to determine a steering matrix "Q", in an angle form.

Table 7 shows the subfields of the VHT Compressed Beamforming Report field.

TABLE 7

| SUBFIELD | NUMBER OF BITS | DESCRIPTION |
|---|---|---|
| Average SNR of space-time stream 1 | 8 | Average SNR on all of subcarriers for a space-time stream 1 in a beamformee |
| . . . | . . . | . . . |
| Average SNR of space-time stream Nc | 8 | Average SNR on all of subcarriers for a space-time stream Nc in a beamformee |
| Compressed beamforming feedback matrix V for subcarrier k = scidx (o) | Na*(bψ + bΦ)/2 | Sequence of the angle of a compressed beamforming feedback matrix for a corresponding subcarrier |
| Compressed beamforming feedback matrix V for subcarrier k = scidx (1) | Na*(bψ + bΦ)/2 | Sequence of the angle of a compressed beamforming feedback matrix for a corresponding subcarrier |
| . . . | . . . | . . . |
| Compressed beamforming feedback matrix V for subcarrier k = scidx (Ns − 1) | Na*(bψ + bΦ)/2 | Sequence of the angle of a compressed beamforming feedback matrix for a corresponding subcarrier |

Referring to Table 7, the VHT Compressed Beamforming Report field may include an average SNR of space-time streams and the compressed beamforming feedback matrix "V" of each subcarrier. The compressed beamforming feedback matrix is a matrix including information about a channel situation, and is used to calculate a channel matrix (i.e., a steering matrix "Q") in a transmission method using MIMO.

form of a delta( ) SNR. Information within the VHT Compressed Beamforming Report field and the MU Exclusive Beamforming Report field may be used for an MU beamformer to determine a steering matrix "Q."

Table 9 shows the subfields of the MU Exclusive Beamforming Report field included in the VHT Compressed Beamforming frame.

TABLE 9

| SUBFIELD | NUMBER OF BITS | DESCRIPTION |
| --- | --- | --- |
| A delta SNR for a space-time stream 1 for a subcarrier k = sscidx (0) | 4 | A deviation between the SNR of a corresponding subcarrier and an average SNR of all the subcarriers of a corresponding space-time stream |
| . . . | | |
| A delta SNR for a space-time stream Nc for a subcarrier k = sscidx (0) | 4 | A deviation between the SNR of a corresponding subcarrier and an average SNR of all the subcarriers of a corresponding space-time stream |
| . . . | | |
| A delta SNR for a space-time stream 1 for a subcarrier k = sscidx (1) | 4 | A deviation between the SNR of a corresponding subcarrier and an average SNR of all the subcarriers of a corresponding space-time stream |
| . . . | | |
| A delta SNR for a space-time stream Nc for a subcarrier k = sscidx (1) | 4 | A deviation between the SNR of a corresponding subcarrier and an average SNR of all the subcarriers of a corresponding space-time stream |
| . . . | | |
| A delta SNR for a space-time stream 1 for a subcarrier k = sscidx (Ns' − 1) | 4 | A deviation between the SNR of a corresponding subcarrier and an average SNR of all the subcarriers of a corresponding space-time stream |
| . . . | | |
| A delta SNR for a space-time stream Nc for a subcarrier k = sscidx (Ns' − 1) | 4 | A deviation between the SNR of a corresponding subcarrier and an average SNR of all the subcarriers of a corresponding space-time stream | scidx( ) means a subcarrier in which a compressed beamforming feedback matrix subfield is transmitted. Na is fixed by an Nr×Nc value (e.g., if Nr×Nc=2×1, $\Phi 11$, $\Psi 21$, . . . ).

Ns refers to the number of subcarriers in which a compressed beamforming feedback matrix is transmitted to a beamformer. A beamformee may reduce the number of subcarriers Ns in which a compressed beamforming feedback matrix is transmitted using a grouping method. For example, the number of feedback compressed beamforming feedback matrices can be reduced by grouping a plurality of subcarriers into a single group (or grouping a plurality of subcarriers in an Ng unit) and transmitting compressed beamforming feedback matrices for each corresponding group. Ns may be calculated from a Channel Width subfield and a Grouping subfield included in the VHT MIMO Control field.

Table 8 illustrates an average SNR subfield of a space-time stream.

TABLE 8

| AverageSNR of Space-Time i subfield | AvgSNR i |
| --- | --- |
| −128 | ≤−10 dB |
| −127 | −9.75 dB |
| −126 | −9.5 dB |
| . . . | . . . |
| +126 | 53.5 dB |
| +127 | ≥53.75 dB |

Referring to Table 8, an average SNR of each of space-time streams is calculated by calculating an average SNR value of all of subcarriers included in a channel and mapping the calculated average SNR value in a range of −128~+128.

3) The MU Exclusive Beamforming Report field is used to transfer explicit feedback information expressed in the Referring to Table 9, the MU Exclusive Beamforming Report field may include an SNR per space-time stream for each subcarrier.

Each delta SNR subfield has a value that increases at an interval of 1 dB between −8 dB and 7 dB.

scidx( ) refers to a subcarrier(s) in which a delta SNR subfield is transmitted, and Ns refers to the number of subcarriers in which a delta SNR subfield is transmitted to a beamformer.

FIG. 15 is a diagram illustrating the format of a beamforming report poll frame in a wireless communication system to which an embodiment of the present invention may be applied.

Referring to FIG. 15, the beamforming report poll frame includes a Frame Control field, a Duration field, a receiving address (RA) field, a Transmitting Address (TA) field, a Feedback Segment Retransmission Bitmap field, and an FCS.

The value of the RA field indicates the address of an intended recipient.

The value of the TA field indicates the address of an STA that sends the beamforming report poll frame or a bandwidth which signals a TA.

The Feedback Segment Retransmission Bitmap field indicates a feedback segment that is requested in a VHT compressed beamforming report.

In the value of the Feedback Segment Retransmission Bitmap field, if the bit of a location n is "1", (n=0 in the case of the LSB and n=7 in the case of the MSB), a feedback segment corresponding to "n" in the remaining feedback segments subfield within the VHT MIMO Control field of a VHT Compressed Beamforming frame is requested. In contrast, if the bit of the location n is "0", a feedback segment corresponding to "n" in the remaining feedback segments subfield within the VHT MIMO Control field is not requested.

Group Identifier (ID)

For higher throughput, a VHT WLAN system supports an MU-MIMO transmission method. Accordingly, an AP may transmit a data frame to one or more MIMO-paired STAs at the same time. The AP may transmit data to an STA group, including one or more of a plurality of STAs associated with the AP, at the same time. For example, the number of paired STAs may be a maximum of 4. If a maximum number of spatial streams is 8, a maximum of four spatial streams may be allocated to each of the STAs.

Furthermore, in a WLAN system supporting tunneled direct link setup (TDLS) or direct link setup (DLS) or a mesh network, an STA attempting to transmit data may transmit a PPDU to a plurality of STAs using an MU-MIMO transmission scheme.

An example in which an AP transmits a PPDU to a plurality of STAs using an MU-MIMO transmission scheme is described below.

An AP transmits a PPDU to one or more STAs belonging to a paired STA group, that is, an intended recipient, through different spatial streams at the same time. As described above, the VHT-SIG A field of a VHT PPDU format includes group ID information and space-time stream information, and thus each of the STAs can check whether the received PPDU is a PPDU transmitted thereto. In this case, data may not be transmitted to a specific STA of the STA group, that is, the intended recipient, because a spatial stream has not been allocated to the specific STA.

In order to assign or change a user position corresponding to one or more group IDs, a group ID management frame is used. That is, an AP may provide notification of STAs associated with a specific group ID through a group ID management frame before it perform MU-MIMO transmission.

FIG. 16 is a diagram illustrating a group ID management frame in a wireless communication system to which an embodiment of the present invention may be applied.

Referring to FIG. 16, the group ID management frame is a VHT Action frame for supporting a VHT function, and includes an Action field in its Frame Body. The Action field is included in the Frame Body of an MAC frame and provides a mechanism for specifying extended management operations.

The Action field includes a Category field, a VHT Action field, a Membership Status Array field, and a User Position Array field.

The Category field is set as a value indicative of a VHT Category (i.e., a VHT Action frame). The VHT Action field is set as a value indicative of a group ID management frame.

The Membership Status Array field includes a Membership Status subfield of 1 bit corresponding to each group. If the Membership Status subfield is set to "0", it indicates that an STA is not a member of a corresponding group. If the Membership Status subfield is set to "1", it indicates that an STA is a member of a corresponding group. When one or more Membership Status subfields within the Membership Status Array field are set to "1", one or more groups may be allocated to an STA.

An STA may have one user position in each group to which the STA belongs.

The User Position Array field includes a User Position subfield of 2 bits corresponding to each group. The user position of an STA within a group to which the STA belongs is indicated by a User Position subfield within the User Position Array field. An AP may allocate the same user position to different STAs within each group.

An AP may transmit a group ID management frame only if a dot11VHTOptionImplemented parameter is 'true'. The group ID management frame is transmitted to only a VHT STA whose MU Beamformee Capable field within a VHT Capability element field has been set to "1." The group ID management frame is transmitted as a frame addressed to each of STAs.

An STA receives a group ID management frame having an RA field matched with its MAC address. The STA updates GROUP_ID_MANAGEMENT, that is, a PHYCONFIG_VECTOR parameter, based on the contents of the received group ID management frame.

The transmission of a group ID management frame to an STA and the transmission of corresponding ACK by the STA are completed before an MU PPDU is transmitted to the STA.

An MU PPDU is transmitted to an STA based on the contents of a group ID management frame that has been transmitted to the STA most recently and whose ACK has been received.

Downlink (DL) MU-MIMO Frame

FIG. 17 is a diagram illustrating a DL multi-user (MU) PPDU format in a wireless communication system to which an embodiment of the present invention may be applied.

Referring to FIG. 17, the PPDU includes a preamble and a data field. The data field may include a service field, a scrambled PSDU field, tail bits, and padding bits.

An AP may aggregate MPDUs and transmit a data frame using an aggregated MPDU (A-MPDU) format. In this case, a scrambled PSDU field may include the A-MPDU.

The A-MPDU includes a sequence of one or more A-MPDU subframes.

In the case of a VHT PPDU, the length of each A-MPDU subframe is a multiple of 4 octets. Accordingly, an A-MPDU may include an end-of-frame (EOF) pad of 0 to 3 octets after the last A-MPDU subframe in order to match the A-MPDU up with the last octet of a PSDU.

The A-MPDU subframe includes an MPDU delimiter, and an MPDU may be optionally included after the MPDU delimiter. Furthermore, a pad octet is attached to the MPDU in order to make the length of each A-MPDU subframe in a multiple of 4 octets other than the last A-MPDU subframe within one A-MPDU.

The MPDU delimiter includes a reserved field, an MPDU length field, a cyclic redundancy check (CRC) field, and a delimiter signature field.

In the case of a VHT PPDU, the MPDU delimiter may further include an end-of-frame (EOF) field. If an MPDU length field is 0 and an A-MPDU subframe or A-MPDU used for padding includes only one MPDU, in the case of an A-MPDU subframe on which a corresponding MPDU is carried, the EOF field is set to "1." If not, the EOF field is set to "0."

The MPDU length field includes information about the length of the MPDU.

If an MPDU is not present in a corresponding A-MPDU subframe, the PDU length field is set to "0." An A-MPDU subframe in which an MPDU length field has a value of "0" is used to be padded to a corresponding A-MPDU in order to match the A-MPDU up with available octets within a VHT PPDU.

The CRC field includes CRC information for an error check. The delimiter signature field includes pattern information used to search for an MPDU delimiter.

Furthermore, the MPDU includes an MAC header, a frame body, and a frame check sequence (FCS).

FIG. 18 is a diagram illustrating a DL multi-user (MU) PPDU format in a wireless communication system to which an embodiment of the present invention may be applied.

In FIG. 18, the number of STAs receiving a corresponding PPDU is assumed to be 3 and the number of spatial streams allocated to each STA is assumed to be 1, but the number of STAs paired with an AP and the number of spatial streams allocated to each STA are not limited thereto.

Referring to FIG. 18, the MU PPDU includes L-TFs (i.e., an L-STF and an L-LTF), an L-SIG field, a VHT-SIG-A field, a VHT-TFs (i.e., a VHT-STF and a VHT-LTF), a VHT-SIG-B field, a service field, one or more PSDUs, a padding field, and a tail bit. The L-TFs, the L-SIG field, the VHT-SIG-A field, the VHT-TFs, and the VHT-SIG-B field are the same as those of FIG. 4, and a detailed description thereof is omitted.

Information for indicating PPDU duration may be included in the L-SIG field. In the PPDU, PPDU duration indicated by the L-SIG field includes a symbol to which the VHT-SIG-A field has been allocated, a symbol to which the VHT-TFs have been allocated, a field to which the VHT-SIG-B field has been allocated, bits forming the service field, bits forming a PSDU, bits forming the padding field, and bits forming the tail field. An STA receiving the PPDU may obtain information about the duration of the PPDU through information indicating the duration of the PPDU included in the L-SIG field.

As described above, group ID information and time and spatial stream number information for each user are transmitted through the VHT-SIG-A, and a coding method and MCS information are transmitted through the VHT-SIG-B. Accordingly, beamformees may check the VHT-SIG-A and the VHT-SIG-B and may be aware whether a frame is an MU MIMO frame to which the beamformee belongs. Accordingly, an STA which is not a member STA of a corresponding group ID or which is a member of a corresponding group ID, but in which the number of streams allocated to the STA is "0" is configured to stop the reception of the physical layer to the end of the PPDU from the VHT-SIG-A field, thereby being capable of reducing power consumption.

In the group ID, an STA can be aware that a beamformee belongs to which MU group and it is a user who belongs to the users of a group to which the STA belongs and who is placed at what place, that is, that a PPDU is received through which stream by previously receiving a group ID management frame transmitted by a beamformer.

All of MPDUs transmitted within the VHT MU PPDU based on 802.11ac are included in the A-MPDU. In the data field of FIG. 18, each VHT A-MPDU may be transmitted in a different stream.

In FIG. 18, the A-MPDUs may have different bit sizes because the size of data transmitted to each STA may be different.

In this case, null padding may be performed so that the time when the transmission of a plurality of data frames transmitted by a beamformer is ended is the same as the time when the transmission of a maximum interval transmission data frame is ended. The maximum interval transmission data frame may be a frame in which valid downlink data is transmitted by a beamformer for the longest time. The valid downlink data may be downlink data that has not been null padded. For example, the valid downlink data may be included in the A-MPDU and transmitted. Null padding may be performed on the remaining data frames other than the maximum interval transmission data frame of the plurality of data frames.

For the null padding, a beamformer may fill one or more A-MPDU subframes, temporally placed in the latter part of a plurality of A-MPDU subframes within an A-MPDU frame, with only an MPDU delimiter field through encoding. An A-MPDU subframe having an MPDU length of 0 may be called a null subframe.

As described above, in the null subframe, the EOF field of the MPDU delimiter is set to "1." Accordingly, when the EOF field set to 1 is detected in the MAC layer of an STA on the receiving side, the reception of the physical layer is stopped, thereby being capable of reducing power consumption.

Block ACK Procedure

FIG. 19 is a diagram illustrating a DL MU-MIMO transmission process in a wireless communication system to which an embodiment of the present invention may be applied.

In 802.11ac, MU-MIMO is defined in downlink from an AP to a client (i.e., a non-AP STA). In this case, a multi-user (MU) frame is transmitted to multiple recipients at the same time, but acknowledgement (ACK) needs to be individually transmitted in uplink.

All of MPDUs transmitted within a VHT MU PPDU based on 802.11ac are included in an A-MPDU. Accordingly, a response to the A-MPDU within the VHT MU PPDU other than an immediate response to the VHT MU PPDU is transmitted in response to a block ACK request (BAR) frame by the AP.

First, an AP sends a VHT MU PPDU (i.e., a preamble and data) to all of recipients (i.e., an STA 1, an STA 2, and an STA 3). The VHT MU PPDU includes a VHT A-MPDU transmitted to each of the STAs.

The STA 1 that has received the VHT MU PPDU from the AP sends a block acknowledgement (BA) frame to the AP after an SIFS. The BA frame is described later in detail.

The AP that has received the BA from the STA 1 sends a block acknowledgement request (BAR) frame to the STA 2 after an SIFS. The STA 2 sends a BA frame to the AP after an SIFS. The AP that has received the BA frame from the STA 2 sends a BAR frame to the STA 3 after an SIFS. The STA 3 sends a BA frame to the AP after an SIFS.

When such a process is performed by all of the STAs, the AP sends a next MU PPDU to all of the STAs.

Acknowledgement (ACK)/Block ACK Frame

In general, an ACK frame is used as a response to an MPDU, and a block ACK frame is used as a response to an A-MPDU.

FIG. 20 is a diagram illustrating an ACK frame in a wireless communication system to which an embodiment of the present invention may be applied.

Referring to FIG. 20, the ACK frame includes a Frame Control field, a Duration field, an RA field, and an FCS.

The RA field is set as the value of the second address (Address 2) field of a data frame, a management frame, a block ACK request frame, a block ACK frame or a PS-Poll frame that has been received right before.

When an ACK frame is transmitted by a non-QoS STA, if a more fragments subfield within the Frame Control field of a data frame or a management frame that has been received right before is "0", a duration value is set to "0."

In an ACK frame not transmitted by a non-QoS STA, a duration value is set as a value (ms) obtained by subtracting the time required to send the ACK frame and an SIFS interval from the Duration/ID field of a data frame, a management frame, a block ACK request frame, a block ACK frame or a PS-Poll frame that has been received right before. If the calculated duration value is not an integer value, it is rounded off to the nearest whole number.

Hereinafter, a block ACK (request) frame is described.

FIG. 21 is a diagram illustrating a block ACK request frame in a wireless communication system to which an embodiment of the present invention may be applied.

Referring to FIG. 21, the Block ACK Request (BAR) frame includes a Frame Control field, a Duration/ID field, a Receiving Address (RA) field, a Transmitting Address (TA) field, a BAR Control field, a BAR Information field, and a frame check sequence (FCS).

The RA field may be set as the address of an STA that receives the BAR frame.

The TA field may be set as the address of an STA that sends the BAR frame.

The BAR Control field includes a BAR ACK Policy subfield, a Multi-TID subfield, a Compressed Bitmap subfield, a Reserved subfield, and a TID Information (TID_Info) subfield.

Table 10 illustrates the BAR Control field.

TABLE 10

| SUBFIELD | BIT | DESCRIPTION |
|---|---|---|
| BAR ACK policy | 1 | Set to "0" when a sender requests an immediate ACK for data transmission. Set to "1" when a sender does not request an immediate ACK for data transmission. |
| Multi-TID | 1 | Indicate the type of BAR frame depending on the value of a Multi-TID subfield and a Compressed Bitmap subfield. 00: Basic BAR 01: Compressed BAR 10: Reserved value 11: Multi-TID BAR |
| Compressed bitmap | 1 | |
| Reserved | 9 | |
| TID_Info | 4 | The meaning of a TID_Info field is determined by the type of BAR frame. Include TID that requests a BA frame in the case of a Basic BAR frame or a Compressed BAR frame. Include the number of TIDs in the case of a Multi-TID BAR frame |

The BAR Information field includes different information depending on the type of BAR frame. This is described with reference to FIG. 22.

FIG. 22 is a diagram illustrating the BAR Information field of a block ACK request frame in a wireless communication system to which an embodiment of the present invention may be applied.

FIG. 22(a) illustrates the BAR information field of a Basic BAR frame and a Compressed BAR frame, and FIG. 22(b) illustrates a BAR information field of a Multi-TID BAR frmame.

Referring to FIG. 22(a), in the case of the Basic BAR frame and the Compressed BAR frame, a BAR Information field includes a Block ACK Starting Sequence Control subfield.

Furthermore, the Block ACK Starting Sequence Control subfield includes a Fragment Number subfield and a Starting Sequence Number subfield.

The Fragment Number field is set to 0.

In the case of the Basic BAR frame, the Starting Sequence Number subfield includes the sequence number of the first MSDU in which a corresponding BAR frame is transmitted. In the case of the Compressed BAR frame, the Starting Sequence Control subfield includes the sequence number of the first MSDU or A-MSDU for transmitting a corresponding BAR frame.

Referring to FIG. 22(b), in the case of the Multi-TID BAR frame, the BAR Information field is configured in such a manner that a Per TID Info subfield and a Block ACK Starting Sequence Control subfield are repeated for one or more TIDs.

The Per TID Info subfield includes a Reserved subfield and a TID Value subfield. The TID Value subfield includes a TID value.

The Block ACK Starting Sequence Control subfield, as described above, includes a fragment number and a Starting Sequence Number subfield. The Fragment Number field is set to 0. The Starting Sequence Control subfield includes the sequence number of the first MSDU or A-MSDU for transmitting a corresponding BAR frame.

FIG. 23 is a diagram illustrating a block ACK frame in a wireless communication system to which an embodiment of the present invention may be applied.

Referring to FIG. 23, the Block ACK (BA) frame includes a Frame Control field, a Duration/ID field, a Reception Address (RA) field, a Transmitting Address (TA) field, a BA Control field, a BA Information field, and a frame check sequence (FCS).

The RA field may be set as the address of an STA that has requested a block ACK.

The TA field may be set as the address of an STA that sends a BA frame.

The BA Control field includes a BA ACK Policy subfield, a Multi-TID subfield, a Compressed Bitmap subfield, a Reserved subfield, and a TID Information (TID_Info) subfield.

Table 11 illustrates the BA Control field.

TABLE 11

| SUBFIELD | BIT | DESCRIPTION |
|---|---|---|
| BA ACK policy | 1 | Set to "0" when a sender requests an immediate ACK for data transmission. Set to "1" when a sender does not request an immediate ACK for data transmission. |
| Multi-TID | 1 | Indicate the type of BA frame depending on the values of a Multi-TID subfield and a Compressed Bitmap subfield. 00: Basic BA 01: Compressed BA 10: Reserved value 11: Multi-TID BA |
| Compressed bitmap | 1 | |
| Reserved | 9 | |
| TID_Info | 4 | The meaning of a TID_Info field is determined by the type of BA frame. Include TID that requests a BA frame in the case of a Basic BA frame, a Compressed BA frame. Include the number of TIDs in the case of a Multi-TID BA frame |

The BA Information field includes different information depending on the type of BA frame. This is described below with reference to FIG. 24.

FIG. 24 is a diagram illustrating the BA Information field of the block ACK frame in a wireless communication system to which an embodiment of the present invention may be applied.

FIG. 24(a) illustrates the BA Information field of a Basic BA frame, FIG. 24(b) illustrates the BA Information field of a Compressed BA frame, and FIG. 24(c) illustrates the BA Information field of a Multi-TID BA frame.

Referring to FIG. 24(a), in the case of the Basic BA frame, the BA Information field includes a Block ACK Starting Sequence Control subfield and a Block ACK Bitmap subfield.

The Block ACK Starting Sequence Control subfield includes a Fragment Number field and a Starting Sequence Number subfield as described above.

The Fragment Number field is set to 0.

The Starting Sequence Number subfield includes the sequence number of the first MSDU for transmitting a corresponding BA frame, and is set as the same value as the Basic BAR frame that has been received right before.

The Block ACK Bitmap subfield has the length of 128 octets and is used to indicate the reception state of a maximum of 64 MSDUs. In the Block ACK Bitmap subfield, a value "1" indicates that an MPDU corresponding to a corresponding bit location has been successfully received. A value "0" indicates that an MPDU corresponding to a corresponding bit location has not been successfully received.

Referring to FIG. 24(b), in the case of the Compressed BA frame, the BA Information field includes a Block ACK Starting Sequence Control subfield and a Block ACK Bitmap subfield.

The Block ACK Starting Sequence Control subfield includes a Fragment Number field and a Starting Sequence Number subfield as described above.

The Fragment Number field is set to 0.

The Starting Sequence Number subfield includes the sequence number of the first MSDU or A-MSDU for transmitting a corresponding BA frame, and is set as the same value as the Basic BAR frame that has been received right before.

The Block ACK Bitmap subfield has the length of 8 octets and is used to indicate the reception state a maximum of 64 MSDUs and A-MSDUs. In the Block ACK Bitmap subfield, a value "1" indicates that a single MSDU or A-MSDU corresponding to a corresponding bit location has been successfully received. A value "0" indicates that a single MSDU or A-MSDU corresponding to a corresponding bit location has not been successfully received.

Referring to FIG. 24(c), in the case of the Multi-TID BA frame, the BA Information field is configured in such a manner that a Per TID Info subfield, a Block ACK Starting Sequence Control subfield, and a Block ACK Bitmap subfield are repeated for one or more TIDs and is configured in order of an increasing TID.

The Per TID Info subfield includes a Reserved subfield and a TID Value subfield. The TID Value subfield includes a TID value.

The Block ACK Starting Sequence Control subfield includes a fragment number and a Starting Sequence Number subfield as described above. The Fragment Number field is set to 0. The Starting Sequence Control subfield includes the sequence number of the first MSDU or A-MSDU for transmitting a corresponding BA frame.

The Block ACK Bitmap subfield has a length of 8 octets. In the Block ACK Bitmap subfield, a value "1" indicates that a single MSDU or A-MSDU corresponding to a corresponding bit location has been successfully received. A value "0" indicates that a single MSDU or A-MSDU corresponding to a corresponding bit location has not been successfully received.

ACK(Acknowledgement) Transmission Method for Downlink Multi User Transmission

A new frame format and numerology for an 802.11ax system, that is, the next-generation WLAN system, are actively discussed in the situation in which vendors of various fields have lots of interests in the next-generation Wi-Fi and a demand for high throughput and quality of experience (QoE) performance improvement are increased after 802.11ac.

IEEE 802.11ax is one of WLAN systems recently and newly proposed as the next-generation WLAN systems for supporting a higher data rate and processing a higher user load, and is also called a so-called high efficiency WLAN (HEW).

An IEEE 802.11ax WLAN system may operate in a 2.4 GHz frequency band and a 5 GHz frequency band like the existing WLAN systems. Furthermore, the IEEE 802.11ax WLAN system may also operate in a higher 60 GHz frequency band.

In the IEEE 802.11ax system, an FFT size four times larger than that of the existing IEEE 802.11 OFDM systems (e.g., IEEE 802.11a, 802.11n, and 802.11ac) may be used in each bandwidth for average throughput enhancement and outdoor robust transmission for inter-symbol interference. This is described below with reference to related drawings.

In the following description of an HE format PPDU according to an embodiment of the present invention, the descriptions of the aforementioned non-HT format PPDU, HT mixed format PPDU, HT-green field format PPDU and/or VHT format PPDU may be reflected into the description of the HE format PPDU although they are not described otherwise.

FIG. 25 is a diagram illustrating a high efficiency (HE) format PPDU according to an embodiment of the present invention.

FIG. 25(a) illustrates a schematic configuration of the HE format PPDU, and FIGS. 25(b) to 25(d) illustrate more detailed configurations of the HE format PPDU.

Referring to FIG. 25(a), the HE format PPDU for an HEW may basically include a legacy part (L-part), an HE-part, and an HE-data field.

The L-part includes an L-STF, an L-LTF, and an L-SIG field as in a form maintained in the existing WLAN system. The L-STF, the L-LTF, and the L-SIG field may be called a legacy preamble.

The HE-part is a part newly defined for the 802.11ax standard and may include an HE-STF, an HE-SIG field, and an HE-LTF. In FIG. 25(a), the sequence of the HE-STF, the HE-SIG field, and the HE-LTF is illustrated, but the HE-STF, the HE-SIG field, and the HE-LTF may be configured in a different sequence. Furthermore, the HE-LTF may be omitted. Not only the HE-STF and the HE-LTF, but the HE-SIG field may be commonly called an HE-preamble.

The HE-SIG may include information (e.g., OFDMA, UL MU MIMO, and improved MCS) for decoding the HE-data field.

The L-part and the HE-part may have different fast Fourier transform (FFT) sizes (i.e., different subcarrier spacing) and use different cyclic prefixes (CPs).

In an 802.11ax system, an FFT size four times (4×) larger than that of a legacy WLAN system may be used. That is, the L-part may have a 1× symbol structure, and the HE-part (more specifically, HE-preamble and HE-data) may have a 4× symbol structure. In this case, the FFT of a 1×, 2×, or 4× size means a relative size for a legacy WLAN system (e.g., IEEE 802.11a, 802.11n, and 802.11ac).

For example, if the sizes of FFTs used in the L-part are 64, 128, 256, and 512 in 20 MHz, 40 MHz, 80 MHz, and 160 MHz, respectively, the sizes of FFTs used in the HE-part may be 256, 512, 1024, and 2048 in 20 MHz, 40 MHz, 80 MHz, and 160 MHz, respectively.

If an FFT size is larger than that of a legacy WLAN system as described above, subcarrier frequency spacing is reduced. Accordingly, the number of subcarriers per unit frequency is increased, but the length of an OFDM symbol is increased.

That is, if a larger FFT size is used, it means that subcarrier spacing is narrowed. Likewise, it means that an inverse discrete Fourier transform (IDFT)/discrete Fourier transform (DFT) period is increased. In this case, the IDFT/DFT period may mean a symbol length other than a guard interval (GI) in an OFDM symbol.

Accordingly, if an FFT size four times larger than that of the L-part is used in the HE-part (more specifically, the HE-preamble and the HE-data field), the subcarrier spacing of the HE-part becomes ¼ times the subcarrier spacing of the L-part, and the IDFT/DFT period of the HE-part is four times the IDFT/DFT period of the L-part. For example, if the subcarrier spacing of the L-part is 312.5 kHz (=20 MHz/64, 40 MHz/128, 80 MHz/256 and/or 160 MHz/512), the subcarrier spacing of the HE-part may be 78.125 kHz (=20 MHz/256, 40 MHz/512, 80 MHz/1024 and/or 160 MHz/2048). Furthermore, if the IDFT/DFT period of the L-part is 3.2 μs (=1/312.5 kHz), the IDFT/DFT period of the HE-part may be 12.8 μs (=1/78.125 kHz).

In this case, since one of 0.8 μs, 1.6 μs, and 3.2 μs may be used as a GI, the OFDM symbol length (or symbol interval) of the HE-part including the GI may be 13.6 μs, 14.4 μs, or 16 μs depending on the GI.

Referring to FIG. 25(b), the HE-SIG field may be divided into an HE-SIG-A field and an HE-SIG-B field.

For example, the HE-part of the HE format PPDU may include an HE-SIG-A field having a length of 12.8 μs, an HE-STF of 1 OFDM symbol, one or more HE-LTFs, and an HE-SIG-B field of 1 OFDM symbol.

Furthermore, in the HE-part, an FFT size four times larger than that of the existing PPDU may be applied from the HE-STF other than the HE-SIG-A field. That is, FFTs having 256, 512, 1024, and 2048 sizes may be applied from the HE-STFs of the HE format PPDUs of 20 MHz, 40 MHz, 80 MHz, and 160 MHz, respectively.

In this case, if the HE-SIG field is divided into the HE-SIG-A field and the HE-SIG-B field as in FIG. 25(b), the positions of the HE-SIG-A field and the HE-SIG-B field may be different from those of FIG. 25(b). For example, the HE-SIG-B field may be transmitted after the HE-SIG-A field, and the HE-STF and the HE-LTF may be transmitted after the HE-SIG-B field. In this case, an FFT size four times larger than that of the existing PPDU may be applied from the HE-STF.

Referring to FIG. 11(c), the HE-SIG field may not be divided into an HE-SIG-A field and an HE-SIG-B field.

For example, the HE-part of the HE format PPDU may include an HE-STF of 1 OFDM symbol, an HE-SIG field of 1 OFDM symbol, and one or more HE-LTFs.

In the manner similar to that described above, an FFT size four times larger than that of the existing PPDU may be applied to the HE-part. That is, FFT sizes of 256, 512, 1024, and 2048 may be applied from the HE-STF of the HE format PPDU of 20 MHz, 40 MHz, 80 MHz, and 160 MHz, respectively.

Referring to FIG. 25(d), the HE-SIG field is not divided into an HE-SIG-A field and an HE-SIG-B field, and the HE-LTF may be omitted.

For example, the HE-part of the HE format PPDU may include an HE-STF of 1 OFDM symbol and an HE-SIG field of 1 OFDM symbol.

In the manner similar to that described above, an FFT size four times larger than that of the existing PPDU may be applied to the HE-part. That is, FFT sizes of 256, 512, 1024, and 2048 may be applied from the HE-STF of the HE format PPDU of 20 MHz, 40 MHz, 80 MHz, and 160 MHz, respectively.

The HE format PPDU for a WLAN system according to an embodiment of the present invention may be transmitted through at least one 20 MHz channel. For example, the HE format PPDU may be transmitted in a 40 MHz, 80 MHz or 160 MHz frequency band through a total of four 20 MHz channels. This is described in more detail.

An HE format PPDU for a WLAN system to which an embodiment of the present invention may be applied may be transmitted through at least one 20 MHz channel. For example, the HE format PPDU may be transmitted in a 40 MHz, 80 MHz or 160 MHz frequency band through a total of four 20 MHz channels. This is described in more detail below with reference to the following drawing.

The following PPDU format is described based on FIG. 25(b), for convenience of description, but the present invention is not limited thereto.

FIG. 26 is a diagram illustrating an HE format PPDU according to an embodiment of the present invention.

FIG. 26 illustrates a PPDU format if an 80 MHz frequency band has been allocated to one STA (or if an OFDMA resource unit has been allocated to a plurality of STAs within an 80 MHz frequency band) or if different streams each having an 80 MHz frequency band have been allocated to a plurality of STAs.

Referring to FIG. 26, an L-STF, an L-LTF, and an L-SIG field may be transmitted in an OFDM symbol generated based on 64 FFT points (or 64 subcarriers) in each 20 MHz channel.

An HE-SIG A field may include common control information in common transmitted to STAs that receive a PPDU. The HE-SIG A field may be transmitted in one to three OFDM symbols. The HE-SIG A field may be duplicated in a 20 MHz unit and includes the same information. Furthermore, the HE-SIG-A field provides notification of information about the full bandwidth of a system.

Table 12 illustrates information included in the HE-SIG A field.

TABLE 12

| FIELD | BIT | DESCRIPTION |
| --- | --- | --- |
| Bandwidth | 2 | Indicates a bandwidth in which a PPDU is transmitted. For example, 20 MHz, 40 MHz, 80 MHz or 160 MHz |
| Group ID | 6 | Indicates an STA or a group of STAs that will receive a PPDU |
| Stream information | 12 | Indicate the position or number of spatial streams for each STA or indicate the position or number of spatial streams for a group of STAs |
| UL indication | 1 | Indicate whether a PPDU is directed toward an AP (uplink) or an STA (downlink) |
| MU indication | 1 | Indicate whether a PPDU is an SU-MIMO PPDU or an MU-MIMO PPDU |
| GI indication | 1 | Indicate whether a short GI or a long GI is used |
| Allocation information | 12 | Indicate a band or channel (a subchannel index or subband index) allocated to each STA in a band in which a PPDU is transmitted |
| Transmission power | 12 | Indicate transmission power for each channel or each STA |

Pieces of information included in each of the fields illustrated in Table 12 may comply with the definition of the IEEE 802.11 system. Furthermore, each of the aforementioned fields corresponds to an example of fields which may be included in a PPDU, but is not limited thereto. That is, each of the aforementioned fields may be replaced with another field or an additional field may be further included and all of the fields may not be essentially included.

The HE-STF is used to improve performance of AGC estimation in MIMO transmission.

The HE-SIG B field may include user-specific information which is required for each of STAs to receive its data (e.g., a PSDU). The HE-SIG B field may be transmitted in one or two OFDM symbols. For example, the HE-SIG B field may include information about a modulation and coding scheme (MCS) for a corresponding PSDU and the length of the corresponding PSDU.

The L-STF, L-LTF, the L-SIG field, and the HE-SIG A field may be repeated in a 20 MHz channel unit and transmitted. For example, when a PPDU is transmitted through four 20 MHz channels (i.e., 80 MHz bands), the L-STF, the L-LTF, the L-SIG field, and the HE-SIG A field may be repeated every 20 MHz channel and transmitted.

If the size of FFT increases, a legacy STA supporting the existing IEEE 802.11a/g/n/ac may not decode a corresponding HE PPDU. In order for a legacy STA and an HE STA to coexist, the L-STF, L-LTF, and the L-SIG field are transmitted through 64 FFT in a 20 MHz channel so that a legacy STA can receive them. For example, the L-SIG field may occupy one OFDM symbol, and one OFDM symbol time may be 4 μs, and a GI may be 0.8 μs.

The size of FFT for each frequency unit may be further increased from the HE-STF (or the HE-SIG A field). For example, 256 FFT may be used in a 20 MHz channel, 512 FFT may be used in a 40 MHz channel, and 1024 FFT may be used in an 80 MHz channel. If the size of FFT increases, the number of OFDM subcarriers per unit frequency increases because spacing between the OFDM subcarriers is reduced, but the OFDM symbol time is increased. In order to improve efficiency of a system, the length of a GI after the HE-STF may be set to be the same as that of the HE-SIG A field.

The HE-SIG A field may include information which is required for an HE STA to decode an HE PPDU. However, the HE-SIG A field may be transmitted through 64 FFT in a 20 MHz channel so that both a legacy STA and an HE STA can receive the HE-SIG A field. The reason for this is that the HE STA has to receive an existing HT/VHT format PPDU in addition to an HE format PPDU and a legacy STA and the HE STA have to distinguish the HT/VHT format PPDU from the HE format PPDU.

FIG. 27 is a diagram illustrating an HE format PPDU according to an embodiment of the present invention.

Referring to FIG. 27, the HE format PPDU is the same as that of FIG. 26 except that an HE-SIG B field is located after an HE-SIG A field. In this case, the size of FFT per unit frequency may be further increased after an HE-STF (or the HE-SIG B field). For example, 256 FFT may be used in a 20 MHz channel, 512 FFT may be used in a 40 MHz channel, and 1024 FFT may be used in an 80 MHz channel from the HE-STF (or the HE-SIG B field).

FIG. 28 is a diagram illustrating an HE format PPDU according to an embodiment of the present invention.

In FIG. 28, it is assumed that 20 MHz channels are allocated to different STAs (e.g., an STA 1, an STA 2, an STA 3, and an STA 4).

Referring to FIG. 28, an HE-SIG B field is located after an HE-SIG A field. In this case, the size of FFT per unit frequency may be further increased after an HE-STF (or the HE-SIG B field). For example, 256 FFT may be used in a 20 MHz channel, 512 FFT may be used in a 40 MHz channel, and 1024 FFT may be used in an 80 MHz channel from an HE-STF (or the HE-SIG B field).

Information transmitted in each of the fields included in the HE format PPDU is the same as that of FIG. 26, and a description thereof is omitted.

The HE-SIG B field may include information specified for each of the STAs, but may be encoded in a full band (i.e., indicated in the HE-SIG-A field). That is, the HE-SIG B field includes information about all of the STAs and is received by all of the STAs.

The HE-SIG B field may provide notification of information about a frequency bandwidth allocated to each of the STAs and/or stream information in a corresponding frequency band. For example, in the HE-SIG-B field of FIG. 28, a 20 MHz frequency band may be allocated to the STA 1, a next 20 MHz frequency band may be allocated to the STA 2, a next 20 MHz frequency band may be allocated to the STA 3, and a next 20 MHz frequency band may be allocated to the STA 4. Furthermore, a 40 MHz frequency band may be allocated to the STA 1 and the STA 2, and a next 40 MHz frequency band may be allocated to the STA 3 and the STA 4. In this case, different streams may be allocated to the STA 1 and the STA 2, and different streams may be allocated to the STA 3 and the STA 4.

Furthermore, an HE-SIG-C field may be defined and added to the example of FIG. 28. In this case, in the HE-SIG-B field, information about all of the STAs may be transmitted in a full band, and control information specific to each of the STAs may be transmitted in a 20 MHz unit through the HE-SIG-C field.

Furthermore, in the examples of FIGS. 26 to 28, the HE-SIG-B field is not transmitted in a full band, but may be transmitted in a 20 MHz unit like the HE-SIG-A field. This is described below with reference to the following drawing.

FIG. 29 is a diagram illustrating an HE format PPDU according to an embodiment of the present invention.

In FIG. 29, it is assumed that 20 MHz channels are allocated to different STAs (e.g., an STA 1, an STA 2, an STA 3, and an STA 4).

Referring to FIG. 29, as in FIG. 28, an HE-SIG B field is located after an HE-SIG A field. In this case, the HE-SIG B field is not transmitted in a full band and is transmitted in a 20 MHz unit like the HE-SIG A field.

In this case, the size of FFT per unit frequency may be further increased from an HE-STF (or the HE-SIG B field). For example, 256 FFT may be used in a 20 MHz channel, 512 FFT may be used in a 40 MHz channel, and 1024 FFT may be used in an 80 MHz channel from the HE-STF (or the HE-SIG B field).

Information transmitted in each of the fields included in the HE format PPDU is the same as that of FIG. 26, and a description thereof is omitted.

The HE-SIG A field may be may be duplicated in a 20 MHz unit and transmitted.

The HE-SIG B field may provide notification of information about a frequency band width allocated to each of the STAs and/or stream information in a corresponding frequency band.

The HE-SIG B field may be transmitted in a 20 MHz unit like the HE-SIG A field. In this case, the HE-SIG B field includes information about each of the STAs, and thus information about each of the STAs may be included in each HE-SIG B field of a 20 MHz unit. In this case, FIG. 29 illustrates an example in which a 20 MHz frequency band is allocated to each of the STAs. For example, if a 40 MHz frequency band is allocated to an STA, the HE-SIG-B field may be duplicated in a 20 MHz unit and transmitted.

Furthermore, information about all of the STAs (i.e., all of pieces of information specific to the STAs are combined) may be included in the HE-SIG B field and may be duplicated in a 20 MHz unit like the HE-SIG A field and transmitted.

As in the examples of FIGS. 27 to 29, if the HE-SIG-B field is placed ahead of the HE STF and the HE-LTF, the length of a symbol may be configured to be short using 64 FFT in 20 MHz. As in the example of FIG. 26, if the HE-SIG-B field is placed behind the HE STF and the HE-LTF, the length of a symbol may be configured to be long using 256 FFT in 20 MHz.

If some bandwidth having a small interference level from a neighbor BSS are allocated to an STA in a situation in which a different bandwidth is supported for each BSS, it may be preferred that the HE-SIG-B field is not transmitted in a full band as described above.

In FIGS. 26 to 29, a data field is payload and may include a SERVICE field, a scrambled PSDU, tail bits, and padding bits.

FIG. 30 is a diagram illustrating an HE format PPDU of a 20 MHz band according to an embodiment of the present invention.

Referring to FIG. 30, in the structure of the HE format PPDU of a 20 MHz band, an L-part (i.e., an L-STF, an L-LTF and an L-SIG field) and an HE-SIG (e.g., HE-SIG A) field are transmitted as in the legacy structure (64 FFT).

As shown in FIG. 30(a), different FFT (e.g., 256 FFT) may be used from an HE-STF.

An HE-LTF may be transmitted in an HE-SIG2 (e.g., an HE-SIG B) field, but only an HE-LTF for the first stream may be transmitted prior to the HE-SIG2 field and the remaining HE-LTF may be transmitted after the HE-SIG2.

Furthermore, as shown in FIG. 30(b), if the HE-SIG2 (e.g., the HE-SIG B) field is located before the HE-STF and the HE-LTF, the HE-SIG2 field of 64 FFT may be used and different FFT (e.g., 256 FFT) may be used from the HE-STF. In this case, the HE-SIG2 field may be transmitted as in the legacy structure (64 FFT), but the size of FFT is the same as the legacy structure, but the number of tones used may be different. Furthermore, as shown in FIG. 30(a), different FFT (e.g., 256 FFT) may be used from the HE-SIG2 field.

FIG. 31 is a diagram illustrating an HE format PPDU of a 40 MHz band according to an embodiment of the present invention.

Referring to FIG. 31, the structure of an HE format PPDU of more than a 20 MHz band (e.g., 40, 80 or 160 MHz) is based on the aforementioned 20 MHz structure, but an L-part (i.e., an L-STF, an L-LTF, and an L-SIG field) and an HE-SIG field (e.g., an HE-SIG A field) are duplicated in a 20 MHz unit.

As shown in FIG. 31(a), data is loaded in a full band from an HE-STF. Furthermore, different FFT (e.g., 512 FFT) may be used from the HE-STF.

As shown in FIG. 31(b), data is loaded in a full band from an HE-SIG2 field (e.g., an HE-SIG B field). In this case, as in the existing structure, the HE-SIG2 field is transmitted with the number of bands (in the case of FIG. 31, 128 FFT) of a 64 FFT×20 MHz unit, and different FFT (e.g., 512 FFT) may be used from the HE-STF. Furthermore, the HE-SIG2 field may be duplicated in a 20 MHz unit and transmitted using existing FFT or extended FFT (e.g., 512 FFT) used from the HE-STF may be used.

FIG. 32 illustrates a phase rotation for detecting an HE format PPDU according to an embodiment of the present invention.

In order to classify HE format PPDUs, the phases of three OFDM symbols transmitted after an L-SIG field in an HE format PPDU may be used.

Referring to FIG. 30, in the HE format PPDU, the phases of an OFDM symbol #1 and an OFDM symbol #2 transmitted after an L-SIG field are not rotated, but the phase of an OFDM symbol #3 may be rotated 90 degrees counter-clockwise. That is, BPSK may be used as a modulation method for the OFDM symbol #1 and the OFDM symbol #2, and QBPSK may be used as a modulation method for the OFDM symbol #3.

An STA attempts to decode a first OFDM symbol to a third OFDM symbol transmitted after the L-SIG field of a received PPDU based on a constellation, such as that of FIG. 32. If the decoding is successful, the STA may determine the corresponding PPDU to be an HE format PPDU.

In this case, if the HE-SIG A field is transmitted in three OFDM symbols after the L-SIG field, this means that all of the OFDM symbol #1 to the OFDM symbol #3 are used to send the HE-SIG A field.

A multi-user UL transmission method in a WLAN system is described below.

A method of transmitting, by an AP operating in a WLAN system, data to a plurality of STAs on the same time resource may be called downlink multi-user (DL MU) transmission. In contrast, a method of transmitting, by a plurality of STAs operating in a WLAN system, data to an AP on the same time resource may be called uplink multi-user (UL MU) transmission.

Such DL MU transmission or UL MU transmission may be multiplexed on a frequency domain or a space domain.

If DL MU transmission or UL MU transmission is multiplexed on the frequency domain, different frequency resources (e.g., subcarriers or tones) may be allocated to each of a plurality of STAs as DL or UL resources based on orthogonal frequency division multiplexing (OFDMA). A transmission method through different frequency resources in such the same time resources may be called "DL/UL OFDMA transmission."

If DL MU transmission or UL MU transmission is multiplexed on the space domain, different spatial streams may be allocated to each of a plurality of STAs as DL or UL resources. A transmission method through different spatial streams on such the same time resources may be called "DL/UL MU MIMO transmission."

Current WLAN systems do not support UL MU transmission due to the following constraints.

Current WLAN systems do not support synchronization for the transmission timing of UL data transmitted by a plurality of STAs. For example, assuming that a plurality of STAs transmits UL data through the same time resources in the existing WLAN system, in the present WLAN systems, each of a plurality of STAs is unaware of the transmission timing of UL data of another STA. Accordingly, an AP may not receive UL data from each of a plurality of STAs on the same time resource.

Furthermore, in the present WLAN systems, overlap may occur between frequency resources used by a plurality of STAs in order to transmit UL data. For example, if a plurality of STAs has different oscillators, frequency offsets may be different. If a plurality of STAs having different frequency offsets performs UL transmission at the same time through different frequency resources, frequency regions used by a plurality of STAs may partially overlap.

Furthermore, in existing WLAN systems, power control is not performed on each of a plurality of STAs. An AP dependent on the distance between each of a plurality of STAs and the AP and a channel environment may receive signals of different power from a plurality of STAs. In this case, a signal having weak power may not be relatively detected by the AP compared to a signal having strong power.

Accordingly, an embodiment of the present invention proposes an UL MU transmission method in a WLAN system.

FIG. 33 is a diagram illustrating an UL MU transmission procedure according to an embodiment of the present invention.

Referring to FIG. 33, an AP instructs STAs participating in UL MU transmission to prepare UL MU transmission, receives an UL MU data frame from corresponding STAs, and transmits an ACK frame (a Block ACK (BA) frame) as a response to the UL MU data frame.

First, the AP instructs the STAs which will send UL MU data to prepare UL MU transmission by sending an UL MU trigger frame 3310 to the STAs. In this case, the UL MU scheduling frame may also be called a term "UL MU Scheduling frame."

In this case, the UL MU trigger frame 3310 may include STA identifier (ID)/address information, information about the allocation of resources to be used by each of the STAs, and control information such as duration information.

The STA ID/address information may mean information about an ID or address for specifying each of the STAs which transmits uplink data.

The resource allocation information means information about uplink transmission resources (e.g., frequency/subcarrier information allocated to each of the STAs in the case of UL OFDMA transmission, and a stream index allocated to each of the STAs in the case of UL MU MIMO transmission) allocated to each of the STAs.

The duration information means information for determining time resources for the transmission of an UL data frame transmitted by the plurality of STAs.

For example, the duration information may include information about the interval of a transmit opportunity (TXOP) allocated to the uplink transmission of each of the STAs and information (e.g., a bit or symbol) about the length of an uplink frame.

Furthermore, the UL MU trigger frame 3310 may further include control information, such as MCS information and/or coding information to be used when the UL MU data frame is transmitted by each of the STAs.

Such control information may be transmitted in the HE-part (e.g., the HE-SIG A field or the HE-SIG B field) of a PPDU that delivers the UL MU trigger frame 3310 or the control field (e.g., the Frame Control field of an MAC frame) of the UL MU trigger frame 3310.

The PPDU that delivers the UL MU trigger frame 3310 has a structure starting from the L-part (e.g., the L-STF, the L-LTF, and the L-SIG field). Accordingly, legacy STAs may perform network allocation vector (NAV) setting through L-SIG protection from the L-SIG field. For example, the legacy STAs may calculate an interval (hereinafter referred to as an "L-SIG protection interval") for NAV setting based on a data length and data rate information in the L-SIG field. Furthermore, the legacy STAs may determine that there is no data to be transmitted thereto during the calculated L-SIG protection interval.

For example, the L-SIG protection interval may be determined to be the sum of the value of the MAC Duration field of the UL MU trigger frame 3310 and the remaining interval after the L-SIG field of a PPDU that delivers the UL MU trigger frame 3310. Accordingly, the L-SIG protection interval may be set as a value up to the interval in which an ACK frame 3330 (or a BA frame) transmitted to each of the STAs is transmitted based on the MAC duration value of the UL MU trigger frame 3310.

A method for allocating resources for UL MU transmission to each of the STAs is described in more detail below. For convenience of description, fields including control information are classified and described, but the present invention is not limited thereto.

A first field may distinguish and indicate UL OFDMA transmission and UL MU MIMO transmission. For example, if the first field is "0", it may indicate UL OFDMA transmission. If the first field is "1", it may indicate UL MU MIMO transmission. The size of the first field may include 1 bit.

A second field (e.g., an STA ID/Address field) provides notification of the IDs or addresses of STAs that will participate in UL MU transmission. The size of the second field may include the number of bits for providing notification of the STA IDs×the number of STAs that will participate in UL MU transmission. For example, if the second field includes 12 bits, it may indicate the ID/address of each of STAs for every 4 bits.

A third field (e.g., a resource allocation field) indicates a resource area allocated to each of STAs for UL MU transmission. In this case, the resource areas allocated to the STAs may be sequentially indicated for the STAs in order of the previous second field.

If a value of the first field is "0", the third field indicates frequency information (e.g., a frequency index and a subcarrier index) for UL MU transmission in order of STA IDs/addresses included in the second field. If the first field value is "1", the third field indicates MIMO information (e.g., a stream index) for UL MU transmission in order of STA IDs/addresses included in the second field.

In this case, since one STA may be notified of several indices (i.e., a frequency/subcarrier index or a stream index), the size of the third field may include a plurality of bits (or may be configured in a bitmap form)×the number of STAs that will participate in UL MU transmission.

For example, it is assumed that the second field is set in order of the "STA 1" and the "STA 2" and the third field is set in order of "2" and "2."

In this case, if the first field is "0", frequency resources may be allocated to the STA 1 from a higher (or lower) frequency region, and next frequency resources may be sequentially allocated to the STA 2. For example, if OFDMA of a 20 MHz unit is supported in an 80 MHz band, the STA 1 may use a higher (or lower) 40 MHz band, and the STA 2 may use a next 40 MHz band.

In contrast, if the first field is "1", a higher (or lower) stream may be allocated to the STA 1 and next streams may be sequentially allocated to the STA 2. In this case, a beamforming scheme according to each stream may have been previously designated, or more detailed information about a beamforming scheme according to a stream may be included in the third field or a fourth field.

The STAs transmit respective UL MU data frames 3321, 3322, and 3323 to the AP based on the UL MU trigger frame 3310 transmitted by the AP. In this case, the STAs may transmit the UL MU data frames 3321, 3322, and 3323 to the AP after an SIFS since the UL MU trigger frame 3310 was received from the AP.

Each of the STAs may determine a specific frequency resource for UL OFDMA transmission or a spatial stream for UL MU MIMO transmission based on the resource allocation information of the UL MU trigger frame 3310.

More specifically, in the case of UL OFDMA transmission, the STAs may transmit the UL data frames on the same time resource through different frequency resources.

In this case, different frequency resources for UL data frame transmission may be allocated to the STA 1 to the STA 3 based on STA ID/address information and resource allocation information included in the UL MU trigger frame 3310. For example, the STA ID/address information may sequentially indicate the STA 1 to the STA 3, and the resource allocation information may sequentially indicate a frequency resource 1, a frequency resource 2, and a frequency resource 3. In this case, the frequency resource 1, frequency resource 2, and frequency resource 3 sequentially indicated based on the resource allocation information may be allocated to the STA 1 to STA 3 sequentially indicated based on the STA ID/address information, respectively. That is, the STA 1 may transmit the UL data frame 3321 to the AP through the frequency resource 1, the STA 2 may transmit the UL data frame 3222 to the AP through the frequency resource 2, and the STA 3 may transmit the UL data frame 3323 to the AP through the frequency resource 3.

Furthermore, in the case of UL MU MIMO transmission, each of the STAs may transmit the UL data frame on the same time resource through at least one different stream of a plurality of spatial streams.

In this case, the spatial stream for UL data frame transmission may be allocated to each of the STA 1 to the STA 3 based on the STA ID/address information and resource allocation information included in the UL MU trigger frame 3310. For example, the STA ID/address information may sequentially indicate the STA 1 to the STA 3, and the resource allocation information may sequentially indicate a spatial stream 1, a spatial stream 2, and a spatial stream 3. In this case, the spatial stream 1, spatial stream 2, and spatial stream 3 sequentially indicated based on the resource allocation information may be allocated to the STA 1 to the STA 3 sequentially indicated based on the STA ID/address information, respectively. That is, the STA 1, the STA 2, and the STA 3 may transmit the UL data frames 3321, 3322, and 3323 to the AP through the spatial stream 1, the spatial stream 2, and the spatial stream 3, respectively.

As described above, transmission duration (or transmission termination time) of each of the UL data frames 3321, 3322, and 3323 transmitted by the respective STAs may be determined by MAC duration information included in the UL MU trigger frame 3310. Accordingly, the STAs may synchronize the transmission termination times of the UL data frames 3321, 3322, and 3323 (or an uplink PPDU in which the UL data frame is delivered) based on an MAC duration value included in the UL MU trigger frame 3310 through bit padding or fragmentation.

The PPDU in which the UL data frames 3321, 3322, and 3323 are delivered may also be configured as a new structure without an L-part.

Furthermore, in the case of UL MU MIMO transmission or UL MU OFDMA transmission of a subband form of less than 20 MHz, the L-part of a PPDU in which the UL data frames 3321, 3322, and 3323 are delivered may be transmitted in an SFN form (i.e., all of the STAs transmit the same L-part configuration and contents at the same time). In contrast, in the case of UL OFDMA transmission of a subband form of 20 MHz or higher, the L-part of a PPDU in which the UL data frames 3321, 3322, and 3323 are delivered may be transmitted in a 20 MHz unit in a band to which each of the STAs has been allocated.

As described above, an MAC duration value may be set as a value up to the interval in which the ACK frame 3330 is transmitted in the UL MU trigger frame 3310. An L-SIG protection interval may be determined based on the MAC duration value. Accordingly, a legacy STA may perform NAV setting up to the ACK frame 3330 through the L-SIG field of the UL MU trigger frame 3310.

If an UL data frame can be sufficiently configured based on information about the UL MU trigger frame 3310, an HE-SIG field (i.e., a region in which control information about a method for configuring a data frame is transmitted) may not be present in a PPDU in which the UL MU trigger frame 3310 is delivered. For example, an HE-SIG-A field and/or an HE-SIG-B field may not be transmitted. Furthermore, an HE-SIG-A field and an HE-SIG-C field are transmitted, but an HE-SIG-B field may not be transmitted.

The AP may transmit the ACK frame 3330 (or the BA frame) as a response to the UL data frames 3321, 3322, and 3323 received from the respective STAs. In this case, the AP may receive the UL data frames 3321, 3322, and 3323 from the STAs and may transmit the ACK frame 3330 to each of the STAs after an SIFS.

If the structure of an existing ACK frame is used in the same manner, the existing ACK frame may be configured to include the AID (or a partial AID (PAD)) of STAs, participating in UL MU transmission, in an RA field having a size of 6 octets.

Alternatively, if an ACK frame having a new structure is configured, the ACK frame may be configured in a form for DL SU transmission or DL MU transmission. That is, in the case of DL SU transmission, the ACK frame 3330 may be sequentially transmitted to the STAs participating in UL MU transmission. In the case of DL MU transmission, the ACK frame 3330 may be simultaneously transmitted to the STAs participating in UL MU transmission through resources (i.e., a frequencies or streams) allocated to the STAs.

The AP may transmit only the ACK frame 3330 for an UL MU data frame that has been successfully received to a corresponding STA. Furthermore, the AP may provide notification of whether the reception is successful through ACK or NACK through the ACK frame 3330. If the ACK frame 3330 includes NACK information, information (e.g., UL MU scheduling information) for a reason of NACK or a subsequent procedure may also be included.

Alternatively, a PPDU in which the ACK frame 3330 is delivered may be configured as a new structure without an L-part.

The ACK frame 3330 may also include STA ID or address information. If the sequence of STAs indicated in the UL MU trigger frame 3310 is applied in the same manner, the STA ID or address information may be omitted.

Furthermore, the TXOP (i.e., the L-SIG protection interval) of the ACK frame 3330 may be extended, and a frame for next UL MU scheduling or a Control frame including adjustment information for next UL MU transmission may be included in the TXOP.

For UL MU transmission, an adjustment process for synchronization between the STAs may be added.

FIG. 34 is a diagram illustrating a resource allocation unit in an OFDMA MU transmission method according to an embodiment of the present invention.

Referring to FIG. 34, when a DL/UL MU OFDMA transmission method is used, a plurality of resource units 3402 may be configured in an n-tone (or subcarrier) unit in a 20 MHz band. One or more resource units 3402 may be allocated to one STA as DL/UL resources, and thus different resource units 3402 may be allocated to a plurality of STAs.

Furthermore, if a 20 MHz band is allocated to one STA, a resource unit 3401 is configured in an N-tone (or subcarrier) unit.

For example, 9 resource units 3402 may be determined in a 26-tone unit in a 20 MHz unit, and different resource units 3402 may be allocated to a maximum of 9 STAs. Furthermore, if the entire 20 MHz is to be allocated to one STA, a 242-tone resource unit 3401 may be used.

In the case of downlink, the data fields of a PPDU of a 20 MHz unit may be multiplexed in a frequency domain a 26-tone unit allocated to STAs and simultaneously transmitted to a maximum of 9 STAs. In the case of uplink, if resources are allocated in a 26-tone unit for each STA, each of the 9 STAs may configure the data field of a PPDU in a 26-tone unit allocated thereto, and the 9 STAs may transmit the data fields to the AP at the same time.

In a 40 MHz unit, the resource unit of the 20 MHz unit may be duplicated in a 20 MHz unit and may determine a resource unit of the 40 MHz unit.

For example, in a 40 MHz unit, 18 resource units may be determined in a 26-tone unit. Furthermore, if one additional resource unit of a 26-tone unit can be used at the center of a 40 MHz bandwidth, a total of 19 resource units may be used in the 40 MHz unit.

Furthermore, if a full 40 MHz bandwidth is to be allocated to one STA, two resource units may be used in a 242-tone unit. Furthermore, if one or two additional resource units of a 26-tone unit can be further used at the center of the 40 MHz bandwidth, two resource units in the 242-tone unit and one or two remaining tones in the 26-tone unit may be allocated.

Likewise, in an 80 MHz unit, the resource unit of the 40 MHz unit may be duplicated in a 40 MHz unit, and thus determines a resource unit of the 80 MHz unit. Furthermore, the resource unit of the 40 MHz unit may be duplicated in a 40 MHz unit, and one additional resource unit of a 26-tone unit may be further used at the center of an 80 MHz bandwidth.

When an UL MU data frame is transmitted, the UL MU data frame may be transmitted in a 20 MHz, 40 MHz, 80 MHz or 160 MHz band.

If a full bandwidth is 20 MHz or higher, if an UL MU data frame has to be transmitted along with an L-part (and an HE-SIG) duplicated in a 20 MHz unit when the UL MU data frame is transmitted, the L-part (and HE-SIG) of a 20 MHz band to which a resource unit allocated thereto is transmitted.

For example, if a full bandwidth is 40 MHz (0~40 MHz), a 0~10 MHz region has been allocated to an STA 1 and a 20~30 MHz region has been allocated to an STA 2, the STA 1 transmits an L-part (and an HE-SIG) in the 0~20 MHz region and transmits an MAC data field (i.e., the data field of a PPDU) in the 0~10 MHz region. The STA 2 transmits an L-part (and an HE-SIG) in the 20~40 MHz region and transmits an MAC data field (i.e., the data field of a PPDU) in the 20~30 MHz region.

If an STA duplicates an L-part in a 20 MHz unit regardless of a frequency resource region allocated thereto and transmits the L-part in a full bandwidth (in the above example, if both the STA 1 and the STA 2 duplicate the L-parts in a 20 MHz unit and transmit them in a full bandwidth 40 MHz), a problem in which power of the L-part is relatively higher than that of a data field may be generated. Furthermore, efficiency of use of radio resources may be deteriorated because surrounding STAs recognize that STAs (in the above example, the STA 1 and the STA 2) performing UL transmission also use frequency resources other than frequency resources allocated thereto and thus do not use the frequency resources.

In an 802.11ac WLAN system, DL MU transmission has been included, but as in the example of FIG. 19, only DL MU MIMO has been proposed and UL ACK frames are sequentially transmitted using a BAR by an AP other than MU. That is, in the 802.11ac WLAN system, the UL ACK frame is transmitted in an SU frame form other than an MU frame form.

An embodiment of the present invention proposes a DL multi-user (MU) transmission method and, more specifically, proposes a method for configuring an UL MU ACK/BA frame in a DL MU transmission procedure.

In an embodiment of the present invention, multi-user (MU) transmission includes all of cases in which multiple users perform transmission at the same time in the same time domain as in OFDMA or MU MIMO.

In an embodiment of the present invention, in DL MU transmission, a corresponding UL MU ACK frame may be transmitted using the OFDMA method regardless of whether any MU method is used as in OFDMA and/or MU MIMO.

Furthermore, in another embodiment, an MU method used for DL MU transmission may be used for the transmission of an ACK frame in the same manner. That is, if the DL OFDMA method and the DL MU MIMO method are used together, an UL MU ACK frame may be transmitted using both the OFDMA method and the MU MIMO method.

Furthermore, if only the OFDMA method or both the OFDMA method and the MU MIMO method are used for DL MU transmission, an UL MU ACK frame may be transmitted using the OFDMA method. If only the MU MIMO method is used for DL MU transmission, an UL MU ACK frame may be transmitted using the MU MIMO method. For example, if frequency resources are allocated in a 20 MHz unit only other than a resource unit consisting of n tones (e.g., 26 tones) and the DL MU MIMO transmission method is used, an UL MU ACK frame may be transmitted using the MU MIMO method.

An example in which an UL MU ACK frame is configured using the OFDMA method is chiefly described below, for convenience of description, but the technical characteristic of the present invention is not limited to the example and the same technical characteristic may also be applied to an UL MU ACK frame configured using the MU MIMO method.

In the following description of the present invention, a "frame" may mean a DL/UL MAC frame (i.e., a MAC control frame, a MAC management frame or a data frame) itself. Furthermore, the frame may mean a DL/UL (SU/MU) PPDU including a DL/UL MAC frame.

Furthermore, in the following description of the present invention, an "ACK frame" collectively refers to the ACK frame according to the example of FIG. 20 or the block ACK (BA) according to the example of FIG. 23.

Furthermore, in the following description of the present invention, unless otherwise described, an ACK frame means a frame transmitted by one STA, and an UL MU ACK frame means a frame that has been multiplexed on a frequency domain or space domain from ACK frames transmitted by a plurality of STAs, respectively, and that is transmitted.

Furthermore, each of frames included in the drawings of this specification may include elements, such as a legacy preamble (i.e., an L-STF, an L-LTF, and an L-SIG field), an HE-STF, an HE-LTF, and an HE-SIG (an HE-SIG-A, HE-SIG-B, etc.) field, but such elements have been omitted for convenience of description.

In the following description of the present invention, resources for transmitting an ACK frame may be applied to an HE-STF, an HE-LTF, and a data field, may be applied to an HE-STF, an HE-LTF, an HE-SIG2 field, and a data field or may be applied to an HE-SIG2 field, an HE-STF, an HE-LTF, and a data field. That is, the L-STF, L-LTF, the L-SIG field, and the HE-SIG field may be duplicated in a 20 MHz unit and transmitted regardless of such applications.

Resources allocated for the transmission of an UL ACK frame with respect to each STA may be predefined or an AP may indicate the resources in a DL MU transmission frame.

1. Pre-Defining Method

First, a method for predefining resources for transmitting an UL MU ACK frame may be as follows.

A subband (i.e., a resource unit) (or a spatial stream) in which an ACK frame is to be transmitted in the sequence of STAs indicated in the SIG field (e.g., L-SIG field, HE-SIG-A field or HE-SIG-B field) or control field (e.g., MAC header) of a DL MU data frame may be determined.

For example, subband indices may be determined in the direction in which a frequency or subcarrier index increases for each subband (or resource unit) within a 20 MHz, 40 MHZ, 80 MHz or 160 MHz (80+80 MHz) channel. In this case, the meaning that a subband in which an ACK frame is to be transmitted in the sequence of STAs is determined may mean that a subband in which an ACK frame is to be transmitted for each STA is determined in the direction in which an index increases or decreases starting from a subband having the smallest/greatest index within a corresponding channel.

For example, in the method for indicating the sequence of STAs, STA IDs (e.g., partial AIDs (PAIDs), AIDs or addresses) may be sequentially indicated in a specific bit group unit in the SIG field or control field of a DL MU data frame.

For another example, a user position in which each of STAs belongs to a specific group may be indicated in a group ID management frame. In this case, resource allocation information (e.g., an index or stream index of an OFDMA resource unit) may be indicated in a specific bit group unit in the SIG field or control field of a DL MU data frame in the order of user position being indicated in the group ID management frame.

Furthermore, the sequence of STAs may be implicitly determined depending on the positions of DL resources (i.e., subbands or spatial streams) allocated to the STAs, respectively.

More specifically, if only the DL OFDMA method is used, the sequence of STAs may be determined in the order in which the index of a subband allocated to each STA increases in a DL MU data frame. For example, if the index of a subband allocated to an STA 1 is 2, the index of a subband allocated to an STA 2 is 1, and the index of a subband allocated to an STA 3 is 3, the sequence of the STAs may be determined like the STA 2, the STA 1, and the STA 3. Likewise, if the DL MU MIMO method is used, the sequence of the STAs may be determined in the order in which the index of a spatial stream allocated to each STA increases in a DL MU data frame. In this case, if both the DL OFDMA method and the DL MU MIMO method are used, the sequence of the STAs may be determined in the order in which a the index of a spatial stream increases for each subband and the sequence of the STAs may be finally determined in the order in which the index of a subband increases. For example, if the index of a subband allocated to the STA 1, the STA 3 is 2 (i.e., the index of a spatial stream allocated to the STA 1 is 1, the index of a spatial stream allocated to the STA 3 is 2), the index of a subband allocated to the STA 2 is 1, and the index of a subband allocated to the STA 4 is 3, the sequence of the STAs may be determined like the STA 2, the STA 1, the STA 3, and the STA 4.

In this case, the subband may correspond to a minimum subband granularity (Option 1). That is, a resources unit allocated to each of the STAs for the transmission of an ACK frame may be the minimum subband granularity.

In this case, the minimum subband granularity may be interpreted as having the same meaning as the aforementioned resource unit consisting of n tones (e.g., 26 tones). The subband may include one or more minimum subband granularities. That is, the subband may include 26 tones*n. For example, a single 20 MHz, 40 MHz or 80 MHz channel may correspond to the subband.

Furthermore, the same resources as resources occupied by an STA in a DL MU data frame configures a subband for the transmission of an ACK frame, but in the case of MU MIMO, the resources of subbands corresponding to the number of STAs may be divided and allocated (Option 2). That is, an STA may transmit an ACK frame in the same (minimum) subband as a (minimum) subband in which a DL MU data frame is transmitted toward the STA.

This is described in more detail below. One or more methods to be described below may be combined for each bandwidth and applied, but each of the methods may be differently applied depending on a bandwidth (e.g., 20, 40, 80 or 160 MHz).

(Option 1) Configuring an ACK Frame with a Minimum Subband Granularity

FIG. 35 is a diagram illustrating a DL MU transmission method according to an embodiment of the present invention.

An UL MU ACK frame may be transmitted with a minimum subband granularity (e.g., a resource unit consisting of 26 tones) in the sequence of STAs defined in a DL MU data frame. As described above, the sequence (or position) of a minimum subband granularity in which an ACK frame is transmitted may be implicitly determined in the sequence of STAs indicated in the SIG field or control field of a DL MU data frame or based on the position of DL resources allocated to each STA.

Referring to FIG. 35(a), the data 3511a of an STA 1 and the data 3512a of an STA 2/STA 3 are frequency-multiplexed and transmitted in different subbands using the OFDMA method, and the data 3512a of the STA 2/STA 3 is space-multiplexed and transmitted in the same subband using the MU MIMO method.

The sequence of the STA 1, the STA 2, and the STA 3 may be indicated in the SIG field or control field of a DL MU data frame. Alternatively, the sequence of the STA 1, the STA 2, and the STA 3 may be implicitly determined based on the position of DL resources allocated to each STA.

The ACK frame 3521a of the STA 1, the ACK frame 3522a of the STA 2, and the ACK frame 3523a of the STA 3 are transmitted at the same time through the frequency resources of respective minimum subband granularities in the sequence of the STA 1, the STA 2, and the STA 3 in a frequency axis.

In order for a plurality of STAs to transmit ACK frames at the same time within a single time interval, a "maximum number of MU STAs" may be identical with or smaller than the number of subbands (N_subband) of a minimum subband granularity. For example, if the minimum subband granularity consists of 26 tones, the number of subbands (N_subband) may correspond to 9. In this case, the "maximum number of MU STAs" refers to the number of STAs including MU MIMO in addition to OFDMA in DL MU transmission.

Furthermore, as in FIG. 35(b), the above method may be applied to each channel. That is, STAs in which DL resources have been allocated to a primary channel sequentially transmit ACK frames in the primary channel, and STAs in which DL resources have been allocated to a secondary channel sequentially transmit ACK frames in the secondary channel.

In this case, the sequence of the STAs may be indicated for each channel in the SIG field or control field of a DL MU data frame or the sequence of the STAs may be indicated in the entire channel in which a corresponding DL MU data frame is transmitted.

In this case, the channel may be included in a 20 MHz, 40 MHz or 80 MHz unit. This is described in more detail below.

First, the primary channel may be defined as follows. A primary 20 MHz channel means a 20 MHz channel which is used to transmit a 20 MHz PPDU in a 40 MHz, 80 MHz, 160 MHz or 80+80 MHz BSS. A primary 40 MHz channel means a 40 MHz channel which is used to transmit a 40 MHz PPDU in an 80 MHz, 160 MHz or an 80+80 MHz BSS. A primary 80 MHz channel means an 80 MHz channel which is used to transmit an 80 MHz PPDU in a 160 MHz or 80+80 MHz BSS.

Next, the secondary channel may be defined as follows. A secondary 20 MHz channel means a 20 MHz channel that neighbors a primary 20 MHz channel in order to form a 40 MHz channel along with the primary 20 MHz channel in a 40 MHz BSS. Furthermore, the secondary 20 MHz channel means a 20 MHz channel that neighbors a primary 20 MHz channel in order to form a primary 40 MHz channel along with the primary 20 MHz channel in an 80 MHz, 160 MHz or 80+80 MHz BSS. A secondary 40 MHz channel means a 40 MHz channel that neighbors a primary 40 MHz channel in order to form an 80 MHz channel along with the primary 40 MHz channel in an 80 MHz BSS. Furthermore, a secondary 40 MHz channel means a 40 MHz channel that neighbors a primary 40 MHz channel in order to form a primary 80 MHz channel along with the primary 40 MHz channel in a 160 MHz or 80+80 MHz BSS. A secondary 80 MHz channel means an 80 MHz channel that does not include a primary 20 MHz channel in order to form a 160 MHz or 80+80 MHz channel along with a primary 80 MHz channel in a 160 MHz or 80+80 MHz BSS.

A non-primary channel means a random 20 MHz channel other than a primary 20 MHz channel in a 40 MHz, 80 MHz, 160 MHz or 80+80 MHz BSS.

Referring to FIG. 35(b), the data 3511b of an STA 1 is transmitted in a primary channel, and the data 3512b of the STA 2/STA 3 is transmitted in a non-primary channel (or secondary channel). The data 3511b of the STA 1 and the data 3512b of the STA 2/STA 3 are frequency-multiplexed and transmitted using the OFDMA method. The data 3512b of the STA 2/STA 3 is space-multiplexed and transmitted in a non-primary channel using the MU MIMO method.

In the SIG field or control field of a DL MU data frame, the STA 1 may be indicated in the primary channel and the sequence of the STA 2 and the STA 3 may be indicated in the non-primary channel. Alternatively, the sequence of the STA 1, the STA 2, and the STA 3 may be indicated in the SIG field or control field of a DL MU data frame. Alternatively, the sequence of the STA 1, the STA 2, and the STA 3 may be implicitly determined based on the position of DL resources allocated to each STA.

Since only the data 3511b of the STA 1 has been transmitted in the primary channel, the ACK frame 3521b of the STA 1 is transmitted in the primary channel through a frequency resource of a minimum subband granularity. In this case, the minimum subband granularity in which the ACK frame 3521b of the STA 1 is transmitted may be determined to be a minimum subband granularity having the smallest index or the greatest index in the primary channel.

Furthermore, since the data 3512b of the STA 2/STA 3 has been transmitted in the non-primary channel, the ACK frame 3522b of the STA 2 and the ACK frame 3523b of the STA 3 are transmitted at the same time through frequency resources of a minimum subband granularity, respectively, in the sequence of the STA 2 and the STA 3 in a frequency axis.

In this case, the ACK frame 3521b of the STA 1, the ACK frame 3522b of the STA 2, and the ACK frame 3523b of the STA 3 are transmitted at the same time.

If a "maximum number of MU STAs" is greater than the number of subbands (N_subband), a block ACK request (BAR) frame may be used. In this case, the number of subbands means a result obtained by dividing a bandwidth in which a full bandwidth or DL MU data frame has been transmitted by a minimum subband granularity. For example, if a minimum subband granularity consists of 26 tones and both the OFDMA method and the MU MIMO method are used in a 26 tone unit, a total number of STAs to which DL resources are allocated in a DL MU data frame may exceed 9 (i.e., the number of subbands). In this case, ACK frames corresponding to the number of subbands are transmitted, and the remaining ACK frames may be transmitted after a DL BAR frame is transmitted by an AP. In this case, the BAR frame may include information about an UL MU BA frame to be transmitted next and may be transmitted as in FIGS. 21 and 22, but may be transmitted in a CTS format for use of the occupation of a medium. This is described below with reference to the following drawing.

FIG. 36 is a diagram illustrating a DL MU transmission method according to an embodiment of the present invention.

Referring to FIG. 36, each of the data 3611 of an STA 1/STA 2, the data 3612 of an STA 3/STA 4, the data 3613 of an STA 5, and the data 3614 of an STA 6 is frequency-multiplexed and transmitted in a frequency resource of a minimum subband granularity using the OFDMA method. Furthermore, the data 3611 of the STA 1/STA 2 is space-multiplexed and transmitted in the same subband using the MU MIMO method, and the data 3612 of the STA 3/STA 4 is space-multiplexed and transmitted in the same subband using the MU MIMO method.

Furthermore, the data 3611 of the STA 1/STA 2 and the data 3512 of the STA 3/STA 4 are transmitted in a primary channel, and the data 3613 of the STA 5 and the data 3614 of the STA 6 are transmitted in a non-primary channel or a secondary channel.

Assuming that the number of subbands (N_subband) is 4 in FIG. 36, the number of DL MU STAs is 6 (i.e., the STA 1 to the STA 6) and thus is greater than the number of subbands (N_subband). Accordingly, all of the STAs cannot transmit ACK frames at the same time in the same time domain.

Accordingly, ACK frames corresponding to the number of subbands (N_subband) are transmitted, and the remaining ACK frames are transmitted after a BAR frame transmitted by an AP.

The sequence of the STA 1, the STA 2, the STA 3, the STA 4, the STA 5, and the STA 6 may be indicated in the SIG field or control field of a DL MU data frame. Alternatively, the sequence of the STA 1, the STA 2, the STA 3, the STA 4, the STA 5, and the STA 6 may be implicitly determined based on the position of DL resources allocated to each STA.

First, the ACK frame 3621 of the STA 1, the ACK frame 3622 of the STA 2, the ACK frame 3623 of the STA 3, and the ACK frame 3624 of the STA 4 are transmitted at the same time through frequency resources of a minimum subband granularity, respectively, in the sequence of the STA 1, the STA 2, the STA 3, and the STA 4 in the frequency axis.

Furthermore, after a BAR frame 3631 transmitted by the AP, the ACK frame 3641 of the STA 5 and the ACK frame 3642 of the STA 6 are transmitted at the same time through frequency resources of a minimum subband granularity, respectively, in the sequence of the STA 5 and the STA 6 in the frequency axis.

Furthermore, in the aforementioned embodiment, minimum subband granularities of DL and UL may be differently set. That is, the size of a subband for the transmission of an ACK frame may be differently set depending on the number of DL MU STAs. For example, a minimum subband granularity for transmitting an UL ACK frame may be set so that the number of minimum subband granularities for transmitting an UL ACK frame is the same as a maximum number of MU STAs.

Furthermore, resources for the transmission of an ACK frame in a primary channel only may be allocated. This is described below with reference to the following drawing.

FIG. 37 is a diagram illustrating a DL MU transmission method according to an embodiment of the present invention.

Referring to FIG. 37, the data 3711 of the STA 1, the data 3712 of the STA 2, and the data 3713 of the STA 3/STA 4 are frequency-multiplexed and transmitted using the OFDMA method. Furthermore, the data 3713 of the STA 3/STA 4 is space-multiplexed and transmitted in the same subband using the MU MIMO method.

Furthermore, the data 3711 of the STA 1 and the data 3712 of the STA 2 are transmitted in a primary channel, and the data 3713 of the STA 3/STA 4 is transmitted in a secondary channel.

In the SIG field or control field of a DL MU data frame, the STA 1 and the STA 2 may be indicated in a primary channel and the sequence of the STA 3 and the STA 4 may be indicated in a non-primary channel. Alternatively, the sequence of the STA 1, the STA 2, the STA 3, and the STA 4 may be indicated in the SIG field or control field of a DL MU data frame. Alternatively, the sequence of the STA 1, the STA 2, the STA 3, and the STA 4 may be implicitly determined based on the position of DL resources allocated to each STA.

A resource for the transmission of an ACK frame in the primary channel only may be allocated. In this case, ACK frames may be transmitted after a BAR frame, and ACK frames may be transmitted after a BAR frame. In this case, the BAR frame may include information about an UL MU BA frame to be transmitted next and may be transmitted as in FIGS. 21 and 22, but may be transmitted in a CTS format which is used to only occupy a medium.

In this case, the number of ACK frames transmitted at the same time within a single time interval may be determined in a channel unit in which DL MU data has been transmitted.

In other words, first, an ACK frame for DL data transmitted in a primary channel is transmitted in a primary channel. After a BAR frame transmitted by an AP, an ACK frame for DL data transmitted in a secondary channel is transmitted in the primary channel. Next, after a BAR frame transmitted by the AP, an ACK frame for DL data transmitted in a third channel (i.e., a channel neighboring the secondary channel) may be transmitted in the primary channel.

In this case, a "maximum number of MU STAs" transmitted in a single channel may be identical with or smaller than the number of subbands of a minimum subband granularity in a single channel.

Referring to FIG. 37, first, since the data 3711 of the STA 1 and the data 3712 of the STA 2 have been transmitted in the primary channel, the ACK frame 3721 of the STA 1 and the ACK frame 3722 of the STA 2 are transmitted at the same time in the primary channel through frequency resources of a minimum subband granularity, respectively, in the sequence of the STA 1 and the STA 2 in a frequency axis. Furthermore, after a BAR frame 3731 transmitted by an AP, the ACK frame 3741 of the STA 3 and the ACK frame 3742 of the STA 4 are transmitted at the same time through frequency resources of a minimum subband granularity in the sequence of the STA 3 and the STA 4 in the frequency axis.

Furthermore, even in this case, as described above, minimum subband granularities of DL and UL may be differently set. For example, a minimum subband granularity for transmitting an UL ACK frame may be set so that the number of minimum subband granularities for transmitting the UL ACK frame in a single channel is the same as a "maximum number of MU STAs" transmitted in a single channel.

Furthermore, the ACK frame is transmitted in a primary channel only, but as described above, the number of ACK frames transmitted at the same time within a single time interval may be determined to be a maximum without taking into consideration a channel in which a DL data frame has been transmitted.

That is, as in the example of FIG. 36, after a DL MU data frame, a maximum of ACK frames which may be transmitted in a primary channel may be transmitted at the same time, and the remaining ACK frames may be transmitted at the same time in the primary channel after a BAR frame. Even in this case, if there is an ACK frame after the second transmission of the ACK frames, the ACK frames left after the BAR frame may be transmitted at the same time in the primary channel.

In the examples of FIGS. 35 and 36, a resource for the transmission of an ACK frame in the primary channel only may be allocated. This is described below with reference to the following drawing.

FIG. 38 is a diagram illustrating a DL MU transmission method according to an embodiment of the present invention.

Referring to FIG. 38(a), the data 3811a of an STA 1 is transmitted in a primary channel, and the data 3812a of an STA 2/STA 3 is transmitted in a non-primary channel or a secondary channel. The data 3811a of the STA 1 and the data 3812a of the STA 2/STA 3 are frequency-multiplexed and transmitted using the OFDMA method. The data 3812a of the STA 2/STA 3 is space-multiplexed and transmitted in the non-primary channel using the MU MIMO method.

The sequence of the STA 1, the STA 2, and the STA 3 may be indicated in the SIG field or control field of a DL MU data frame. Alternatively, the sequence of the STA 1, the STA 2, and the STA 3 may be implicitly determined based on the position of DL resources allocated to each STA.

In a frequency axis, a resource for transmitting an ACK frame is determined in the sequence of STAs, but an ACK frame may be transmitted in a primary channel only as in FIG. 37.

Accordingly, first, the ACK frame 3821a of the STA 1 and the ACK frame 3822a of the STA 2 may be transmitted at the same time in the primary channel through frequency resources of a minimum subband granularity, respectively, in the sequence of the STA 1 and the STA 2 in a frequency axis.

Furthermore, after a BAR frame 3831a transmitted by an AP, the ACK frame 3541a of the STA 3 may be transmitted in the primary channel through a frequency resource of a minimum subband granularity. In this case, the minimum subband granularity in which the ACK frame 3841a of the STA 3 is transmitted may be determined to be a minimum subband granularity having the smallest index or the greatest index in the primary channel.

Furthermore, a resource for transmitting an ACK frame is determined in the sequence of STAs in a frequency axis for each channel, but the ACK frame may be transmitted in the primary channel only as in FIG. 37.

Referring to FIG. 38(b), first, the ACK frame 3821b of the STA 1 may be transmitted in the primary channel through a frequency resource of a minimum subband granularity. In this case, the minimum subband granularity in which the ACK frame 3821b of the STA 1 is transmitted may be determined to be a minimum subband granularity having the smallest index or the greatest index in the primary channel.

Furthermore, after the BAR frame 3831b transmitted by an AP, the ACK frame 3841b of the STA 2 and the ACK frame 3842b of the STA 3 may be transmitted at the same time in the primary channel through frequency resources of a minimum subband granularity, respectively, in the sequence of the STA 2 and the STA 3 in a frequency axis.

FIG. 39 is a diagram illustrating a DL MU transmission method according to an embodiment of the present invention.

Referring to FIG. 39, the data 3911 of an STA 1/STA 2, the data 3912 of an STA 3/STA 4, the data 3913 of an STA 5, and the data 3914 of an STA 6 are frequency-multiplexed and transmitted through frequency resources of a minimum subband granularity, respectively, using the OFDMA method. Furthermore, the data 3911 of the STA 1/STA 2 is space-multiplexed and transmitted in the same subband using the MU MIMO method, and the data 3912 of the STA 3/STA 4 is space-multiplexed and transmitted in the same subband using the MU MIMO method.

Furthermore, the data 3911 of the STA 1/STA 2 and the data 3912 of the STA 3/STA 4 are transmitted in a primary channel, and the data 3913 of the STA 5 and the data 3914 of the STA 6 are transmitted in a non-primary channel or a secondary channel.

The sequence of the STA 1, the STA 2, the STA 3, the STA 4, the STA 5, and the STA 6 may be indicated in the SIG field or control field of a DL MU data frame. Alternatively, the sequence of the STA 1, the STA 2, the STA 3, the STA 4, the STA 5, and the STA 6 may be implicitly determined based on the position of DL resources allocated to each STA.

ACK frames corresponding to the number of subbands (N_subband) are transmitted, and the remaining ACK frames are transmitted after a BAR frame transmitted by an AP, but the ACK frames may be transmitted in the primary channel only. That is, a maximum of ACK frames of a minimum subband granularity may be transmitted in the primary channel, and the remaining ACK frames may be transmitted after a BAR frame.

First, the ACK frame 3921 of the STA 1 and the ACK frame 3922 of the STA 2 may be transmitted at the same time in a primary channel through frequency resources of a minimum subband granularity, respectively, in the sequence of the STA 1 and the STA 2 in a frequency axis.

Furthermore, after an BAR frame 3931 transmitted by an AP, the ACK frame 3941 of the STA 3 and the ACK frame 3942 of the STA 4 may be transmitted at the same time in the primary channel through frequency resources of a minimum subband granularity, respectively, in the sequence of the STA 3 and the STA 4 in the frequency axis.

Furthermore, after a BAR frame 3951 transmitted by the AP, the ACK frame 3961 of the STA 5 and the ACK frame 3962 of the STA 6 may be transmitted at the same time in the primary channel through frequency resources of a minimum subband granularity, respectively, in the sequence of the STA 5 and the STA 6 in the frequency axis.

(Option 2) Configuring an ACK Frame as in Resources Occupied by an STA in a DL MU Data Frame FIG. 40 is a diagram illustrating a DL MU transmission method according to an embodiment of the present invention.

Referring to FIG. 40, the data 4011 of an STA 1 and the data 4012 of an STA 2/STA 3 are frequency-multiplexed and transmitted in different subbands using the OFDMA method, and the data 4012 of an STA 2/STA 3 is space-multiplexed and transmitted in the same subband using the MU MIMO method.

As described above, if an ACK frame is configured like resources occupied by an STA in a DL MU data frame, unlike in the case where each ACK frame is configured with a minimum subband granularity, the sequence of all of STAs may not be essentially indicated because an STA transmits an ACK frame through a DL resource allocated thereto.

In this case, as in the case of the STA 2 and the STA 3, if data frames are transmitted to a plurality of STAs at the same time in the same subband using the MU MIMO method, STAs that have received the data frames in the corresponding subband need to be aware of frequency resources for transmitting ACK frames in corresponding subbands.

Accordingly, only the sequence of the STA 2 and the STA 3 may be indicated in the SIG field or control field of a DL MU data frame.

In the DL MU data frame, a resource (i.e., subband) allocated to each of the STAs may be allocated as a resource for transmitting an ACK frame. In FIG. 40, a resource (i.e., subband) allocated to the data 4011 of the STA 1 may be allocated as a resource (i.e., subband) for transmitting the ACK frame 4021 of the STA 1.

However, in the case of MU MIMO, resources may be divided and allocated by the number of STAs. In FIG. 40, the data 4012 of the STA 2/STA 3 has been multiplexed and transmitted in a single subband using the MU MIMO method. Accordingly, the corresponding subband may be divided into two frequency resources of a smaller unit and allocated. Furthermore, each of the ACK frame 4022 of the STA 2 and the ACK frame 4023 of the STA 3 may be divided in the sequence of the STA 2 and the STA 3 in a frequency axis and transmitted at the same time through frequency resources allocated to the STA 2 and the STA 3. For example, if the data 4012 of the STA 2/STA 3 is transmitted in a subband consisting of 4*26 tones, the ACK frame 4022 of the STA 2 may be transmitted in a subband of a higher (or lower) index consisting of 2*26 tones, and the ACK frame 4023 of the STA 3 may be transmitted in a subband of a lower (or higher) index consisting of 2*26 tones.

If data for one or more STAs is configured using MU MIMO in a minimum subband granularity, there may be a problem in the allocation of a resource of an ACK frame. That is, there may be a problem in that a minimum subband granularity has to be divided into a smaller one. Accordingly, in such a case, there may be a limit to DL MU MIMO transmission so that data is configured only in the case of "the number of MU STAs included in DL MU MIMO<=a minimum number of subbands."

Furthermore, if such a limit cannot be placed, in the case of DL MU MIMO, resources may be allocated to only a first STA using such a method, and a method for transmitting an ACK frame after a BAR frame may be used from a second STA. This is described below with reference to the following drawing.

FIG. 41 is a diagram illustrating a DL MU transmission method according to an embodiment of the present invention.

Referring to FIG. 41, the data 4111 of an STA 1/STA 2, the data 4112 of an STA 3/STA 4, the data 4113 of an STA 5, and the data 4114 of an STA 6 may be frequency-multiplexed and transmitted through frequency resources of a minimum subband granularity, respectively, using the OFDMA method. Furthermore, the data 4111 of the STA 1/STA 2 is space-multiplexed and transmitted in the same subband using the MU MIMO method, and the data 4112 of the STA 3/STA 4 is space-multiplexed and transmitted in the same subband using the MU MIMO method.

Only the sequence of STAs to which resources have been allocated may be indicated in a single subband using the MU MIMO method. That is, only the sequence of the STA 1 and the STA 2 and the sequence of the STA 3 and the STA 4 may be determined in the SIG field or control field of a DL MU data frame.

Since the minimum subband granularity cannot be subdivided, an ACK frame that belongs to the ACK frames of STAs space-multiplexed and transmitted using the MU MIMO method in the minimum subband granularity and that is to be transmitted by a first STA is transmitted after a DL MU data frame, and the subsequent ACK frames of STAs subsequent to the first STA are transmitted after a BAR frame. In this case, the BAR frame may include information about an UL MU BA frame to be transmitted next and may be transmitted as in FIGS. 21 and 22, but may be transmitted in a CTS format which is used to only occupy a medium.

In the example of FIG. 41, since the sequence of the STA 1 is ahead of the sequence of the STA 2, the ACK frame 4121 of the STA 1 is transmitted the DL MU data frame and the ACK frame 4141 of the STA 2 is transmitted after a BAR frame. Likewise, since the sequence of the STA 3 is ahead of the sequence of the STA 4, the ACK frame 4122 of the STA 3 is transmitted after the DL MU data frame and the ACK frame 4142 of the STA 4 is transmitted the BAR frame.

This is summarized as follows. First, the ACK frame 4121 of the STA 1, the ACK frame 4122 of the STA 3, the ACK frame 4123 of the STA 5, and the ACK frame 4124 of the STA 6 are transmitted at the same time through frequency resources allocated to the STA 1 to the STA 6, respectively, in a DL MU data frame. Furthermore, after the BAR frame 4131 transmitted by an AP, the ACK frame 4141 of the STA 2 and the ACK frame 4142 of the STA 4 are transmitted at the same time through frequency resources allocated to the STA 2 and the STA 4, respectively, in a DL MU data frame.

Furthermore, the ACK frame be configured using the same MU method as the DL MU data frame. That is, if a method for transmitting a DL MU data frame is an MU MIMO method, an ACK frame may be configured using the MU MIMO method. This is described below with reference to the following drawing.

FIG. 42 is a diagram illustrating a DL MU transmission method according to an embodiment of the present invention.

Referring to FIG. 42, the data 4211 of an STA 1/STA 2, the data 4212 of an STA 3/STA 4, the data 4213 of an STA 5, and the data 4214 of an STA 6 are frequency-multiplexed and transmitted using the OFDMA method. Furthermore, the data 4211 of the STA 1/STA 2 is space-multiplexed and transmitted in the same subband using the MU MIMO method, and the data 4212 of the STA 3/STA 4 is space-multiplexed and transmitted in the same subband using the MU MIMO method.

In this case, since an ACK frame is also configured using the MU MIMO method, each of the STAs may transmit an ACK frame through a DL resource (i.e., a frequency and/or spatial stream) allocated thereto. Accordingly, in this case, the sequence of STAs may not be indicated.

The ACK frame 4221 of the STA 1/STA 2, the ACK frame 4222 of the STA 3/STA 4, the ACK frame 4223 of the STA 5, and the ACK frame 4224 of the STA 6 are transmitted at the same time through respective frequency resources allocated to the STAs, respectively, in a DL MU data frame. In this case, the ACK frame 4221 of the STA 1/STA 2 are transmitted at the same time through respective spatial streams allocated to the STA 1/STA 2 in a DL MU data frame, and the ACK frame 4222 of the STA 3/STA 4 is transmitted at the same time through respective spatial streams allocated to the STA 3/STA 4 in a DL MU data frame. In this case, a beamforming method for the transmission of the ACK frame may comply with a method for the DL MU data frame without any change and an always fixed beamforming method may be previously designated.

In the examples of FIGS. 40 to 42, as in the example of FIG. 37, the ACK frame may be transmitted only in the primary channel. This is described below with reference to the following drawing.

FIG. 43 is a diagram illustrating a DL MU transmission method according to an embodiment of the present invention.

Referring to FIG. 43, the data 4311 of an STA 1 and the data 4312 of an STA 2/STA 3 are frequency-multiplexed and transmitted in different subbands using the OFDMA method, and the data 4312 of the STA 2/STA 3 is space-multiplexed and transmitted in the same subband using the MU MIMO method.

The sequence of the STA 1, the STA 2, and the STA 3 may be indicated in the SIG field or control field of a DL MU data frame. Alternatively, the sequence of the STA 1, the STA 2, and the STA 3 may be implicitly determined based on the position of DL resources allocated to each STA.

An STA transmits an ACK frame through a frequency resource having the same size as a frequency resource allocated thereto in a DL MU data frame, but may transmit the ACK frame in a primary channel only.

Accordingly, first, only the ACK frame 4321 of the STA 1 may be transmitted through a frequency resource corresponding to the band of a primary channel.

Furthermore, after a BAR frame 4331 transmitted by an AP, the ACK frame 4341 of the STA 2 and the ACK frame 4342 of the STA 3 may be transmitted at the same time through respective frequency resources having the same size as frequency resources allocated to the STA 2 and the STA 3 in a DL MU data frame in the sequence of the STA 2 and the STA 3 in a frequency axis in a primary channel.

FIG. 44 is a diagram illustrating a DL MU transmission method according to an embodiment of the present invention.

Referring to FIG. 44, the data 4411 of an STA 1/STA 2, the data 4412 of an STA 3/STA 4, the data 4413 of an STA 5, and the data 4414 of an STA 6 are frequency-multiplexed and transmitted through frequency resources of a minimum subband granularity, respectively, using the OFDMA method. Furthermore, the data 4411 of the STA 1/STA 2 is space-multiplexed and transmitted in the same subband using the MU MIMO method, and the data 4412 of the STA 3/STA 4 is space-multiplexed and transmitted in the same subband using the MU MIMO method.

The sequence of the STA 1, the STA 3, the STA 5, the STA 6, the STA 2, and the STA 4 may be indicated in the SIG field or control field of a DL MU data frame. Alternatively, the sequence of the STA 1, the STA 3, the STA 5, the STA 6, the STA 2, and the STA 4 may be implicitly determined based on the position of DL resources allocated to each STA.

If data is multiplexed and transmitted in a minimum subband granularity using the MU MIMO method, resources are allocated to only the first STA according to the above method and STAs subsequent to the first STA transmit ACK frames after a BAR frame. In this case, the ACK frames may be transmitted in a primary channel only.

Accordingly, first, the ACK frame 4421 of the STA 1 and the ACK frame 4422 of the STA 3 may be transmitted at the same time in a primary channel through frequency resources of a minimum subband granularity, respectively, in the sequence of the STA 1 and the STA 3 in a frequency axis.

Furthermore, after a BAR frame 4431 transmitted by an AP, the ACK frame 4441 of the STA 5 and the ACK frame 4442 of the STA 6 may be transmitted at the same time in the primary channel through frequency resources of a minimum subband granularity, respectively, in the sequence of the STA 5 and the STA 6 in the frequency axis.

Furthermore, after a BAR frame 4451 transmitted by the AP, the ACK frame 4461 of the STA 2 and the ACK frame 4462 of the STA 4 may be transmitted at the same time in the primary channel through frequency resources of a minimum subband granularity, respectively, in the sequence of the STA 2 and the STA 4 in the frequency axis.

FIG. 45 is a diagram illustrating a DL MU transmission method according to an embodiment of the present invention.

Referring to FIG. 45, the data 4511 of an STA 1/STA 2, the data 4512 of an STA 3/STA 4, the data 4513 of an STA 5, and the data 4514 of an STA 6 are frequency-multiplexed and transmitted using the OFDMA method. Furthermore, the data 4511 of the STA 1/STA 2 is space-multiplexed and transmitted in the same subband using the MU MIMO method, and the data 4512 of the STA 3/STA 4 is space-multiplexed and transmitted in the same subband using the MU MIMO method.

The sequence of the STA 1/2, the STA 3/4, the STA 5, and the STA 6 may be indicated in the SIG field or control field of a DL MU data frame. Alternatively, the sequence of the STA 1/2, the STA 3/4, the STA 5, and the STA 6 may be implicitly determined based on the position of DL resources allocated to each STA.

An ACK frame is configured by applying both the OFDMA method and the MU MIMO method, but is transmitted in a primary channel only.

Accordingly, first, the ACK frame 4521 of the STA 1/STA 2 and the ACK frame 4522 of the STA 3/STA 4 are transmitted at the same time in a primary channel through frequency resources, allocated to respective corresponding STAs in a DL MU data frame. In this case, the ACK frames 4521 of the STA 1/STA 2 are transmitted at the same time through spatial streams allocated to the STA 1/STA 2, respectively, in the DL MU data frame, and the ACK frames 4522 of the STA 3/STA 4 are transmitted at the same time through spatial streams allocated to the STA 3/STA 4, respectively, in a DL MU data frame. In this case, a beamforming method for the transmission of the ACK frame may comply with a method for the DL MU data frame and an always fixed beamforming method may be previously designated.

Furthermore, after a BAR frame 4531 transmitted by an AP, the ACK frame 4541 of the STA 5 and the ACK frame 4542 of the STA 6 may be transmitted at the same time in the primary channel through frequency resources having the same size as frequency resource allocated to corresponding STAs in a DL MU data frame in the sequence of the STA 5 and the STA 6 in the frequency axis.

In the examples of FIGS. 35 to 45, after a DL frame is transmitted between frames (e.g., a DL MU data frame, a BAR frame, and an UL MU ACK frame), spacing for preventing the time during which other STAs intervene and transmit data may be set. For example, SIFS may correspond to the spacing. Alternatively, in order to secure a processing time, an extension frame spacing (EIFS) may be set by adding a dummy symbol or signal extension.

2. Indication in DL MU Transmission Frame

A resource index (e.g., a (minimum) subband index, a channel index or a stream index) for the transmission of an ACK frame may be indicated in a DL MU transmission frame for each STA ID (e.g., a PAID, an AID or an address) belonging to a DL MU data frame.

In this case, the structure of the ACK frame may be fixed to one structure. In other words, a resources unit which is used to transmit the ACK frame may be fixed. For example, the ACK frame may include only a minimum subband granularity.

If the number of MU STAs is greater than the number of subbands (N_subband), a BAR frame may be used as in the aforementioned method. In this case, a DL MU transmission frame may also provide notification of information about the time when an ACK frame is to be transmitted along with an index for the transmission of the ACK frame for each STA ID. For example, if the transmission of an ACK frame is required prior to a BAR frame, "0" may be indicated. If the transmission of an ACK frame is required after a first BAR frame, "1" may be indicated.

Furthermore, as described above, minimum subband granularities of DL and UL may be differently set. That is, the size of a subband for the transmission of an ACK frame may be differently set depending on the number of DL MU STAs. For example, a minimum subband granularity for transmitting an UL ACK frame may be set so that the number of minimum subband granularities for transmitting the UL ACK frame is the same as a maximum number of MU STAs. In this case, an STA may transmit an ACK frame through a frequency resource corresponding to the unit of a subband which is determined by the number of DL MU STAs.

In addition, the method described in "1. Pre-defining method" may be applied in the same manner except that a resource index for the transmission of an ACK frame is indicated to each STA in a DL MU data frame.

The length of ACK frame payload is differently determined depending on an MCS level which is used in an ACK frame, and thus the time when an ACK frame is terminated may be different for each STA. This is described below with reference to the following drawing.

FIG. 46 is a diagram illustrating an UL block ACK frame in DL MU transmission.

Referring to FIG. 46, an AP transmits a DL MU data frame to an STA 1, an STA 2, an STA 3, and an STA 4. Each of the STAs transmits a block ACK (BA) frame for the DL MU data frame in an MU form.

FIG. 46 illustrates a DL MU data frame of a 40 MHz band and illustrates an example in which a BA frame is transmitted in the 40 MHz band in which the DL MU data frame is transmitted.

The L-STF, L-LTF, L-SIG field, and HE-SIG field of the DL MU data frame and the UL BA frame may be duplicated in a 20 MHz unit and transmitted.

In the DL MU data frame, an HE-SIG2 field may be configured to include control information about the STAs 1-4 participating in MU transmission (i.e., configuration information about a DL data field). If information about all of STAs is included as described above, the HE-SIG2 field may be encoded over a 40 MHz band.

In the DL MU data frame, the HE-STF and the HE-LTF may be multiplexed in a frequency domain using the OFDMA method and transmitted like data transmitted to the STAs or may be multiplexed in a space domain using the MU MIMO method and transmitted.

In the HE-STF and HE-LTF of the BA frame, the STAs may multiplex their signals using a method, such as code division multiplexing (CDM) or frequency division multiplexing (FDM) and transmit the signals. The BA frame may not include an HE-SIG2 field.

In the DL MU data frame, downlink data for the respective STAs may be multiplexed in the frequency domain using the OFDMA method and transmitted or may be multiplexed in the space domain using the MU MIMO method and transmitted.

The BA frames transmitted by the respective STAs may be multiplexed in the frequency domain using the OFDMA method and transmitted at the same time or may be transmitted at the same time in the space domain using the MU MIMO method.

As described above, contents to be determined by a plurality of STAs in order to transmit ACK frames using the MU method are as follows.

Each STA has to determine how an ACK frame will be transmitted in which region. The position of a DL frame and the size of a resource region may not be suitable for the position or resource region of an UL frame, and thus to simply link a DL MU data frame and an UL ACK frame may be dangerous. Furthermore, if a DL MU data frame is transmitted through MIMO not OFDMA may be further dangerous.

The ACK frame of each STA may have a different MCS. Accordingly, the length of an ACK frame of each STA may be different. As a difference between the lengths increases, more resources are wasted. The reason for this is that only if short BA frames have to be padded according to the length of a BA frame having a long length, other STAs do not transmit data in the remaining region after the short BA frames. This is described below with reference to the following drawing.

FIG. 47 is a diagram illustrating a frame length according to the MCS of a block ACK frame.

In FIG. 47, payload is assumed to be 344 bits based on a basic BA frame and data 48 tones are assumed in the case of 20 MHz according to the 802.11a frame structure.

If the same bandwidth is allocated, it may be inefficient because there may be a difference of several tens of μs between an example in which transmission is performed through BPSK 1/2 (a modulation scheme: BPSK, a coding rate: 1/2) and an example in which transmission is performed through 64QAM 1/2 as in FIG. 47. Furthermore, if an 802.11ax frame structure is used when an UL MU ACK frame is transmitted as described above, a problem may become severe because the length of a symbol in a payload region may be increased four times and allocated frequency resources may be further reduced.

Accordingly, an embodiment of the present invention proposes a method for differently allocating the size of a frequency resource for an ACK frame according to the MCS of the ACK frame.

Hereinafter, an MCS level (or value) means a modulation scheme and/or the size of a coding rate. The meaning that a higher/lower MCS level is used may be construed as being a meaning that the number of data bits per symbol uses a higher/lower modulation scheme or a modulation scheme is the same, but a high/low coding rate is used.

This is for preventing the waste of resources by reducing a total length of an UL MU ACK frame by allocating more frequency resources to an ACK frame having a low MCS level. For example, if resources twice those of an STA that transmits an ACK frame, that is, 16QAM 1/2, are allocated to an STA that transmits an ACK frame, that is, QPSK 1/2, the lengths of the ACK frames of the two STAs are the same. In this case, if the number of STAs is increased, the frequency resources of required ACK frames cannot be increased and allocated.

In the following description of the present invention, a PPDU structure according to the example of FIG. 30 is described, for convenience of description, but the present invention may be applied to a PPDU structure of a 40 MHz, 80 MHz or 160 MHz band in the same manner.

Table 13 illustrates the configuration of tons according to an embodiment of the present invention.

TABLE 13

| Bandwidth | BTU (number of tones, number of pilots) | STU (7 tones, 1 pilot) | Maximum number of allocation (STUs may be allocated every two) |
|---|---|---|---|
| 20 MHz | 4 (56, 4) | 2 | 5 |
| 40 MHz | 8 (56, 4) | 6 | 11 |
| 80 MHz | 8 (114, 6) | 14 | 15 |

Referring to Table 13, the 20 MHz band may consist of 4 BTUs (56 tones, 4 pilots) and 2 STUs (7 tones, 1 pilot). Since STUs may be allocated every two, resources may be allocated to a maximum of 5 different STAs.

The 40 MHz band may consist of 8 BTUs (56 tones, 4 pilots) and 6 STUs (7 tones, 1 pilot). Since STUs may be allocated every two, resources may be allocated to a maximum of 11 different STAs.

The 80 MHz band may consist of 8 BTUs (114 tones, 6 pilots) and 14 STUs (7 tones, 1 pilot). Since STUs may be allocated every two, resources may be allocated to a maximum of 15 different STAs.

The number of tones and the number of pilots of the BTU and/or STU illustrated in Table 13 are merely examples, and the present invention is not limited thereto. The number of tones and the number of pilots according to a tone configuration capable of supporting the technical characteristic of the present invention may be used.

For example, 1 STU may consist of 13 tones and resources may be allocated in a 2 STU unit (i.e., 26 tones). That is, 2 STU may correspond to one resource unit (or a minimum subband granularity). Accordingly, resources may be allocated to a maximum of 9 different STAs in the 20 MHz band, and 2 STU*n resources may be allocated to one STA.

Furthermore, 1 BTU may consist of 242 tones and resources may be allocated in 1 BTU unit. That is, 1 BTU may correspond to one resource unit (or subband). Accordingly, the entire 20 MHz band may be allocated to one STA.

Furthermore, the present invention is not limited to two types of resource units as in Table 13. For example, resource units may be defined, for example, in a resource unit (e.g., 2 pilots) consisting of 26 tones, a resource unit (e.g., 4 pilots) consisting of 52 or 56 tones, a resource unit (e.g., 4 to 6 pilots) consisting of 102 tones, and a resource unit (e.g., 8 pilots) consisting of 242 tones.

a) An ACK frame having a high MCS is transmitted in an STU. Furthermore, the ACK frame of each STA may be transmitted in the remaining BTU. In other words, the size of a resource unit and the size of an MCS level may be determined in an inverse proportion manner.

The size of a frequency resource of an STU is smaller than that of a BTU. Accordingly, resources are allocated to the STU so that an ACK frame of a high MCS level is transmitted, and resources are allocated to the BTU so that an ACK frame of a low MCS level is transmitted.

For example, an ACK frame of a smaller MCS level may be transmitted as the size of a resource unit increases from a resource unit consisting of 26 tones to a resource unit consisting of 242 tones.

b) When an UL ACK frame is to be transmitted, the number of STUs may be differently determined depending on an MCS after the entire bandwidth consists of STUs (e.g., 2 STUs). In other words, an UL ACK frame may consist of 2 STU*n resources, and the number of 2 STUs and the size of an MCS level may be determined in an inverse proportion manner.

For example, referring to Table 13, 1 BTU may be divided into 8 STUs in the 20 MHz and 40 MHz band. Accordingly, 34 STUs (=4*8 STUs+2 STUs) may be present in the entire 20 MHz band, and 70 STUs (=8*8 STUs+6 STUs) may be present in the entire 40 MHz band.

In this case, a BTU in the 80 MHz band cannot be divided by 7 tones. Accordingly, 1 BTU may consist of 16 STUs (i.e., 1 BTU=16 STUs) and the remaining 2 tones may become null or included in the last STU. In this case, a total of 142 STUs (=8*16 STUs+14 STUs) may be present in the entire 80 MHz band.

Each of STUs configured as described above may be used for UL ACK transmission.

For another example, 1 STU may consist of 13 tones. A total of nine resource units (2 STUs) may be defined in the 20 MHz band because resources for the transmission of an ACK frame may be allocated in 2 STU units. Furthermore, a total of 18 resource unit (2 STUs) may be defined in the 40 MHz band.

A minimum resource allocation unit is assumed to 2 STUs for the clarity of description, which is called a 2 STU. That is, the aforementioned minimum subband granularity corresponds to a 2 STU.

In this case, assuming that the number of bits for the payload configuration of a basic BA frame is 344 bits, the size of resources for each MCS may be determined as in Table 14.

Table 14 illustrates the number of tones for the payload configuration of a BA frame according to an MCS level.

In Table 14, it is assumed that according to the example of Table 13, an STU consists of 7 tones, one of the 7 tones is used for pilots, and the remaining 6 tones are used for data.

TABLE 14

| MCS | Number of tones for payload configuration | Number of allocated 2 STUs | Total number of 2STSs per BW |
|---|---|---|---|
| BPSK 1/2 | 688 | 58 | 20 MHz: 17 |
| QPSK 1/2 | 344 | 29 | 40 MHz: 35 |
| 16QAM 1/2 | 172 | 15 | 80 MHz: 71 |
| 64QAM 1/2 | 115 | 10 | |
| 256QAM 3/4 | 58 | 5 | |

Referring to Table 14, in the case of BPSK 1/2, 58 2 STUs (696 tones=12*58) are required because the number of tones necessary for the payload configuration of a BA frame is 688. In the case of QPSK 1/2, 29 2 STUs (348 tones=12*29) are required because the number of tones necessary for the payload configuration of a BA frame is 344. In the case of 16QAM 1/2, 15 2 STUs (180 tones=12*15) are required because the number of tones necessary for the payload configuration of a BA frame is 172. In the case of 64QAM 1/2, 10 2 STUs (120 tones=12*10) are required because the number of tones necessary for the payload configuration of a BA frame is 115. In the case of 256QAM 3/4, 5 2 STUs (60 tones=12*5) are required because the number of tones necessary for the payload configuration of a BA frame is 58.

If 2 STU consists of 26 tones, 2 of the 26 tones is used for pilots, and the remaining 24 tones are used for data, the size of resources necessary for each MCS level is as follows.

In the case of BPSK 1/2, 29 2 STUs (696 tones=24*29) are required because the number of tones necessary for the payload configuration of a BA frame is 688. In the case of QPSK 1/2, 15 2 STUs (360 tones=24*15) are required because the number of tones necessary for the payload configuration of a BA frame is 344. In the case of 16QAM 1/2, 8 2 STUs (192 tones=24*8) are required because the number of tones necessary for the payload configuration of a BA frame is 172. In the case of 64QAM 1/2, 5 2 STUs (120 tones=24*5) are required because the number of tones necessary for the payload configuration of a BA frame is 115. In the case of 256QAM 3/4, 3 2 STUs (72 tones=24*3) are required because the number of tones necessary for the payload configuration of a BA frame is 58.

The size of a resource region of an ACK frame (i.e., the number of tones (or the number of subbands or resource units) in a frequency domain and/or the number of symbols in a time domain) may be determined for each STA depending on an MCS determined for each STA that transmits an UL MU ACK frame.

Option 1)

The "number of symbols necessary for the payload configuration of an ACK frame" may be derived by adding all of the "number of 2 STUs necessary for the payload configuration of an ACK frame" depending on an MCS of an MU ACK frame and dividing the sum by the "number of 2 STUs per bandwidth (BW)."

Furthermore, the "number of 2 STUs per symbol for each MCS" is determined by dividing the "number of 2 STUs necessary for the payload configuration of an ACK frame for each MCS" by the "derived number of symbols necessary for the payload configuration of an ACK frame." That is, the number of 2 STUs is determined as in Equation 9 below.

$$l_{MCS} = \text{roundoff}\left(N_{MCS} / \left\lceil \sum_{N_{STA}} N_{MCS}/N_{BW} \right\rceil \right) \quad \text{[Equation 9]}$$

In Equation 9, 1_MCS indicates the number of 2 STUs allocated to each symbol for each MCS. N_MCS indicates a total number of 2 STUs necessary for each MCS. N_BW indicates the number of 2 STUs for each BW. N_STA indicates the number of STAs allocated to the entire BW. "⌈ ⌉" means a ceiling function. ceiling(x) outputs a minimum integer value greater than x. roundoff(x) outputs an integer value obtaining by rounding off x.

FIG. 48 is a diagram illustrating an UL MU ACK frame according to an embodiment of the present invention.

In FIG. 48, it is assumed that the number of STAs (N_STA) for DL MU transmission in the 20 MHz band is 5, the number of STAs each using QPSK 1/2 is 2, the number of STAs each using 16QAM 1/2 is 1, and the number of STAs each using 64QAM 1/2 is 2.

Referring to Table 14, the number of STUs necessary in the case of QPSK 1/2 is 29, the number of STUs necessary in the case of 16QAM 1/2 is 15, the number of STUs necessary in the case of 64 QAM 1/2 is 10 and a total number of 2 STUs in the 20 MHz band is 17. Accordingly, the "number of symbols necessary for the payload configuration of an ACK frame" is $$\left\lceil \sum_{N_{STA}} N_{MCS}/N_{BW} \right\rceil = \text{ceiling } ((29 + 29 + 15 + 10 + 10)/17) = 6.$$

Furthermore, the "number of 2 STUs necessary for each symbol per MCS" is determined by dividing the "number of 2 STUs necessary for the payload configuration of an ACK frame" by the "derived number of symbols necessary for the payload configuration of an ACK frame" (i.e., 6) and rounding off the result.

Furthermore, "symbols used in each MCS" are derived by dividing the "number of 2 STUs necessary for the payload configuration of an ACK frame" by the "derived number of 2 STUs necessary for each symbol per MCS" and rounding off the result. For example, in the case of QPSK 1/2, ceiling (29/5)=6.

The number of 2 STUs used per symbol for each MCS and symbol used are as follows.

QPSK 1/2: 29/6=4.83→five 2 STUs and 6 symbols are used

16QAM 1/2: 15/6=2.5→three 2 STUs and 5 symbols are used

64QAM 1/2: 10/6=1.7→two 2 STUs and 5 symbols are used

FIG. 48 illustrates the size of a resource region of an ACK frame determined for each MCS determined as described above.

BA payloads 4801 and 4802 of QPSK 1/2 are transmitted using five 2 STUs in the frequency domain and transmitted using 6 symbols in the time domain. A BA payload 4803 of 16QAM 1/2 is transmitted using three 2 STUs in the frequency domain and transmitted using 5 symbols in the time domain. BA payloads 4804 and 4805 of 64QAM 1/2 are transmitted using two 2 STUs in the frequency domain and transmitted using 5 symbols in the time domain. That is, 17 (=2*5+1*3+2*2), that is, a total number of 2 STUs of the 20 MHz band, is satisfied.

If an UL ACK frame transmitted along with an UL data frame is configured, the number of 2 STUs in which only the UL ACK frame is transmitted instead of N_BW may be indicated. For example, an ACK frame and a data frame are frequency- or space-multiplexed in an UL MU ACK frame and transmitted.

In this case, information about the number of 2 STUs (and/or indices) allocated for the transmission of the UL ACK frame may be indicated instead of bandwidth information in the SIG field (e.g., L-SIG field, HE-SIG-A field or HE-SIG-B field) or control field (e.g., MAC header) of a DL MU data frame.

Option 1)

Some of ACK frames transmitted at the same time may be transmitted in a TDM form.

In general, STAs having a high MCS level have sufficient Tx power and thus do not need to transmit data in a narrow band. For example, if several STAs having a high MCS level are present in the same level, the ACK frames of the STAs may be transmitted according to a TDM scheme. This is described below with reference to the following drawing.

FIG. 49 is a diagram illustrating an UL MU ACK frame according to an embodiment of the present invention.

Referring to FIG. 49, as in FIG. 48, it is assumed that the number of STAs (N_STA) for DL MU transmission in the 20 MHz band is 5, the number of STAs each using QPSK 1/2 is 2, the number of STAs each using 16QAM 1/2 is 1, and the number of STAs each using 64QAM 1/2 is 2.

A method for calculating resources necessary to configure an ACK frame is the same as that described above, but STAs that transmit data according to a TDM scheme have only to increase resources by the number of STAs and sequentially transmit data.

That is, if an ACK frame of 64QAM 1/2 is transmitted according to a TDM scheme, in the example of FIG. 49, the "number of symbols necessary for the payload configuration of an ACK frame" is divided by 2 because the number of ACK frames of 64QAM 1/2 is 2.

Furthermore, the "number of 2 STUs necessary for each symbol per MCS" is determined to be 4 by dividing the "number of 2 STUs necessary for the payload configuration of an ACK frame"=10 by the "derived number of symbols necessary for the payload configuration of an ACK frame" (i.e., 3) and rounding off the result.

FIG. 49 illustrates the size of a resource region of an ACK frame determined for each MCS determined as described above. BA payloads 4901 and 4902 of QPSK 1/2 are transmitted using five 2 STUs in the frequency domain and transmitted using 6 symbols in the time domain. A BA payload 4903 of 16QAM 1/2 is transmitted using three 2 STUs in the frequency domain and transmitted using 5 symbols in the time domain. BA payloads 4904 and 4905 of 64QAM 1/2 are transmitted using four 2 STUs in the frequency domain and each transmitted 3 symbols in the time domain. That is, 17 (=2*5+1*3+1*4), that is, a total number of 2 STUs of 20 MHz, is satisfied.

In this case, an MCS level to be used for TDM may be indicated (e.g., TDM may be indicated if the number of STAs having an MCS of 64QAM 1/2 or more is 2 or more) or TDM/FDM indication may be defined and optionally indicated by an AP. For example, if 64QAM 1/2 is indicated, each of STAs may recognize that an ACK frame having a higher MCS level than an indicated MCS level is subjected to TDM. Furthermore, whether TDM is performed (e.g., 1 bit) may be indicated for each STA.

Furthermore, if the number of STAs in which an ACK frame having a specific MCS level or more has been previously configured is plural, TDM for an ACK frame may have been previously determined.

Alternatively, a start symbol (i.e., an offset from the starting point of an index or ACK frame payload) may be indicated for STAs that transmit ACK frames after the time other than the time in which the first symbol is not the start point (i.e., the starting point of an ACK frame payload) due to TDM. For example, in the case of FIG. 49, an AP may indicate 3 symbols (i.e., an offset from the starting point of an ACK frame payload) for an STA configured to transmit the ACK frame 4905 as the start point of the ACK frame.

Such information may be transmitted in the SIG field (e.g., the L-SIG field, HE-SIG-A field or HE-SIG-B field) or control field (e.g., MAC header) of a DL MU data frame.

Since the size of a resource region (i.e., the number of tones (or the number of subbands or resource units) and/or the number of symbols) in which an ACK frame is transmitted for each MCS may be differently determined as described above, each STA requires information about an MCS level which is used to configure an ACK frame and information about the size of a resource region in which its ACK frame is to be transmitted.

Furthermore, each STA also requires information about the position of a resource region in which its ACK frame is to be transmitted.

First, an MCS level for configuring an ACK frame by each STA is described below.

If an MCS level is implicitly indicated, an MCS of UL ACK may be determined in association with the MCS of a DL data frame received for each STA. For example, an MCS level may be determined to be the same MCS level (i.e., the same modulation scheme and the same coding rate) as a received DL data frame or may be determined to be the lowest coding rate using the same modulation scheme. Furthermore, an MCS level may use the same modulation scheme as a received DL data frame, but may be determined to be a low coding rate corresponding to a predetermined difference value (e.g., a +1, 0, −1 or −2 level).

If an MCS level is explicitly indicated, an AP may directly notify each STA of an MCS of an UL ACK frame in a DL MU data frame or may notify each STA of a difference value between a DL data frame and the MCS level. For example, if 2 bits are used, an MCS level may be indicated as a +1, 0, −1 or −2 level from the MCS level of a DL MU data frame.

Furthermore, all of UL MU ACK frames may be transmitted in the same MCS level. That is, the same MCS level may be applied to all of ACK frames that form an UL MU ACK frame.

In this case, an AP may indicate that transmission will be performed according to which an MCS level. For example, an AP may determine an MCS level based on the user of the worst case. In this case, the AP may determine the worst MCS level to be an MCS level of an ACK frame based on the uplink channel state of each STA determined by the AP using a sounding frame transmitted by each STA. Furthermore, the AP may receive downlink channel state information, estimated by each STA, as a response frame for the received sounding frame using the received sounding frame, and may determine the worst MCS level as an MCS level of an ACK frame based on the received downlink channel state information.

Furthermore, all of UL MU ACK frames are transmitted in the same MCS, and an MCS level used in this case may be fixed and previously determined.

Next, the size of a resource region which is used for the transmission of an ACK frame for each STA is described below.

As described above in the examples of FIGS. 48 and 49, the size of a resource region may be determined depending on an MCS level which is used to configure an ACK frame for each STA. Furthermore, a mapping relation between the MCS level and the size of the resource region may be previously defined. For example, the mapping relation may be previously defined in such a way as to use five 2 STUs (and 6 symbols) in the case of QPSK 1/2 and to use three 2 STUs (and 5 symbols) in the case of 16QAM 1/2. If the mapping relation between the MCS level and the size of the resource region is previously defined as described above, only the MCS level may be implicitly indicated or explicitly indicated.

In contrast, as described above, if the size of a resource region is fixed to a minimum subband granularity or implicitly determined in association with the size of a resource region of a DL MU data frame, an MCS level may be derived from the size of the resource region for each STA. Alternatively, an AP may explicitly notify each STA of the size of a resource region which is suitable for an MCS level to be used to configure an ACK frame. For example, the AP may indicate the size of a resource region in a 2 STU (or subband, resource unit) unit for each STA. If the size of a resource region is implicitly or explicitly determined as described above, an AP has to explicitly indicate an MCS level.

Furthermore, the size of a resource region in which an UL MU ACK frame is transmitted may be identically set for each user. That is, the same size of a resource region may be set in all of ACK frames that form an UL MU ACK frame.

In this case, the position, size, etc. of a corresponding resource region may be indicated by an AP. For example, an AP may determine the size of a resource region for the transmission of an ACK frame based on a user who requires the longest length.

Furthermore, an MCS level and/or the size of a resource region used in ACK frames that form an UL MU ACK frame may be identically determined in a channel bandwidth unit or in a positive number times the channel bandwidth. For example, an MCS level and/or the size of a resource region in which an UL MU ACK is transmitted may be identically determined in a 20 MHz bandwidth unit or in a positive number times the 20 MHz bandwidth. That is, MCS levels and/or the sizes of resource regions of users which transmit UL MU ACK frames in the 20 MHz bandwidth may be identically set and may be differently set between different 20 MHz bandwidths.

The position of a resource region in which an ACK frame is transmitted for each STA is described below.

FIG. 48 has illustrates an example in which UL MU ACK frames are sequentially allocated from a low MCS level in the frequency axis. In some embodiments, the sequence of the ACK frames of STAs in the frequency axis may be determined implicitly or explicitly as described above.

If the sequence of ACK frames is implicitly indicated, the position of an UL ACK frame for each STA in the frequency axis may be determined as the sequence of STAs indicated in the SIG field or control field (e.g., MAC header) of a DL MU data frame. For example, the position of an UL ACK frame may be implicitly indicated in such a manner that the UL ACK frame of an STA ID (e.g., a partial AID (PAID), an AID or an address) first included in an SIG field is located in a first channel (or subband) and the UL ACK frame of a second STA ID is located in a second channel (or subband) in the frequency axis.

Furthermore, as in the example of FIG. 48, the position of each ACK frame in the frequency axis may be implicitly allocated in the order of low or high MCS level.

If the sequence of ACK frames is explicitly indicated, the index of the transport channel (or subband) of an UL ACK frame index may also be included in DL resource allocation information about each STA which is included in the SIG field of a DL MU data frame. Furthermore, resources for the transmission of an UL ACK frame are allocated based on the index of a channel (or subband) indicated for each STA.

Alternatively, the index of the transport channel (or subband) of an UL ACK frame may also be indicated in an SIG field or control field (e.g., a MAC header) for the transmission of an UL ACK frame which is separately included in a DL MU data frame.

Alternatively, the index of a 2 STU (or subband, resource unit) at what place will be used (and/or how many 2 STU will be used) may be directly indicated in the SIG field or control field (e.g., MAC header) of a DL MU data frame for each STA instead of the index of an ACK channel (or subband).

In general, an ACK frame may be allocated from the first 2 STU (or subband, resource unit) of the entire frequency band. In this case, if an UL data frame and the ACK frame are frequency- or space-multiplexed and transmitted, a separate indicator is required.

That is, if a time and/or frequency resource region to which all of the aforementioned ACK frames are allocated is called an "ACK region", the size and position of the ACK region may be changed.

If a DL MU data frame is a cascade frame, STAs need to transmit ACK frames at the same time along with UL data. The cascade frame means a frame that includes both DL data and trigger information to trigger UL MU data transmission. In this case, some regions of a full bandwidth in a frequency domain or space domain may be classified as an UL data frame transmission region, and the remaining regions may be classified as an ACK frame transmission region. For example, if a full bandwidth is classified in the frequency domain (i.e., if a cascade frame is frequency-multiplexed and transmitted), the UL data frame transmission region and the ACK frame transmission region may be classified in a tone (or subband, resource unit) unit.

For example, an ACK frame is unconditionally transmitted from the first STU (or subband, resource unit), and the UL data frame transmission region may be implicitly allocated in the remaining region other than a region in which all of ACK frames may be transmitted.

Furthermore, an AP may indicate a start point in the time and/or frequency domain of an UL data frame transmission region through a separate indicator, such as ACK region indication information and may determine the remaining regions to be an ACK region. Alternatively, an AP may indicate a start point in the time and/or frequency domain of an ACK region through a separate indicator and determines the remaining regions to be an UL data frame transmission region.

In this case, the configuration of the ACK region may be determined based on the configuration of resources in a DL data frame. For example, since four BTUs and one 2 STU are used in the configuration of a DL data frame in the 20 MHz bandwidth (refer to Table 13), the remaining x BTUs and y 2 STUs other than the region in which an UL data frame is used may be formed into z 2 STUs, and the resource region of an ACK channel/frame may be allocated. In other words, the resource region of an ACK channel/frame may be determined in a minimum subband granularity other than the region in which an UL data frame is used. In this case, resources for the ACK channel/frame in the ACK region are allocated as described above.

In addition, in order to minimize indication bits, pieces of information, such as space-time block coding (STBC) and coding for the configuration of an ACK frame, may be fixed and previously determined. For example, if both an AP and an STA are aware of the capabilities of the STA, a high transfer rate of things capable of being selected based on the capabilities of the STA is selected. For example, such information may be implicitly determined to use STBC-on (i.e., STBS is used) if STBC can be supported and to use LDPC-on (i.e., LDPC is used) if LDPC can be supported. Alternatively, an UL ACK frame may be configured using information about a DL data frame as information, such as STBC or coding.

The aforementioned signaling (e.g., MCS level information, resource region size information, resource region position information, TDM information for an ACK frame, ACK region indication information, STBC, and coding information) required in relation to an UL ACK frame may be transmitted in the SIG field (e.g., L-SIG field, HE-SIG-A field or HE-SIG-B field) or control field (e.g., MAC header) of a DL MU data frame.

In this case, if the signaling is included in the SIG field of the DL MU data frame and transmitted, it may also be included in an SIG field for the DL MU data frame and transmitted or an SIG field for an UL ACK frame may be added to the DL MU data frame and the signaling may be included in the added SIG field and transmitted.

If the signaling is also included in an SIG field for a DL MU data frame and transmitted, information related to an UL ACK frame may be included along with information related to the DL MU data frame. For example, the index (or subband, resource unit index) of an ACK channel/frame, an MCS, etc. may be included in the SIG field for the DL MU data frame. Furthermore, if the index of an ACK channel is implicitly indicated for each STA, only a difference MCS level may be added in 2 bits for each STA. That is, only information that belongs to the aforementioned information related to an UL ACK frame and that is explicitly indicated other than information that is implicitly indicated may be included.

If the signaling is included in an additional SIG field for the UL ACK frame of a DL MU data frame and transmitted, only information related to the UL ACK frame may be included in the corresponding SIG field. For example, if DL MU data and UL data (or trigger information) are cascaded, the signaling may be included in a corresponding SIG field because a separate SIG field for the UL data (or trigger information) may be present.

STAs whose Tx power do not reach coverage may transmit the signaling with the lowest MCS level and the smallest resources unit (e.g., 2 STU or a minimum subband granularity) regardless of the aforementioned resource allocation method and the MCS determination method. For example, although ten 2 STUs have been allocated with BPSK ½according to the above resource calculation rule (refer to Equation 9), the number of symbols may be doubled into five STUs and transmitted. In this case, for decoding, an AP needs to be aware of such information.

In this case, STAs may unconditionally determine to use only a specific number of 2 STUs (e.g., four 2 STUs)

regardless of the above resource calculation rule because an AP has information about the STAs whose Tx power do not reach coverage. In addition, the remaining 2 STUs, although allocated, may become null and may be repeatedly transmitted. Other STAs may determine the position and size of resources according to a rule.

Alternatively, the size of a resource region (e.g., the number of 2 STUs or subbands (resource units)) for the transmission of an ACK frame may be indicated for all of UL MU STAs.

If STAs have failed in the reception of a frame, they attempt transmission after an extended interframe space (EIFS). The EIFS is calculated as in Equation 10 below.

$$EIFS = aSIFStime + DIFS + (Estimated)ACKTxTime \quad [\text{Equation 10}]$$

In Equation 10, an SIFS time ("aSIFSTime") is defined as in Equations 1 and 2 and an DIFS is defined as in Equation 5.

The EIFS includes an ACK time. If an STA fails in the reception of a frame and immediately transmits a frame, the frame may collide against an ACK frame for the frame whose reception has failed. Accordingly, the STA expects that an ACK frame will be transmitted after the frame whose reception has failed, waits during the time called an EIFS from the time when the frame whose reception has failed is terminated, and attempts to transmit the ACK frame. That is, the EIFS may be considered to be the time for protecting the ACK frame.

As in Table 15 below, a maximum ACK time of an ACK frame according to an embodiment of the present invention is 68 μs. This is the same as the time when a compressed BA frame is transmitted with BPSK ½ of an 802.11a frame format.

TABLE 15

| L-STF | L-LTF | L-SIG | MAC MPDU |
|---|---|---|---|
| 8 us | 8 us | 4 us | 48 us = 35 octets (BPSK 1/2 applied and 4 us symbol length) (Service + tail: 3 octets, MAC header: 16 octets, BA Control field: 2 octets, BA Information field: 10 octets, FCS: 4 octets) |

In UL ACK transmission, an BA frame may have an 802.11a frame structure (i.e., a non-HT format PPDU, refer to FIG. 3) or may have an 802.11ax frame structure (i.e., an HE format PPDU, refer to FIGS. 25 to 31). In this case, the BA frame may comply with the 802.11ax frame structure for UL MU ACK transmission.

If the entire 20 MHz bandwidth is to be used while the MAC MPDU format of an existing BA frame is maintained, an ACK time is calculated as 83.2 μs as in Table 16. Such a BA frame inevitably collides against the transmission of frames from STAs having the existing EIFS.

In Table 16, the length of the MAC MPDU may be different from the HE-SIG-A field marked by "*." Furthermore, in Table 16, it is assumed that a data symbol is 1.6 μs CP.

Accordingly, in order to reduce MAC overhead, a new BA frame structure not including an unnecessary field, such as a Duration field in the existing BA frame, may be defined. In the existing BA frame, the Duration field is necessary because an STA determines an MCS. However, when an ACK frame is transmitted as an UL MU frame, an AP may provide notification of an MCS and resources through a Trigger frame. Accordingly, the Duration field may be omitted. Furthermore, RA and TA may also be omitted because an AP is aware that an UL MU frame will be transmitted. Furthermore, if a BA frame is fixed to an ACK frame that is immediately transmitted regardless of whether the BA frame is an ACK frame that is immediately transmitted or an ACK frame that is not immediately transmitted, a BA ACK policy subfield may be omitted. Furthermore, if the type of BA frame is fixed to one type, a Multi-TID subfield and a Compressed Bitmap subfield may be omitted. Furthermore, a TID_Info subfield may also be omitted because an AP is already aware of TID information. This is described below with reference to FIG. 50 below.

FIG. 50 is a diagram illustrating a BA frame for DL MU transmission according to an embodiment of the present invention.

Referring to FIG. 50, a block ACK (BA) frame (i.e., a MAC frame) according to an embodiment of the present invention includes a Frame Control field 5001 (2 octets), a BA Information field 5002 (10 octets), and a Frame Check Sequence (FCS) 5003 (4 octets).

The Frame Control field 5001 may include the information according to the example of FIG. 7.

The BA Information field 5002 includes a Block ACK Starting Sequence Control subfield 5011 (2 octets) and a Block ACK Bitmap Subfield 5012 (8 octets).

The Block ACK Starting Sequence Control subfield 5011 includes a Fragment Number subfield 5021 (4 bits) and a Starting Sequence Number subfield 5022 (12 bits).

The Block ACK Bitmap subfield 5012 has a length of 8 octets and may be used to indicate the reception state of a maximum of 64 MSDUs and A-MSDUs. In the Block ACK Bitmap subfield, a value "1" may indicate that a single MSDU or A-MSDU corresponding to the position of a corresponding bit has been successfully received. A value "0" may indicate that a single MSDU or A-MSDU corresponding to the position of a corresponding bit has not been successfully received.

The Fragment Number subfield 5021 may be set as 0.

The Starting Sequence Control subfield 5022 may include the sequence number of a first MSDU or A-MSDU in which a corresponding BA frame is to be transmitted.

As in FIG. 50, if a BA frame includes a total of 16 octets and a Service+Tail field is included in the BA frame, an MPDU (i.e., a PPDU data field) may have a total of 19 octets.

TABLE 16

| L-STF | L-LTF | L-SIG | HE-SIG-A | HE-STF | HE-LTF | MAC MPDU |
|---|---|---|---|---|---|---|
| 8 us | 8 us | 4 us | 12 us (*) | 4 us (*) | 4 us (*) | 43.2 us (3 symbols) = 35 octets (BPSK ½ applied, 14.4 us symbol length) (*) (Service + tail: 3 octets, MAC header: 16 octets, BA Control field: 2 octets, BA Information field: 10 octets, FCS: 4 octets) |

In this case, the value of an omitted field compared to the existing BA frame may be indicated in a DL MU data frame or may be always fixed to a constant value.

Furthermore, in configuring an UL MU BA frame, consideration needs to be taken of that a frequency band cannot be always occupied by only one because frames are MU frames. Since a resource unit may be configured in a 26 tone unit or a 242 tone unit as described above, a frequency resource for the transmission of an ACK frame for each STA may be allocated as n*26 tones or n*242 tones.

Accordingly, when consideration is taken of that a BA frame needs to be configured within such allocated frequency resource and an EIFS, a configurable MCS set may be determined as in Table 17 below.

TABLE 17

| Allocation index | Allocation | BA frame with original fields ACK time: 97.6 us = preamble (L-STF~HE-LTF) 40 us + MPDU (4 symbols) 57.6 us | BA frame with reduced fields ACK time: 68.8 us = preamble (L-STF~HE-LTF) 40 us + MPDU (2 symbols) 28.8 us |
| --- | --- | --- | --- |
| 0 | 26 × 1 tones | 64QAM 2/3 (Note: MPDU 22 symbols if BPSK 1/2) | 64QAM 2/3 (Note: MPDU 12 symbols if BPSK 1/2) |
| 1 | 26 × 2 tones | QPSK 3/4 | QPSK 3/4 |
| 2 | 26 × 3 tones | QPSK 1/2 | QPSK 1/2 |
| 3 | 26 × 6 tones | BPSK 1/2 | BPSK 1/2 |
| 5 | 242 tones | BPSK 1/2 (Exception: ACK time = 83.2 us due to MPDU 3 symbols) | BPSK 1/2 |

As described above, if a PPDU including a MAC frame having a reduced field according to an embodiment of the present invention is used, an UL MU BA frame can be configured within an EIFS when the MCS set of Table 17 is used.

If the allocation of resources to be used by UL MU BA frames is indicated in a DL MU data frame, STAs may fix an MCS suitable for the corresponding allocation without separate indication. As in the example of Table 17, the resource allocation type is a total of 5 and may be indicated in a DL MU data frame.

Furthermore, if 242 tones are to be used and transmission is performed using a DL MU data frame of all the 242 tones, an allocation index may be indicated through 2 bit information with respect to only the remaining four types.

An MCS level and/or the type of resource allocation type determined for each resources allocation index illustrated in Table 17 are merely examples, but the present invention is not limited thereto. For example, if the allocation index is "0", 26×1 tones may be allocated and 64QAM ⅔may be applied. If the allocation index is "1", 26×2 tones may be allocated and QPSK ¾may be applied. If the allocation index is "2", 26×4 tones may be allocated and QPSK ½(or BPSK ½) may be applied. If the allocation index is "3", 242 tones may be allocated and BPSK ½may be applied.

The allocation index may be included in the SIG field (e.g., L-SIG field, HE-SIG-A field or HE-SIG-B field) or control field (e.g., MAC header) of a DL MU data frame.

If the position of a resource region is not included, but only allocation index information is included, each of STAs may have to read all of the SIG fields (e.g., SIG-B fields) of previous DL MU data frames (i.e., read all of SIG fields for other STAs) and to be aware of its accumulated allocation position (i.e., the start index of a frequency resource (e.g., resource unit or subband)).

In this case, as described above, the position of an UL ACK frame for each STA in the frequency axis may be determined in the sequence of STAs indicated in the SIG field or control field (e.g., MAC header) of a DL MU data frame. The position of an UL ACK frame in the frequency axis of each ACK frame may be implicitly allocated in the sequence of a low or high MCS level.

Furthermore, an AP may transmit the position of an UL ACK frame to each of STAs along with the time for the transmission of an ACK frame and/or the start index and allocation index of frequency resources. For example, the AP may notify each STA of the start index in N of 26×N. N may be 1~9. 10, 11, 12 may be interpreted as 242, 242×2, 242×3, etc. (or 20 MHz, 40 MHz, 60 MHz, etc.) in preparation to a case where 242 is included. For example, if the start index is 2, the size of a resource region indicated in the allocation index is allocated starting from a second resource unit (or subband).

FIG. 51 is a diagram illustrating a DL MU transmission method according to an embodiment of the present invention.

Referring to FIG. 51, in a full 20 MHz band, the DL MU data frame 5101 of an STA 1, the DL MU data frame 5102 of an STA 2, and the DL MU data frame 5103 of an STA 3 are multiplexed in different frequency resources using the OFDMA method and transmitted.

In this case, it is assumed that an allocation index "0" has been indicated in the STA 1, an allocation index "1" has been indicated in the STA 2, and an allocation index "3" has been indicated in the STA 3.

Referring to FIG. 51 and Table 17, 64QAM ⅔is applied to the BA frame 5111 of the STA 1 and the BA frame 5111 is transmitted in 26×1 tones. Furthermore, QPSK 3/4 is applied to the BA frame 5112 of the STA 2, and the BA frame 5112 is transmitted in 26×2 tones. Furthermore, BPSK ½is applied to the BA frame 5113 of the STA 3, and the BA frame 5113 is transmitted in 26×6 tones. Furthermore, the BA frames 5111, 5112, and 5113 are frequency-multiplexed and transmitted at the same time for each STA.

In this case, the sequence (or position) of resource units (or subbands) in which the BA frames are transmitted for each STA may be implicitly determined in the sequence of STAs indicated in the SIG field or control field of a DL MU data frame or based on the position of DL resources allocated to each STA.

Furthermore, in DL MU transmission, if all of BA frames cannot be transmitted within one bandwidth because the number of STAs is large or the BA frames have a low MCS level, an AP may transmit a BAR frame and transmit the remaining BA frames after the BAR frame. In this case, the BAR frame may include information about an UL MU BA frame to be transmitted next as in FIGS. 21 and 22 and may be transmitted, but may be transmitted as a CTS format which is used to only occupy a medium.

This is described below with reference to the following drawing.

FIG. 52 is a diagram illustrating a DL MU transmission method according to an embodiment of the present invention.

Referring to FIG. 52, in a full 20 MHz band, the DL MU data frame 5201 of an STA 1, the DL MU data frame 5202 of an STA 2, the DL MU data frame 5203 of an STA 3, and the DL MU data frame 5204 of an STA 4 are multiplexed in different frequency resources using the OFDMA method and transmitted.

In this case, it is assumed that an allocation index "0" has been indicated in the STA 1, an allocation index "1" has been indicated in the STA 2, an allocation index "3" has been indicated in the STA 3, and an allocation index "5" has been indicated in the STA 4.

Referring to FIG. 52 and Table 17, 64QAM ⅔ is applied to the BA frame 5211 of the STA 1 and the BA frame 5211 is transmitted in 26×1 tones. Furthermore, QPSK 3/4 is applied to the BA frame 5212 of the STA 2, and the BA frame 5212 is transmitted in 26×2 tones. Furthermore, BPSK ½ is applied to the BA frame 5213 of the STA 3, and the BA frame 5213 is transmitted in 26×6 tones. Furthermore, the BA frames 5211, 5212, and 5213 are frequency-multiplexed and transmitted at the same time for each STA.

Since the BA frames 5211, 5212, and 5213 of the STAS 1 to 3 occupy the entire channel bandwidth, the BA frame 5231 of the STA 4 may be multiplexed and transmitted along with the BA frames 5211, 5212, and 5213 of the STA 1 to the STA 3. Accordingly, the BA frame 5231 may be transmitted after a BAR frame 5221 transmitted by an AP.

Each of the STAs is aware of its start index by calculating it or is aware of the start index based on indication from an AP. If the STA determines that it has been allocated to the first UL MU BA region, it immediately transmits the BA frame. If not, the STA waits for the BAR frame 5221 and transmits the BA frame.

For example, if only an allocation index is included in a DL MU data frame, as described above, each of the STAs may read all of the SIG fields of DL MU data frames and may be aware of the start index of a frequency resource (e.g., resource unit or subband) for the transmission of its own ACK frame.

In this case, as described above, the position of an UL ACK frame for each STA in the frequency axis may be determined to be the sequence of STAs indicated in the SIG field or control field (e.g., MAC header) of a DL MU data frame. Alternatively, the position of an ACK frame in the frequency axis may be implicitly allocated in the sequence of high or low MCS level.

In the case of FIG. 52, it is assumed that a sequence, such as the STA 1, the STA 2, the STA 3, and the STA 4, has been explicitly or implicitly indicated. In this case, frequency resources allocated to the STA 1 are 26×1 tones, frequency resources allocated to the STA 2 are 26×2 tones, and frequency resources allocated to the STA 3 are 26×6 tones. Accordingly, the STA 4 may determine that its own ACK frame 5231 may need to be transmitter after the BAR frame 5221 because only the ACK frames 5211, 5212, and 5213 of the STA 1, the STA 2, and the STA 3 may be transmitted as the first ACK frame in a full 20 MHz band.

For another example, if an AP indicates the time for the transmission of an ACK frame and/or the start index and allocation index of frequency resources for each of STAs, each of the STAs may check the position of a frequency resource along with the size of the frequency resource for the transmission of its own ACK frame.

For a case where a DL MU data frame consists of one MDPU other than an A-MPDU, an ACK frame may also be transmitted through MU in addition to a BA frame. In this case, if the length of the MAC MPDU of the ACK frame is a total of 14 octets and a Service+Tail field is included in the ACK frame, a total length is 17 octets (i.e., an MAC MPDU). Accordingly, the rule of the aforementioned reduced BA frame may be applied without any change. For example, an ACK frame may be applied without any change instead of the BA frame including the reduced field of Table 17.

In the examples of FIGS. 51 and 52, the ACK frame structures have been described in the case of a 20 MHz bandwidth, for convenience of description. If an ACK/BA frame has to be transmitted in a band of more than a 20 MHz bandwidth, it may be duplicated and transmitted based on the aforementioned ACK/BA frame structure configured in the 20 MHz band.

General Apparatus to which an Embodiment of the Present Invention May be Applied FIG. 53 is a block diagram illustrating a wireless apparatus according to an embodiment of the present invention.

Referring to FIG. 53, the apparatus 5310 according to an embodiment of the present invention may include a processor 5311, memory 5312, and a radio frequency (RF) unit 5313. The apparatus 5310 may be an AP or non-AP STA for implementing the embodiments of the present invention.

The RF unit 5313 is connected to the processor 5311 and may transmit/receive a radio signal. For example, the RF unit 5313 may implement the physical layer according to the iEEE 802.11 system.

The processor 5311 is connected to the RF unit 5313 and may implement the physical layer and/or the MAC layer according to the IEEE 802.11 system. The processor 5311 may be configured to perform operations according to the various embodiments of the present invention shown in FIGS. 1 to 52. Furthermore, a module for implementing the operations of the AP and/or STA according to the various embodiments of the present invention shown in FIGS. 1 to 44 may be stored in the memory 5312 and may be executed by the processor 5311.

The memory 5312 is connected to the processor 5311 and stores various types of information for driving the processor 5311. The memory 5312 may be included in the processor 5311 or disposed outside the processor 5311 and may be connected to the processor 5311 by known means.

Furthermore, the apparatus 5310 may have a single antenna or multiple antennas.

The detailed configuration of the apparatus 5310 may be implemented so that the contents described in the various embodiments of the present invention are independently applied or two or more of the embodiments are simultaneously applied to the detailed configuration of the apparatus 5310.

In the aforementioned embodiments, the elements and characteristics of the present invention have been combined in specific forms. Each of the elements or characteristics may be considered to be optional unless otherwise described explicitly. Each of the elements or characteristics may be implemented in such a way as to be not combined with other elements or characteristics. Furthermore, some of the elements and/or the characteristics may be combined to form an embodiment of the present invention. The order of the operations described in connection with the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment of the present invention may be implemented by various means, for example, hardware, firmware, software or a combination of them. In the case of implementations by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers and/or microprocessors.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The Downlink MU transmission methods in the wireless communication system according to an embodiment of the present invention have been illustrated as being applied to an IEEE 802.11 system, but may be applied to various wireless communication systems in addition to the IEEE 802.11 system.

The invention claimed is:

1. A method for downlink multi-user (DL MU) data transmission in a wireless communication system, the method comprising:
receiving, by a station (STA), a DL MU data frame from an access point (AP); and
transmitting, by the STA, an acknowledgement (ACK) frame as a response to the DL MU data frame,
wherein a plurality of ACK frames transmitted by a plurality of the STAs as a response to the DL MU data frame is multiplexed to form an uplink multi-user (UL MU) ACK frame,
wherein a size of time and/or frequency resources in which the ACK frame is transmitted is determined depending on a modulation and coding scheme (MCS) level applied to the ACK frame, and
wherein, when a number of STAs to which the DL MU data frame is transmitted is greater than a number of minimum resource allocation units forming a channel bandwidth, an UL MU ACK frame comprising ACK frames corresponding to the number of minimum resource allocation units is transmitted, and an UL MU ACK frame comprising remaining ACK frames after a block ACK request frame of the AP is transmitted.

2. The method of claim 1, wherein the MCS level is indicated in the DL MU data frame.

3. The method of claim 2, wherein the MCS level is indicated as a difference value with an MCS level applied to the DL MU data frame.

4. The method of claim 2, wherein the MCS level is included in a signal (SIG) field of the DL MU data frame or a media access control (MAC) header of the DL MU data frame.

5. The method of claim 1, wherein an identical MCS level and/or an identical size of a resource region are used in all of the ACK frames forming the UL MU ACK frame.

6. The method of claim 1, wherein an MCS level and/or a size of a resource region used in the ACK frames forming the UL MU ACK frame are identically set in a channel bandwidth unit.

7. The method of claim 1, wherein the MCS level is determined to be identical with an MCS level applied to the DL MU data frame or determined to be a lowest coding rate in an identical modulation scheme.

8. The method of claim 1, wherein if the UL MU ACK frame is multiplexed with an UL data frame and transmitted, a region in which the ACK frame is transmitted is indicated by the DL MU data frame.

9. The method of claim 1, wherein a position of a frequency resource in which the ACK frame is transmitted is determined in a sequence of STAs indicated in the DL MU data frame or determined to be identical with a frequency resource in which the DL MU data frame has been transmitted.

10. The method of claim 1, wherein the ACK frame is transmitted in a channel to which a frequency resource allocated to the STA belongs in the DL MU data frame.

11. The method of claim 1, wherein the UL MU ACK frame is transmitted only in a primary channel.

12. The method of claim 1, wherein, if the ACK frame is a block acknowledgement (BA) frame, the BA frame comprises a frame control field, a BA information field, and a frame check sequence only.

13. A station (STA) apparatus supporting downlink multi-user (DL MU) data transmission in a wireless communication system, the STA apparatus comprising:
a radio frequency (RF) unit configured to send and receive a radio signal; and
a processor,
wherein the processor is configured to receive a DL MU data frame from an access point (AP) and to transmit an acknowledgement (ACK) frame as a response to the DL MU data frame,
wherein a plurality of ACK frames transmitted by a plurality of STAs as a response to the DL MU data frame is multiplexed to form an uplink multi-user (UL MU) ACK frame,
wherein a size of time and/or frequency resources in which the ACK frame is transmitted is determined depending on a modulation and coding scheme (MCS) level applied to the ACK frame, and
wherein, when a number of STAs to which the DL MU data frame is transmitted is greater than a number of minimum resource allocation units forming a channel bandwidth, an UL MU ACK frame comprising ACK frames corresponding to the number of minimum resource allocation units is transmitted, and an UL MU ACK frame comprising remaining ACK frames after a block ACK request frame of the AP is transmitted.

* * * * *